United States Patent [19]
Sato et al.

[11] Patent Number: 5,252,251
[45] Date of Patent: Oct. 12, 1993

[54] MESOMORPHIC POLYMER, MONOMERIC MESOMORPHIC COMPOUNDS, LIQUID CRYSTAL COMPOSITION AND LIQUID CRYSTAL DEVICE

[75] Inventors: Koichi Sato, Atsugi; Yutaka Kurabayashi, Yokohama; Kazuo Yoshinaga, Machida; Yomishi Toshida, Yokohama, all of Japan

[73] Assignee: Canon Kabushiki Kaisha, Tokyo, Japan

[21] Appl. No.: 458,448

[22] Filed: Dec. 28, 1989

[30] Foreign Application Priority Data

Dec. 30, 1988 [JP] Japan .................. 63-334235
Jul. 21, 1989 [JP] Japan .................. 1-187546
Dec. 25, 1989 [JP] Japan .................. 1-332696

[51] Int. Cl.$^5$ ............ C09K 19/52; C08F 26/00; C08G 59/00; G02F 1/13
[52] U.S. Cl. ................ 252/299.01; 526/312; 528/87; 359/103; 428/1
[58] Field of Search .............. 252/299.01, 299.61; 528/87, 98, 100, 99; 526/312, 313

[56] References Cited

U.S. PATENT DOCUMENTS

| | | | |
|---|---|---|---|
| 4,367,924 | 1/1983 | Clark et al. .................. | 350/334 |
| 4,775,223 | 10/1988 | Yoshinaga et al. .......... | 350/333 |
| 4,798,680 | 1/1989 | Nohira et al. ............... | 252/299.01 |
| 4,812,259 | 3/1989 | Yoshinaga et al. .......... | 252/299.65 |
| 4,816,178 | 3/1989 | Katagiri et al. ............. | 252/299.6 |
| 4,873,018 | 10/1989 | Nohira et al. ............... | 252/299.01 |
| 4,876,027 | 10/1989 | Yoshinaga et al. .......... | 252/299.65 |
| 4,880,560 | 11/1989 | Yoshinaga et al. .......... | 252/299.01 |
| 4,882,085 | 11/1989 | Yoshinaga et al. .......... | 252/299.61 |
| 4,892,675 | 1/1990 | Nohira et al. ............... | 252/299.01 |
| 4,915,867 | 4/1990 | Morita et al. ............... | 252/299.5 |
| 4,925,589 | 5/1990 | Lorenz ....................... | 252/299.01 |
| 4,954,600 | 9/1990 | Hachiya ..................... | 252/299.01 |
| 4,965,591 | 10/1990 | Kurabayashi et al. ....... | 346/108 |
| 5,011,623 | 4/1991 | Yoshinaga et al. .......... | 252/299.5 |

FOREIGN PATENT DOCUMENTS

| | | |
|---|---|---|
| 0274128 | 7/1988 | European Pat. Off. . |
| 0292244 | 11/1988 | European Pat. Off. . |
| 0296571 | 12/1988 | European Pat. Off. . |
| 72784 | 4/1988 | Japan . |
| 99204 | 4/1988 | Japan . |
| 161005 | 7/1988 | Japan . |

OTHER PUBLICATIONS

Appl. Phys. Lett., vol. 18, No. 4 (Feb. 1971) 127:128.
Polymer Bulletin, vol. 12 (1984) 299:301.
Molecular Crystals and Liquid Crystals, vol. 137, Nos. 1-4 (1986) 349:364.
Molecular Crystals and Liquid Crystals, vol. 155 (1988) 93:102.

Primary Examiner—Robert L. Stoll
Assistant Examiner—Sheam C. Wu
Attorney, Agent, or Firm—Fitzpatrick, Cella, Harper & Scinto

[57] ABSTRACT

A mesomorphic polymer comprises recurring units of the following formula (I):

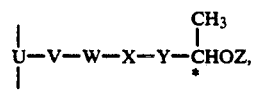

wherein U denotes a polymer main chain unit; V denotes $-(CH_2)_m-$ or $-((CH_2)_2-O)_m-$ each capable of having a substituent selected from alkyl group, halogen atom, amino group or carbonyl group substituting one or more of the hydrogen atoms wherein m is an integer of 0-30; W denotes a single bond, $-O-$, $-OCO-$, $-COO-$, $CONR^1-$, $-CO-$ or $-NR^1-$ wherein $R^1$ denotes hydrogen atom or alkyl group; X denotes a mesogen unit comprising at least two rings selected from aromatic carbon rings, aromatic heterocyclic rings and alicyclic rings each capable of having a substituent and connected with a single bond, $-O-$, $-OCO-$, $-COO-$, $-(CH_2)_n-$, $-N=N-$, $-(CH=CH)_m-$, $-CH=N-$, $-N=CH-$, $-(C\equiv C)_n13$, $-CONR^1$, $-(CO)_n-$ or $NR^1-$ wherein $R^1$ is the same as defined above and n is an integer of 1-10; Y denotes $-COOCH_2-$, $-OCH_2-$ or $-OCO-$; Z denotes $-R^2$ or $-COR^2$ wherein $R^2$ denotes hydrogen atom or alkyl group capable of having a substituent; and * denotes the location of an asymmetric carbon atom.

28 Claims, 9 Drawing Sheets

$^1$H-NMR of 9d

MESOMORPHIC POLYMER, MONOMERIC MESOMORPHIC COMPOUNDS, LIQUID CRYSTAL COMPOSITION AND LIQUID CRYSTAL DEVICE

FIELD OF THE INVENTION AND RELATED ART

The present invention relates to a novel optically active mesomorphic polymer having an optically active group in its polymer side chain, a polymer liquid crystal composition containing the mesomorphic polymer and a polymer liquid crystal device using them; and also to a monomeric mesomorphic compound suitable for providing such a mesomorphic polymer, a liquid crystal composition containing the compound and a liquid crystal device using them.

The mesomorphic polymer or its composition and monomeric mesomorphic compound or its composition according to the present invention can be used as a material for optoelectronics represented by liquid crystal devices, a material for optical instruments, etc.

There has been a well known type of liquid crystal devices using TN (twisted nematic) type liquid crystals as shown, for example, in "Voltage-Dependent Optical Activity of a Twisted Nematic Liquid Crystal" by M. Schadt and W. Helfrich, Applied PHysics Letters, Vol. 18, No. 4 (Feb. 15, 1971), pp. 127–128. In this type of liquid crystal devices, the number of picture elements have been restricted, because there is a problem that a crosstalk phenomenon occurs when a device of a matrix electrode structure with a high density of picture elements is driven according to a multiplexing driving scheme. Further, their uses for display have been limited because of slow electric field response and poor visual angle characteristics.

As another type of liquid crystal device, there has been known one comprising a plurality of picture elements each connected to and subject to switching by a thin film transistor as a switching element. This type of liquid crystal device, however, is accompanied with problems such that production of thin film transistors on a substrate is very complicated, and production of a display device with a large picture area or screen is difficult.

In order to obviate the above-mentioned drawbacks of the conventional types of liquid crystal devices, Clark and Lagerwall have proposed the use of a liquid crystal device showing a bistability (e.g., U.S. Pat. No. 4,367,924). As the bistable liquid crystal, a ferroelectric crystal showing a chiral smectic C phase (SmC*) of H phase (SmH*) is generally used.

Such a ferroelectric liquid crystal has very rapid response speed on account of having spontaneous polarization, can also exhibit memorizable bistable state and further have excellent vision angle characteristic, and therefore it is considered to be suitable for a display of large capacity and large picture area. In actual production of a liquid crystal cell, however, it is difficult to develop a monodomain over a wide area, thus providing a technical problem in producing a display device of a large area.

In order to produce a display device of a large area easily, it is considered suitable to use a polymeric or polymer liquid crystal. As an example of a liquid crystal display system using a polymeric liquid crystal, it is possible to raise a polymeric liquid crystal display device of a thermal writing-type as disclosed in Polymer Communications, Vol. 24, p.p. 364–365, "Thermotropic Liquid Crystalline Polymers 14" by V. Shibaev, S. Kostromin, N. Plate, S. Ivanov, V. Vestrov and I. Yakovlev.

The above-described system, however, involves several problems such as poor contrast because of the use of light scattering for readout and a delay in response accompanying the use of a polymeric liquid crystal, so that it has not been put to practical use.

Further, Japanese Laid-Open Patent Application (JP-A Kokai) Nos. 72784/1988, 99204/1988, 161005/1988, etc., disclose ferroelectric polymer liquid crystals having a chiral part comprising a hydrocarbon alcohol such as amyl alcohol, which however have a small spontaneous polarization due to their structure and are therefore accompanied with a difficulty, such as a slow response speed. Further, those polymer liquid crystals comprise mesomorphic polymers having a single type of recurring units so that they can be restricted with respect to mesomorphic temperature ranges, responsiveness and usages.

SUMMARY OF THE INVENTION

A principal object of the present invention is to provide a novel optically active mesomorphic polymer or mesomorphic copolymer having advantages such as capability of being formed in a large area and good responsiveness when used as a material for optoelectronics and optical instruments, a polymer liquid crystal composition containing the mesomorphic polymer or mesomorphic copolymer, and a polymer liquid crystal device using them.

A second object of the present invention is to provide a monomeric mesomorphic compound having a good responsive characteristic as a bistable low-molecular weight ferroelectric liquid crystal material or a material to be blended with a mesomorphic polymer, a liquid crystal composition containing the monomeric mesomorphic compound, and a liquid crystal device containing them.

According to our study in view of the prior art as described above, we have succeeded in providing a novel side chain-type mesomorphic polymer having an optically active group in its side chain and have found that a liquid crystal device with a large area can be realized by utilizing the characteristic of the mesomorphic polymer or a polymer liquid crystal composition containing the same.

Further, we have succeeded in providing a novel side chain-type mesomorphic copolymer having an optically active groups in its side chain and have found that a liquid crystal device with a large area can be realized by utilizing the characteristic of the mesomorphic copolymer or a polymer liquid crystal composition containing the same. We have also found that a liquid crystal device with excellent characteristics can be realized by using a mesomorphic copolymer having uniformly mixed side chains with different properties.

We have also succeeded in providing a monomeric mesomorphic compound capable of providing the above-mentioned mesomorphic polymer through polymerization and have also found that the monomeric mesomorphic compound or a liquid crystal composition containing the same may be effectively used as a bistable low-molecular weight ferroelectric liquid crystal material or a material suitable for blending with a polymer liquid crystal showing a good responsive characteristic to provide an excellent liquid crystal device.

More specifically, according to a first aspect of the present invention, there is provided a mesomorphic polymer comprising recurring units of the following formula (I):

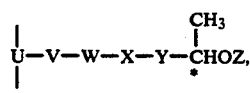

wherein U denotes a polymer main chain unit; V denotes $-(CH_2)_{\overline{m}}$ or $-(CH_2)_2-O)_{\overline{m}}$ each capable of having a substituent selected from alkyl group, halogen atom, amino group or carbonyl group substituting one or more of the hydrogen atoms wherein m is an integer of 0–30; W denotes a single bond, —O—, —OCO—, —COO—, $CONR^1$—, —CO— or —$NR^1$— wherein $R^1$ denotes hydrogen atom or alkyl group; X denotes a mesogen unit comprising at least two rings selected from aromatic carbon rings, aromatic heterocyclic rings and alicyclic rings each capable of having a substituent and connected with a single bond, —O—, —OCO—, —COO—, —$(CH_2)_n$—, —N=N—, —(CH=CH)$_m$—, —CH=N—, —N=CH—, —(C≡C)$_n$—, —$CONR^1$, —(CO)$_n$— or $NR^1$— wherein $R^1$ is the same as defined above and n is an integer of 1–10; Y denotes —$COOCH_2$—, —$OCH_2$— or —OCO—; Z denotes —$R^2$ or —$COR^2$ wherein $R^2$ denotes hydrogen atom or alkyl group capable of having a substituent; and * denotes the location of an asymmetric carbon atom.

According to a second aspect of the present invention, there is provided a polymer liquid crystal composition containing a mesomorphic polymer comprising recurring units of the above-mentioned formula (I).

According to a third aspect of the present invention, there is provided a mesomorphic copolymer comprising recurring units of the following formula (I):

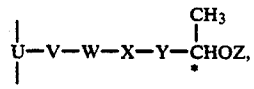

wherein U denotes a polymer main chain unit; V denotes $-(CH_2)_{\overline{m}}$ or $-(CH_2)_2-O)_{\overline{m}}$ each capable substituent selected from alkyl group, halogen atom, amino group or carbonyl group substituting one or more of the hydrogen atoms wherein m is an integer of 0–30; W denotes a single bond, —O—, —OCO—, —COO—, $CONR^1$—, —CO— or —$NR^1$— wherein $R^1$ denotes hydrogen atom or alkyl group; X denotes a mesogen unit comprising at least two rings selected from aromatic carbon rings, aromatic heterocyclic rings and alicyclic rings each capable of having a substituent and connected with a single bond, —O—, —OCO—, —COO—, —$(CH_2)_n$—, —N=N—, —(CH=CH)$_m$—, —CH=N—, —N=CH—, —(C≡C)$_n$—, —$CONR^1$, —(CO)$_n$— or $NR^1$— wherein $R^1$ is the same as defined above and n is an integer of 1–10; Y denotes —$COOCH_2$—, —$OCH_2$— or —OCO—; Z denotes —$R^2$ or —$COR^2$ wherein $R^2$ denotes hydrogen atom or alkyl group capable of having a substituent; and * denotes the location of an asymmetric carbon atom.

According to a fourth aspect of the present invention, there is provided a polymer liquid crystal composition containing a mesomorphic copolymer comprising recurring units of the above-mentioned formula (I).

According to a fifth aspect of the present invention, there is provided a polymer liquid crystal device, comprising: a substrate, and the above-mentioned mesomorphic polymer, mesomorphic copolymer or polymer liquid crystal composition disposed in an aligned form on the substrate.

According to a sixth aspect of the present invention, there is provided a monomeric mesomorphic compound represented by the following formula (III):

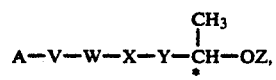

wherein A denotes

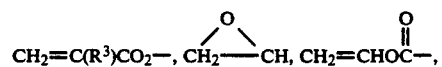

$CH_2=CH-$ or $CH_2=CH-O-$ wherein $R^3$ denotes hydrogen, alkyl or halogen; V denotes $-(CH_2)_{\overline{m}}$ or $-(CH_2)_2-O)_{\overline{m}}$ each capable of having a substituent selected from alkyl group, halogen atom, amino group or carbonyl group substituting one or more of the hydrogen atoms wherein m is an integer of 0–30; W denotes a single bond, —O—, —OCO—, —COO—, $CONR^1$, —CO— or —$NR^1$— wherein $R^1$ denotes hydrogen atom or alkyl group; X denotes a mesogen unit comprising at least two rings selected from aromatic carbon rings, aromatic heterocyclic rings and alicyclic rings each capable of having a substituent and connected with a single bond, —O—, —OCO—, —COO—, —$(CH_2)_n$—, —N=N—, —(CH=CH)$_m$—, —CH=N—, —N=CH—, —(C≡C)$_n$—, —$CONR^1$, —(CO)$_n$— or —$NR^1$ wherein $R^1$ is the same as defined above and n is an integer of 1–10; Y denotes —$COOCH_2$—, —$OCH_2$— or —OCO—; Z denotes —$R^2$ or —$COR^2$ wherein $R^2$ denotes hydrogen atom or alkyl group capable of having a substituent; and * denotes the location of an asymmetric carbon atom.

According to a seventh aspect of the present invention, there is provided a liquid crystal composition containing a monomeric mesomorphic compound represented by the above formula (III).

According to an eighth aspect of the present invention, there is provided a liquid crystal device, comprising a substrate, and the above-mentioned monomeric mesomorphic compound or liquid crystal composition disposed in an aligned form on the substrate.

The above mentioned and other objects and features of the invention will be better understood upon consideration of the following detailed description concluding with specific examples and taken in conjunction with the accompanying drawings.

DETAILED DESCRIPTION OF THE INVENTION

Figure 1:
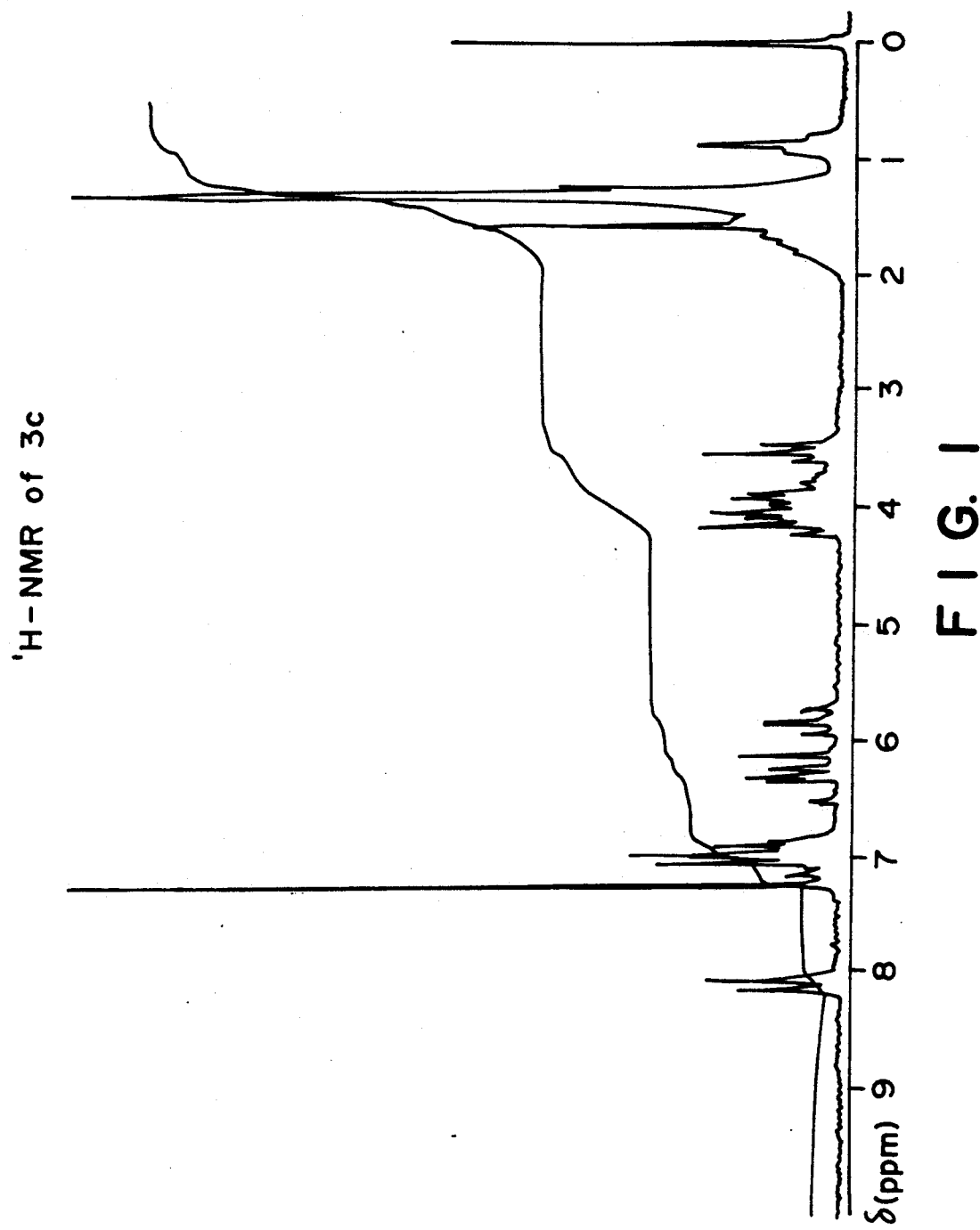
FIGS. 1–9 are $^1$H-NMR charts of mesomorphic compounds 3c, 3d, 4c, 5k, 5l, 6a, 7a, 8c and 9d, respectively (in CDCl$_3$ with TMS as the standard).

As described above, the mesomorphic polymer is characterized by having recurring units represented by the following formula (I):

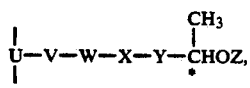  (I)

wherein the symbols have the meanings as defined above. Further to say, in the above formula (I), V denotes a spacer unit, U denotes a polymer main chain unit including a portion connecting with the spacer unit V, X denotes a mesogen unit, W denotes a group bonding the spacer unit V and the mesogen unit,

denotes a unit including a chiral group, and Y denotes a unit connecting the mesogen unit and the chiral unit.

More specifically, U denotes a polymer main chain unit chemically bonded to the spacer unit V formed by radical polymerization, anionic polymerization, cationic polymerization or condensation polymerization, or one obtained after grafting a side chain into a polymer main chain into which such a side chain can be introduced by grafting. Examples of the main chain unit U may include those of vinyl polymers, such as polyacrylates, polymethacrylates and styrene-type polymers; condensation polymers, such as polyesters and polyamides; and other polymers, such as polyoxyalkylenes, polyphosphazenes and polysiloxanes. Preferred examples of the main chain unit U include the following:

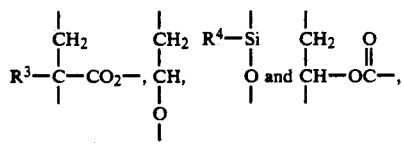

wherein $R^3$ denotes hydrogen atom, alkyl group or halogen atom, and $R^4$ denotes alkyl group.

The spacer unit V may be —(CH$_2$)$_m$—, —(CH$_2$)$_2$—O)$_m$— or one which may be obtained by replacing one or more hydrogen atoms in —(CH$_2$)$_m$— or —(CH$_2$)$_2$—O)$_m$— with alkyl, halogen, cyano, amino or carbonyl group. In other words, the spacer unit V may be selected from alkylene groups and oxyalkylene groups in general terms. In the above, m denotes an integer of 0-30. The spacer unit V may preferably be —(CH$_2$)$_m$— or —(CH$_2$)$_2$O)$_m$— (m=an integer of 0-30), further preferably —(CH$_2$)$_m$— (m=an integer of 2-15).

W may be a single bond, —O—, —OCO—, —COO—, —CONR$^1$, —CO— or —NR$^1$— (wherein R$^1$ may be hydrogen or alkyl), and preferably a single bond, —O—, —OCO— or —COO—.

X denotes a mesogen unit comprising at least two rings each capable of having a substituent and selected from aromatic carbon rings, aromatic heterocyclic rings and alicyclic rings connected with a single bond, —O—, —OCO—, —COO—, —(CH$_2$)$_n$—, —N=N—, —(CH=CH)$_n$—, —CH=N—, —N=CH—, —(C≡C-)$_n$—, —CONR$^1$—, —(CO)$_n$— or —NR$^1$ (wherein R$^1$ is H or alkyl similarly as defined above and n is an integer of 1-10); preferably with a single bond, —O—, —OCO—, —COO—, —N=N—, —CH=CH—, —CH=N—, —N=CH—, —C≡C—, —CONR$^1$, —CO— or —NR$^1$—; further preferably with a single bond, —O—, —OCO— or —COO—. Specific examples of the mesogen unit X may include the following:

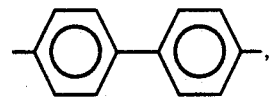

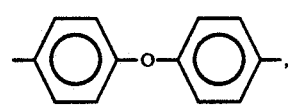

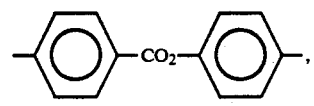

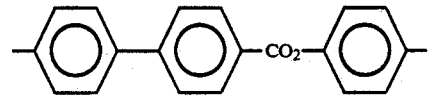

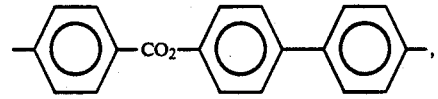

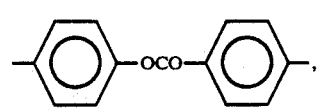

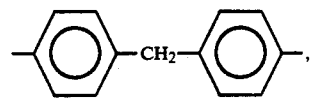

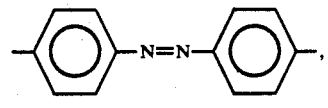

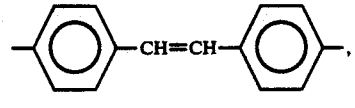

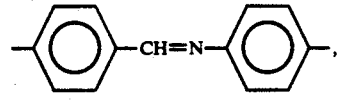

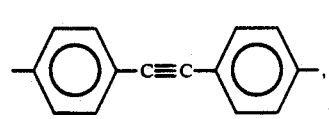

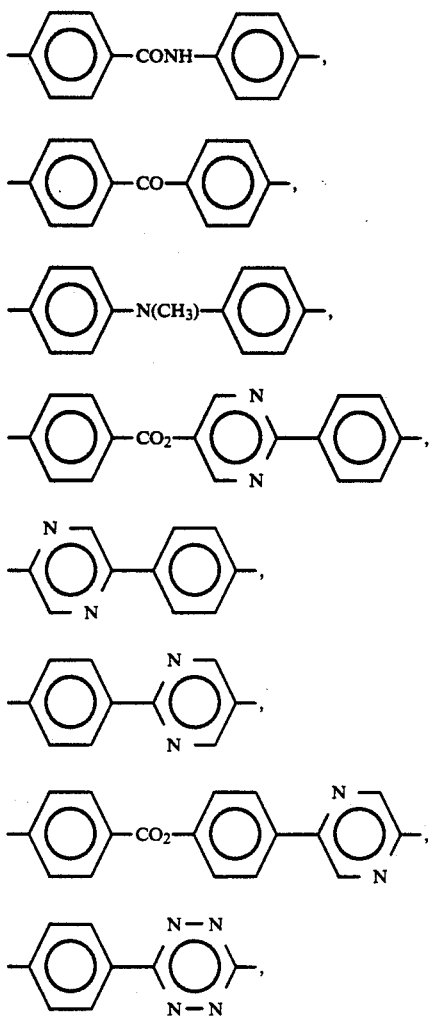

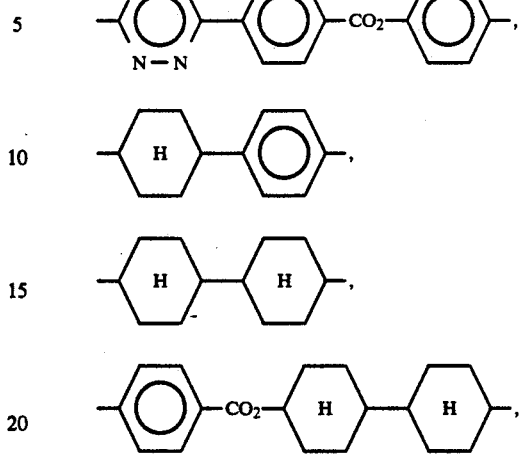

Y may be —COOCH$_2$—, —OCH$_2$— or —OCO—.

Z may be —R$^2$ or —COR$^2$ (wherein R$^2$ denotes hydrogen or alkyl capable of having a substituent, preferably alkyl or

—COCH(CH$_3$)—OR$^5$
  *

(wherein R$^5$ denotes hydrogen or alkyl and * denotes the location of an asymmetric carbon atom).

Herein, alkyl groups or alkoxy group are generally intended to mean those including not more than 10 carbon atoms, preferably 1-8 carbon atoms, unless otherwise noted specifically.

Specific examples of the optically active mesomorphic polymer according to the invention may include those having recurring units represented by the following structural formulas:

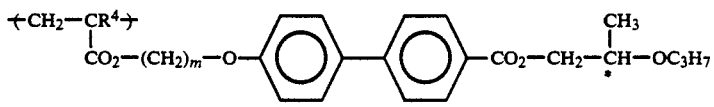

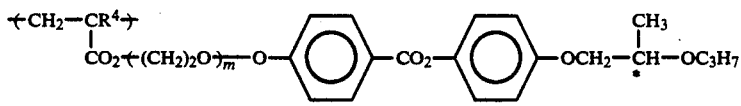

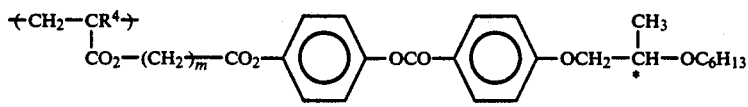

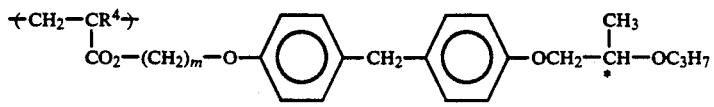

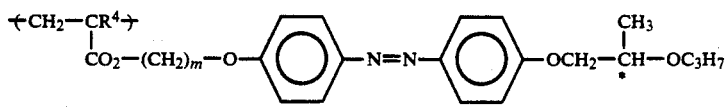

-continued
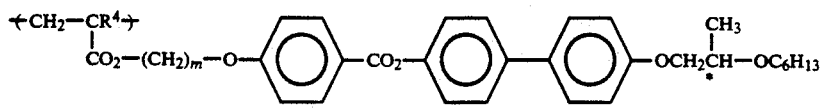
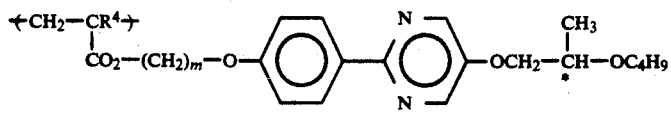
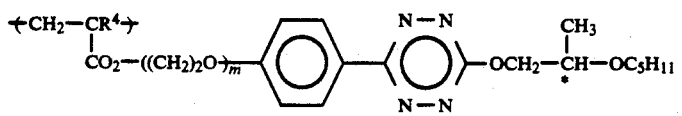
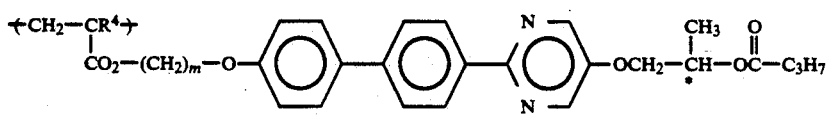
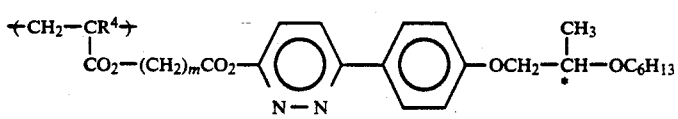
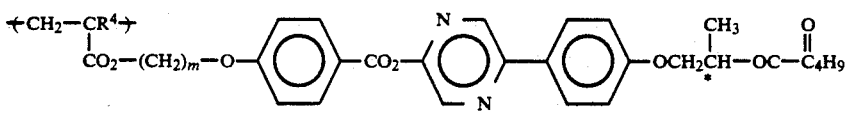
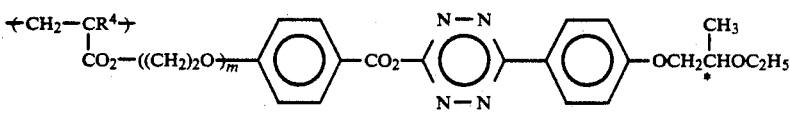
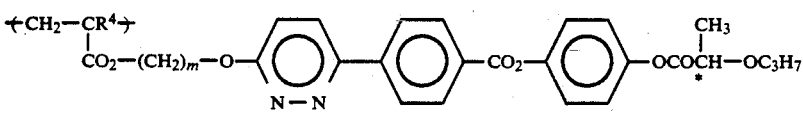
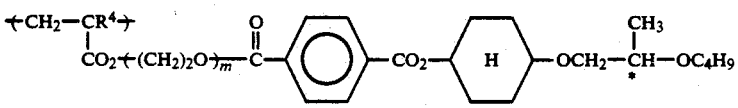
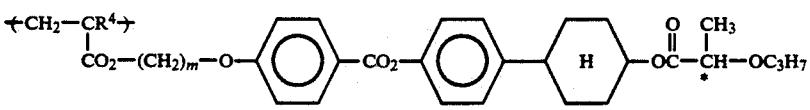
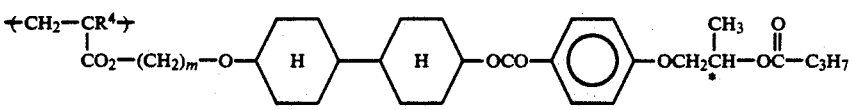
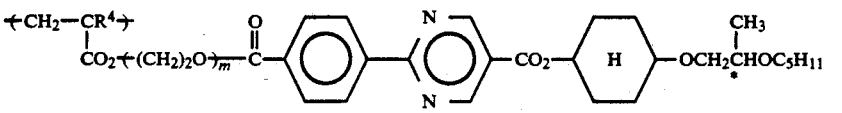
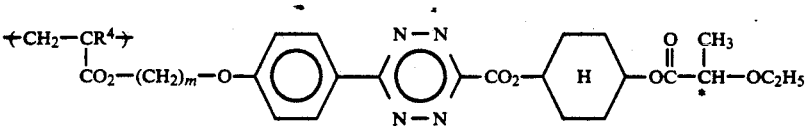

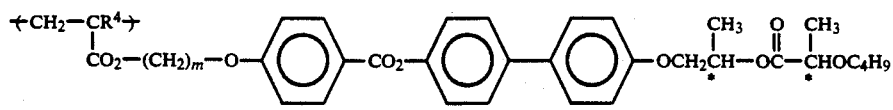
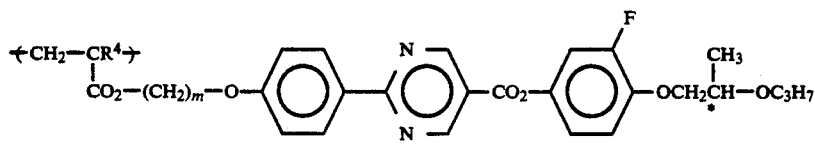
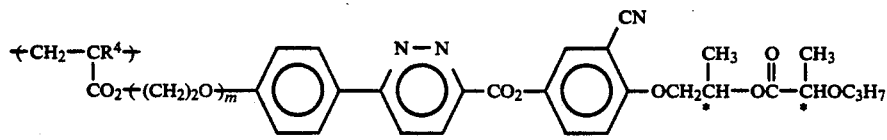
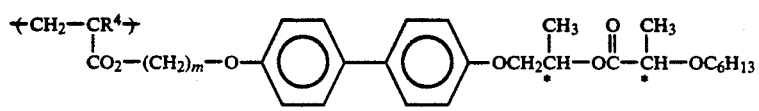
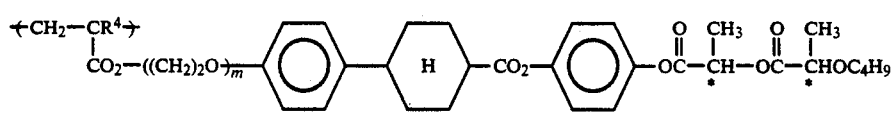
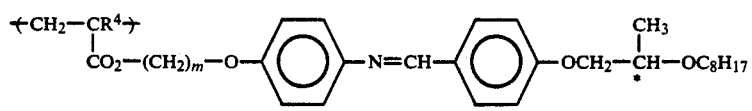
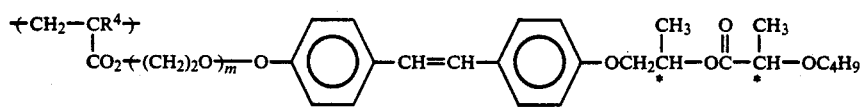
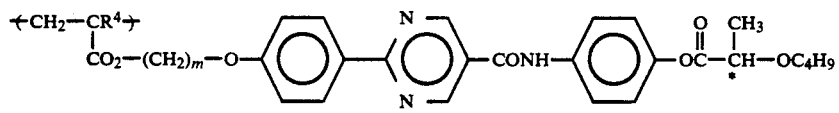
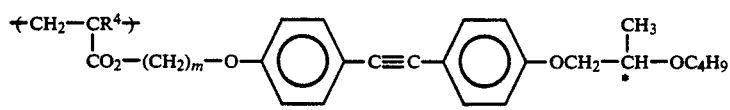
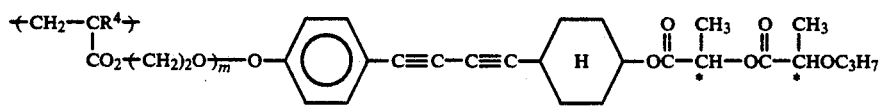
$R^4$ = H, alkyl or halogen.
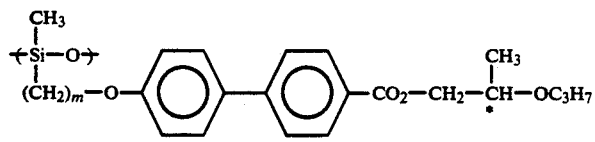
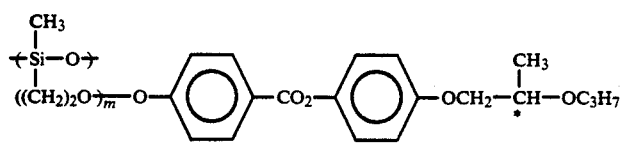

-continued
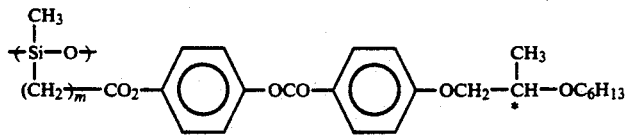
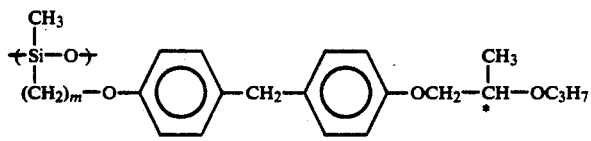
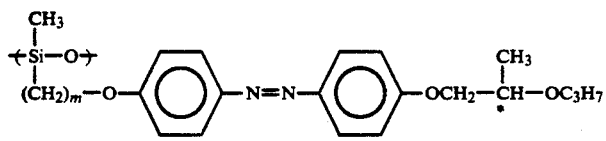
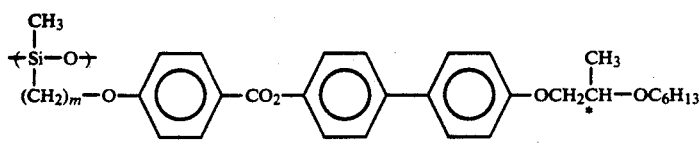
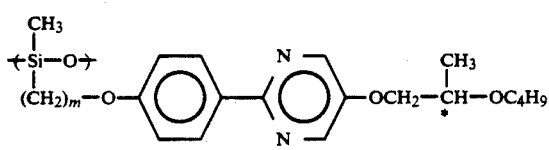
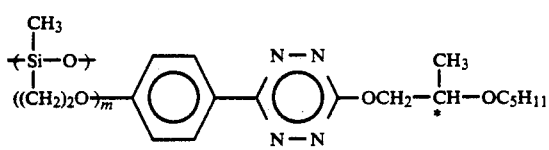
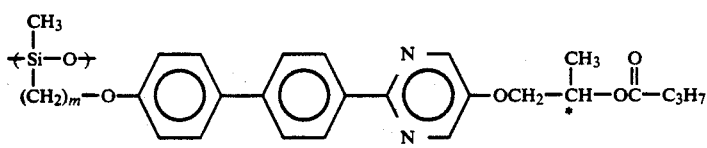
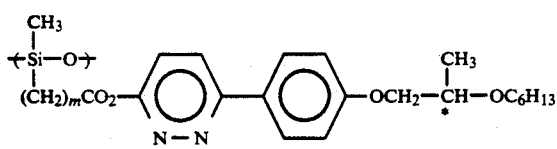
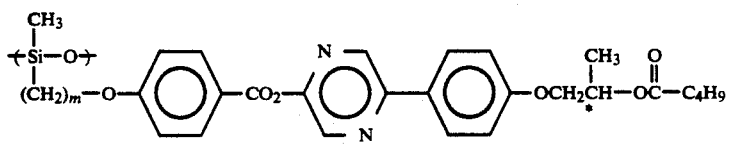
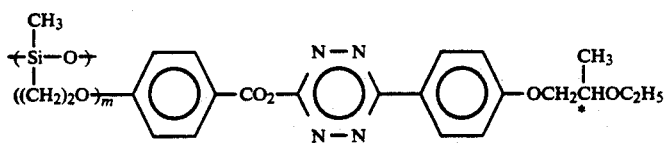
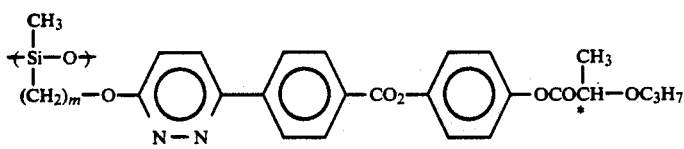

-continued
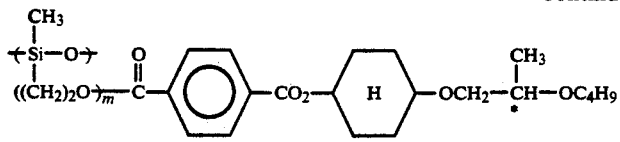
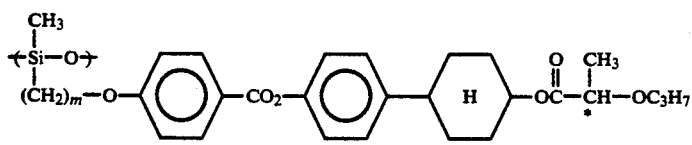
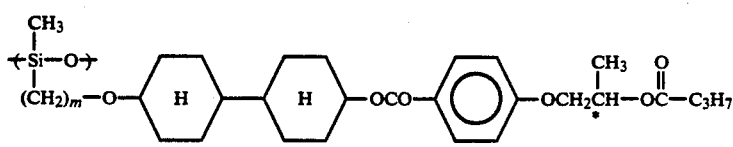
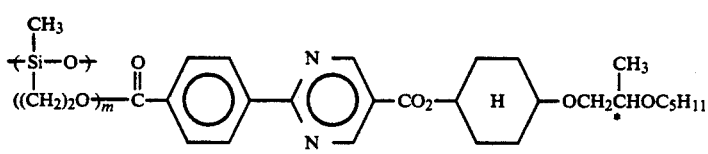
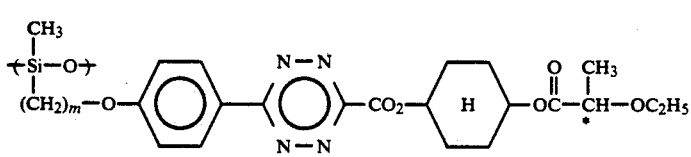
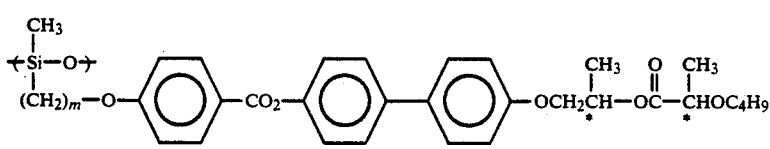
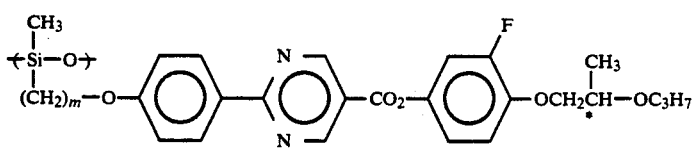
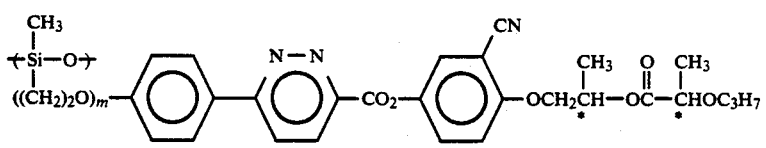
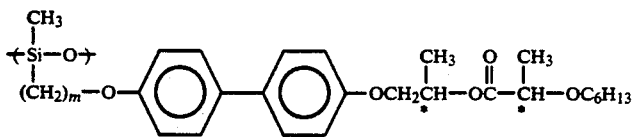
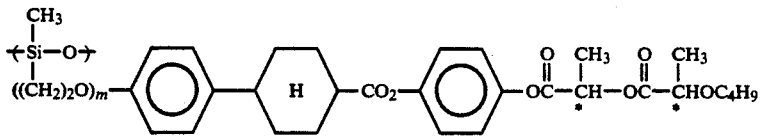
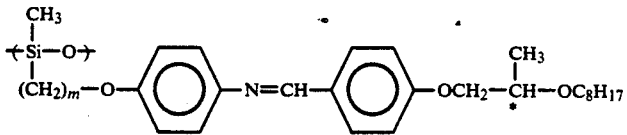

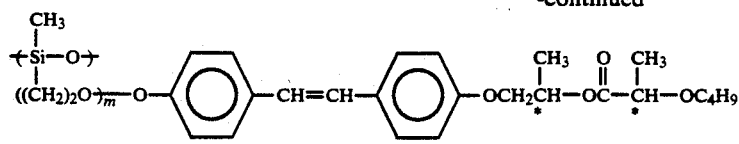
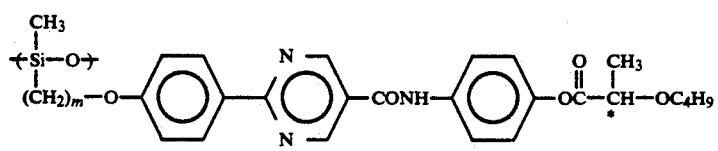
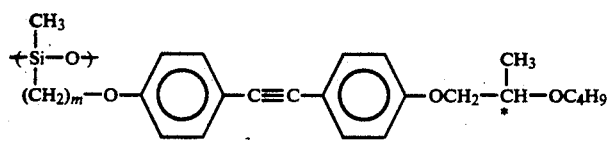
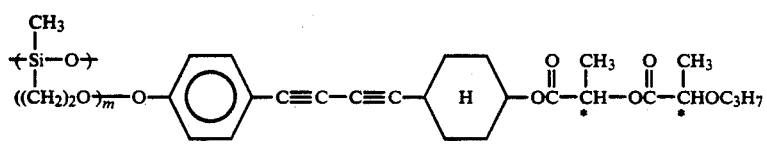
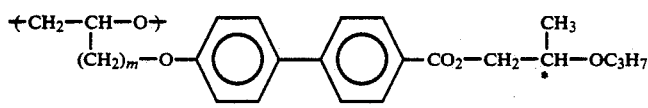
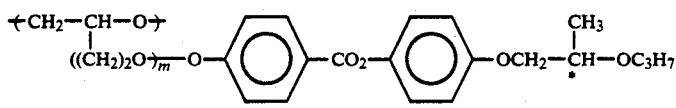
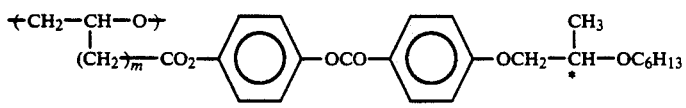
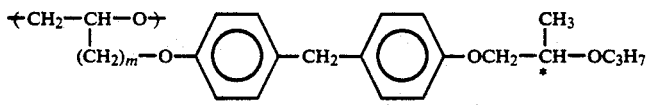
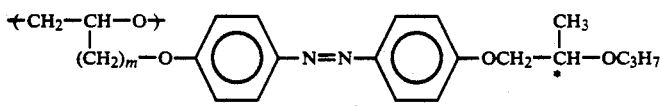
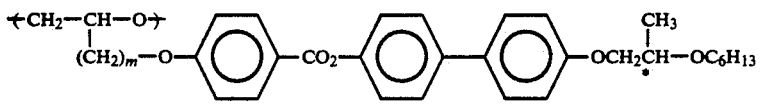
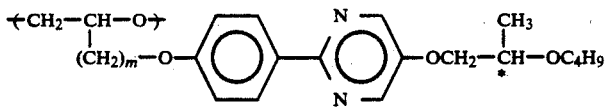
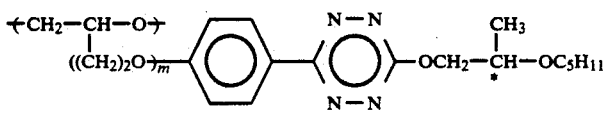
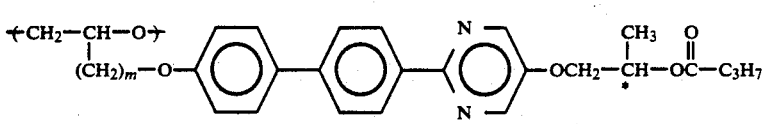

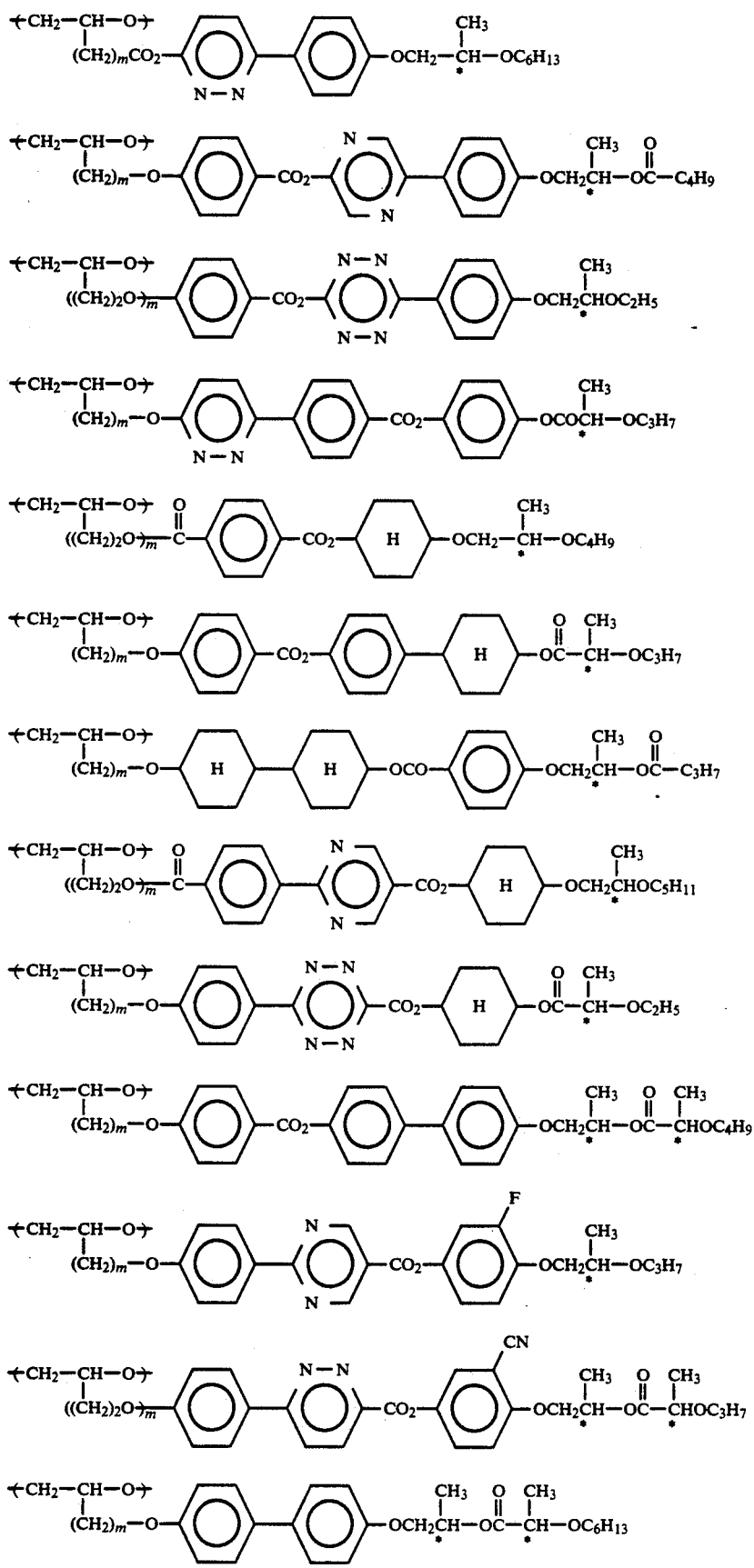

-continued
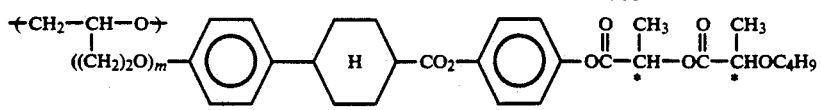
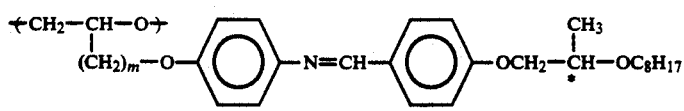
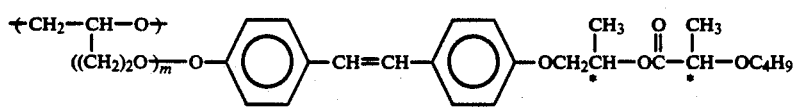
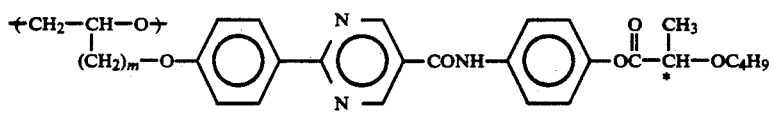
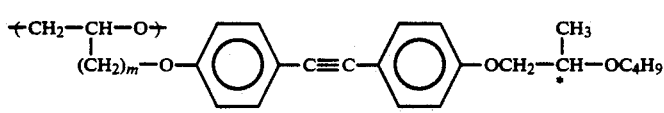
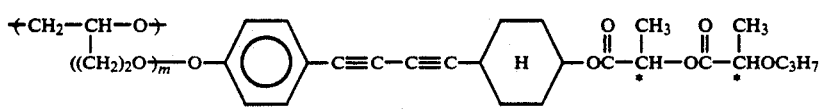
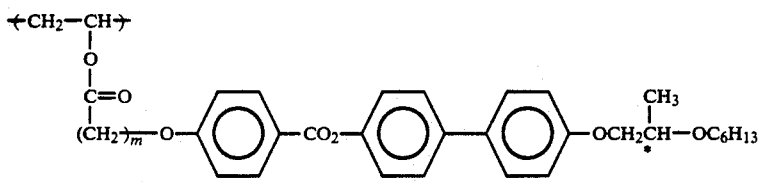
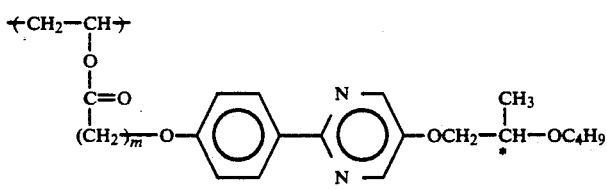
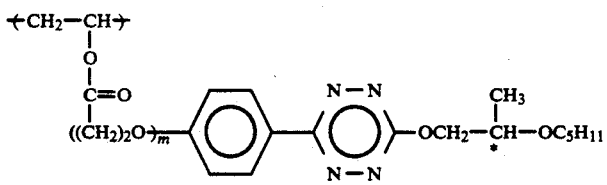
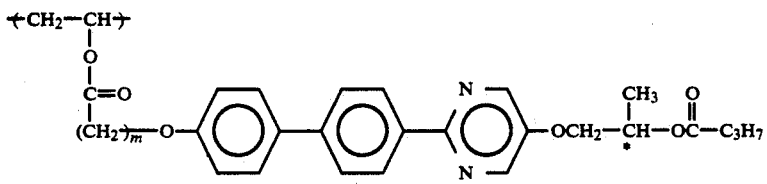
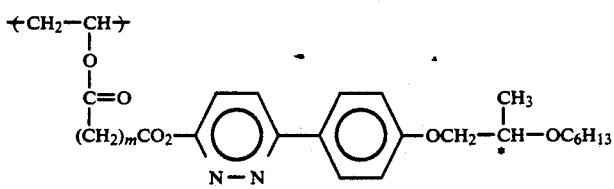

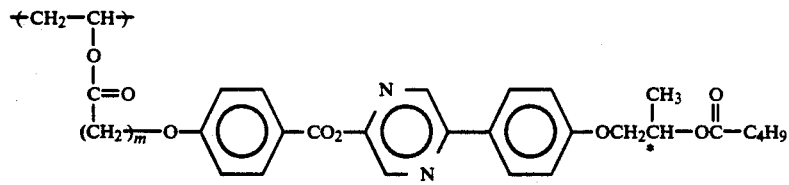
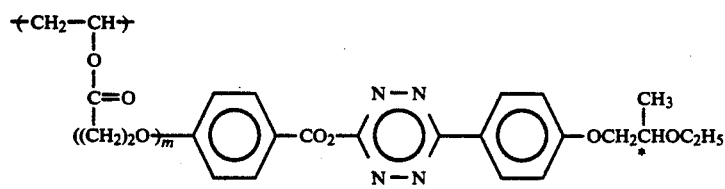
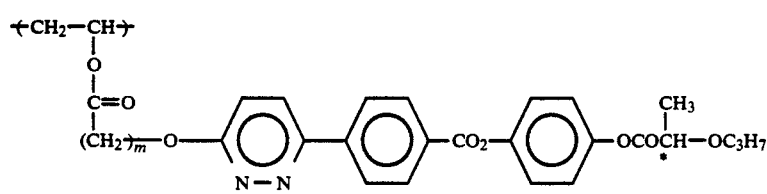
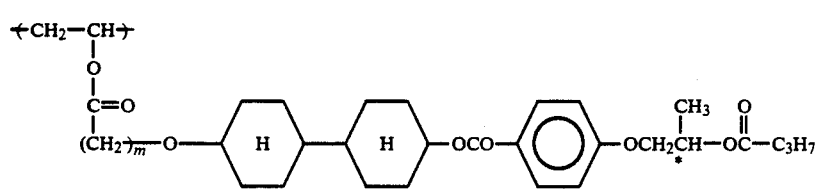
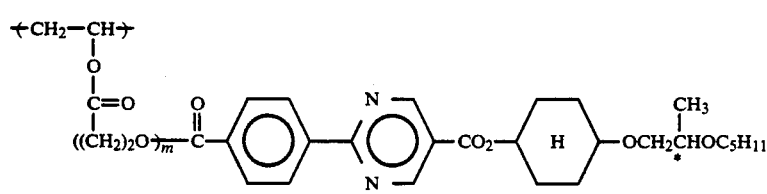
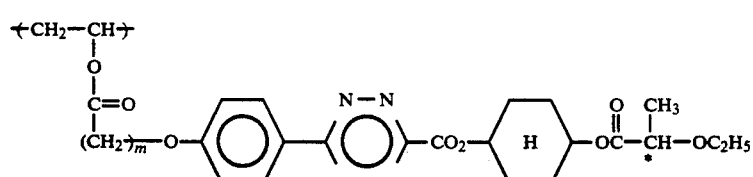
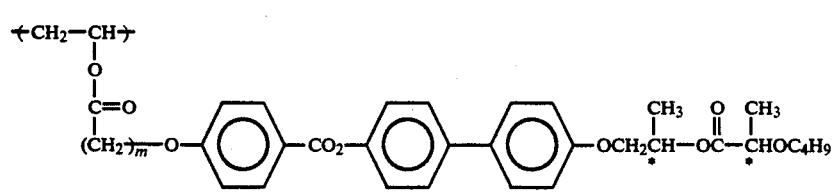
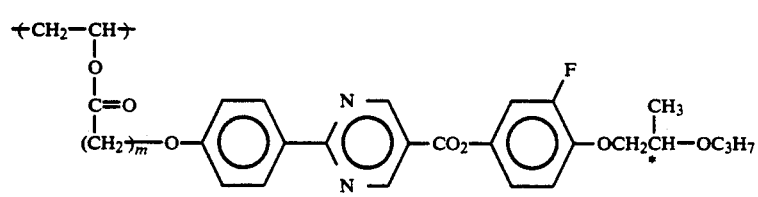

-continued
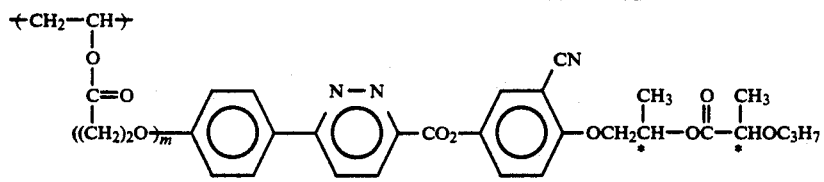
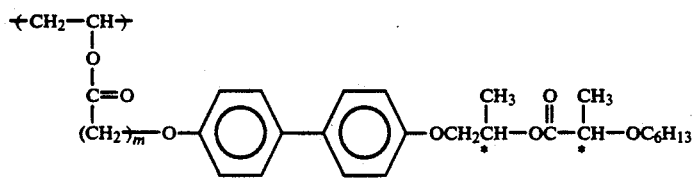
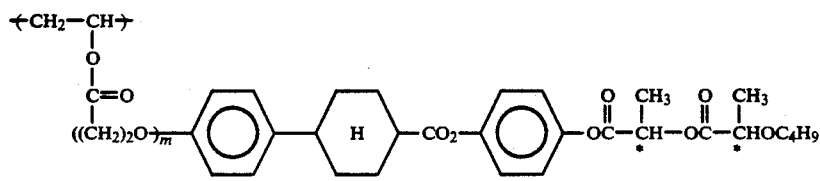
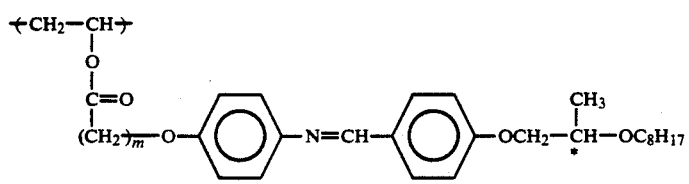
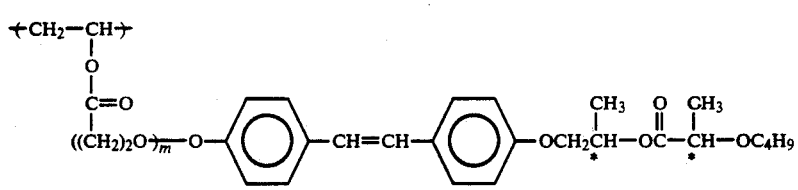
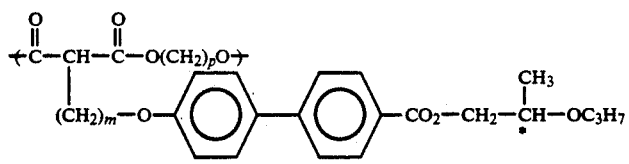
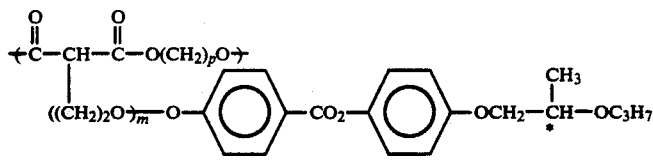
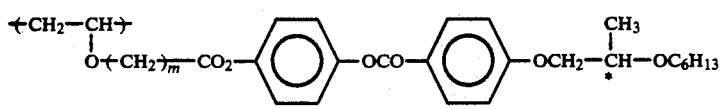
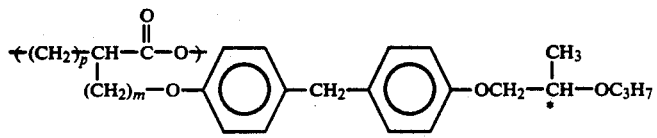
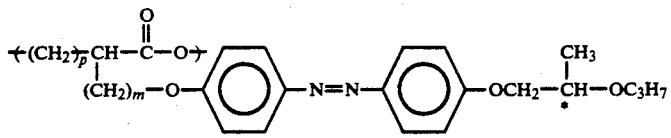

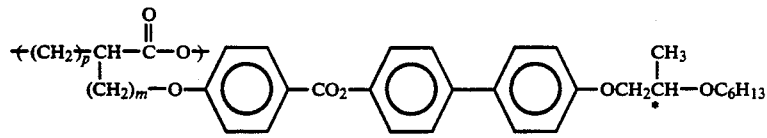
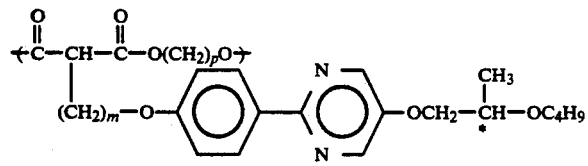
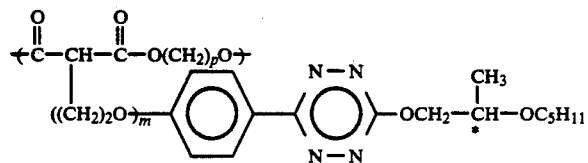
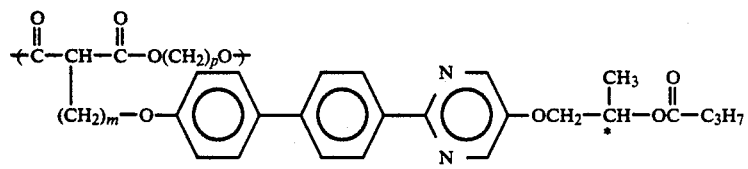
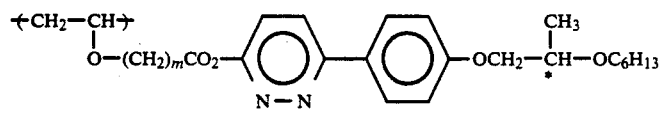
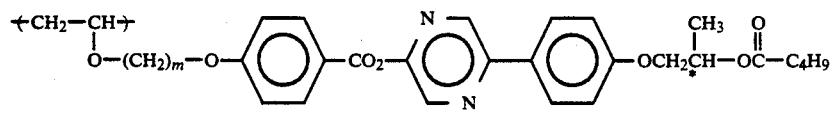
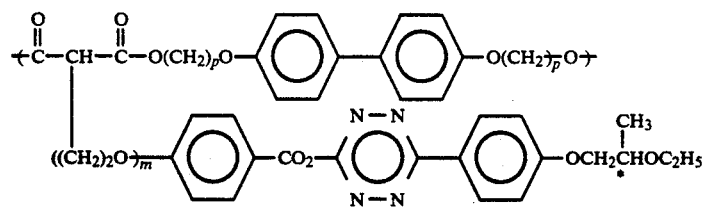
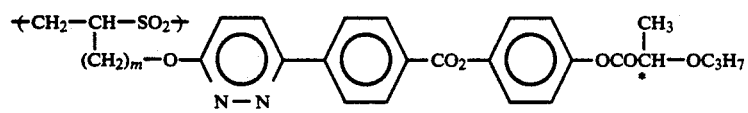
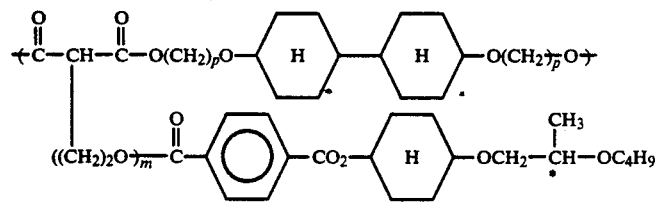

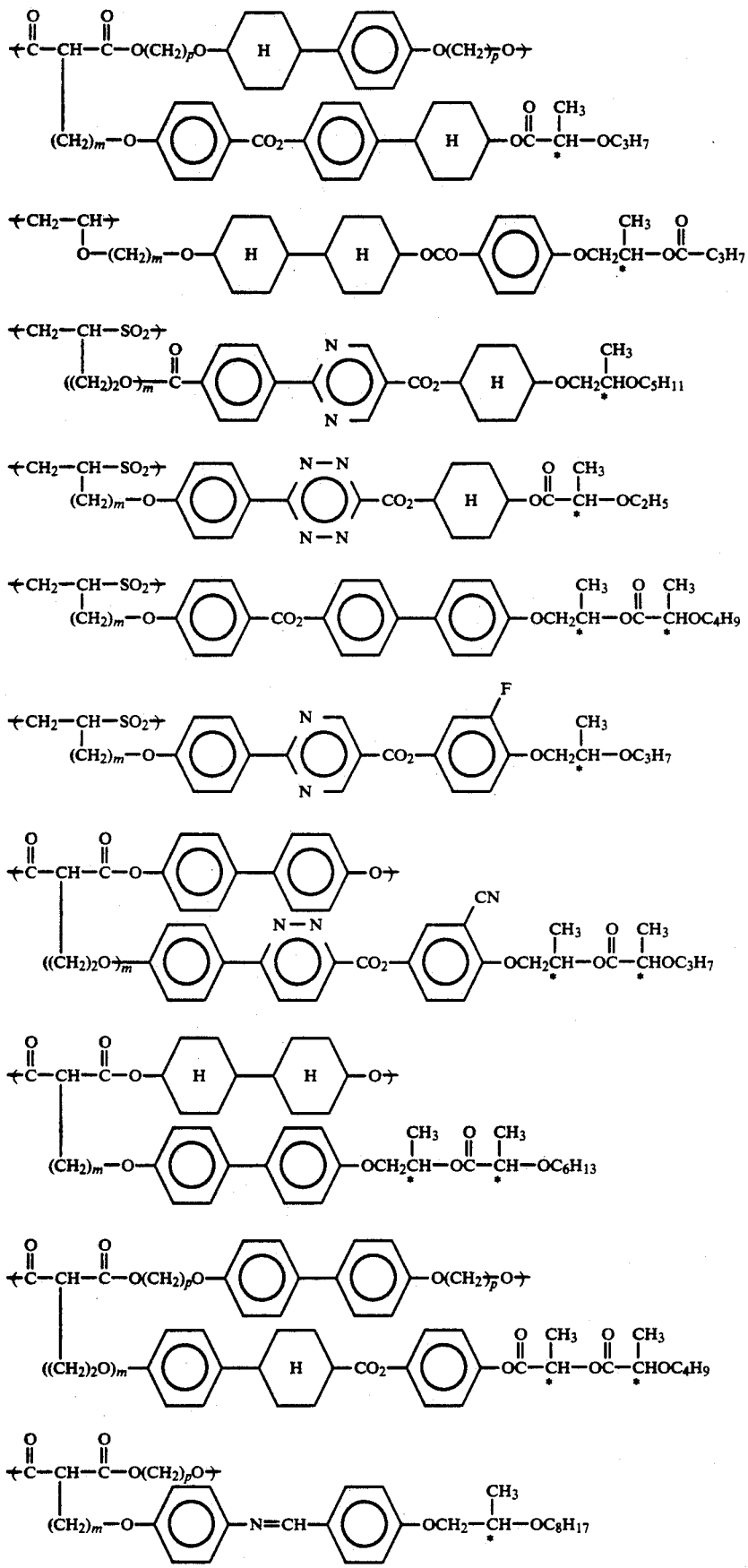

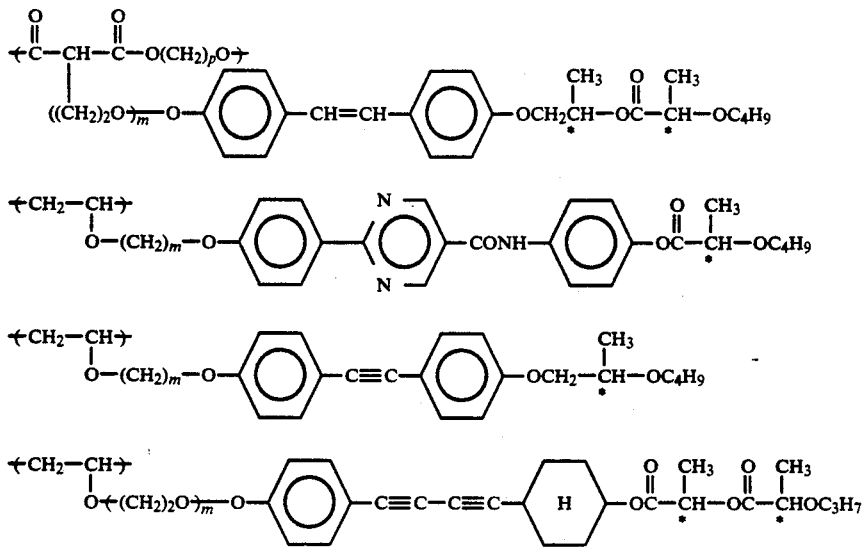

p = 1-20 (integer).

The optically active mesomorphic polymer according to the present invention may be prepared by radical polymerization, anionic polymerization or cationic polymerization of a corresponding monomer, when it is a polyvinyl type or polyoxyalkylene type mesomorphic polymer. The mesomorphic polymer may be prepared by condensation polymerization of corresponding diol and dicarboxylic acid, when it is a polyester type mesomorphic polymer. Further, the mesomorphic polymer may be prepared by grafting a vinyl side chain onto a main chain of polymethylhydrogen-siloxane. The production process of the mesomorphic polymer is not limited to those described above.

The mesomorphic polymer according to the present invention may preferably have a number-average molecular weight of $2 \times 10^3 - 1 \times 10^6$, further preferably $4 \times 10^3 - 5 \times 10^5$. Below $2 \times 10^3$, the mesomorphic polymer has a poor film-forming characteristic to cause a difficulty in forming a coating film. Above $1 \times 10^6$, the mesomorphic polymer is caused to have an increased viscosity and can have a poor responsiveness to an external field.

The thus-obtained mesomorphic polymer is useful as a material for optoelectronics, etc. and may desirably be one forming chiral smectic phase in view of very quick response speed and bistability showing a memory characteristic. Accordingly, the recurring unit represented by the above-mentioned formula (I) may preferably include a chiral group and have a structure which is able to easily assume a smectic phase.

It is generally difficult to control the temperature range of a chiral smectic phase, typically chiral smectic C phase, or to control other phase transition parameters, such as glass transition point. In the mesomorphic polymer according to the present invention, however, it is easy to vary the structure of the characterizing chiral unit from the standpoint of synthesis process. The characterizing chiral unit used in the present invention may for example be formed along the following schemes:

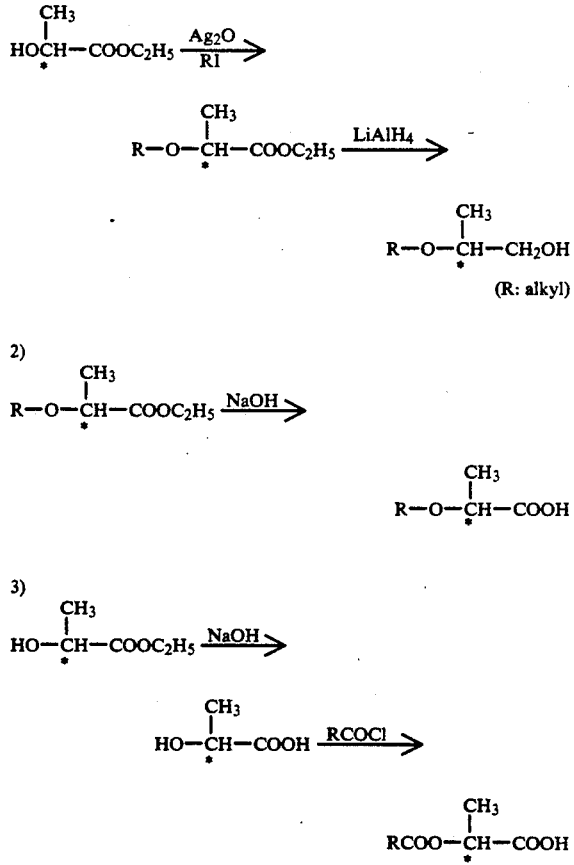

These chiral units are connected with the mesogen unit through, e.g., an ether bond or an ester bond. It is easy to control the structure of such a connecting unit and also to control the length of the terminal alkyl chain, so that it is possible to easily control the phase transition temperature through copolymerization of different monomers or blending of different polymers.

Further, the chiral unit used in the present invention is charged by having an oxygen atom providing a polarity which is directly bonded to the asymmetric carbon atom. This is desirable in view of large spontaneous polarization and response speed. Further, compared with a chiral unit of a hydrocarbon alcohol, such as amyl alcohol, used in a conventional ferroelectric mesomorphic polymer, the characterizing chiral unit used in the mesomorphic polymer of the present invention is rich in flexibility favoring a higher mesomorphicity and a wider mesomorphic temperature range. Further, it provides a low viscosity and a good responsive characteristic.

According to a second aspect, the present invention provides a polymer liquid crystal composition comprising at least one species of the mesomorphic polymer having recurring units represented by the formula (I) as a blend component. Another blend component may be a polymer, another mesomorphic polymer, a low-molecular weight compound or a low-molecular weight mesomorphic compound, preferably a mesomorphic polymer or low-molecular weight mesomorphic compound.

The mesomorphic polymer to be blended with the mesomorphic polymer according to the present invention having recurring units represented by the formula (I) may preferably be one providing a resultant polymer liquid crystal composition showing a chiral smectic phase, further preferably be a mesomorphic polymer which per se shows a chiral smectic phase in view of the control of spontaneous polarization and helical pitch in the chiral smectic phase and the temperature range for the chiral smectic phase.

Such mesomorphic polymers showing ferroelectric chiral smectic phase may be ferroelectric mesomorphic polymers having a chiral unit of a hydrocarbon alcohol, such as amyl alcohol, as disclosed by V. P. Shibaev, et al, Polymer Bulletin, Vol. 12, pp. 299–301; J. C. Dubois, et al, Molecular Crystals and Liquid Crystals, Vol. 137, pp. 349–364; and S. Uchida, et al, Molecular Crystals and Liquid Crystals, Vol. 155, pp. 93–102.

Examples of such ferroelectric mesomorphic polymers showing chiral smectic phase may include those represented by the following structural formulas:

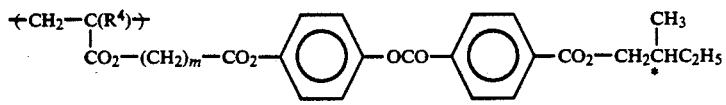

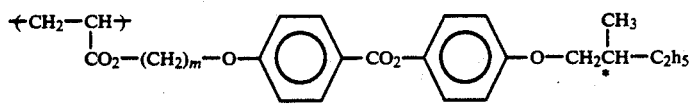

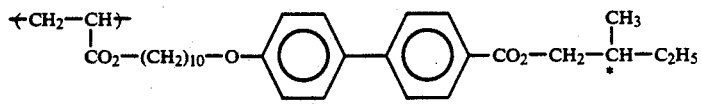

$R^4$ denotes hydrogen, alkyl or halogen.

These ferroelectric mesomorphic polymers may be inclusively referred to as mesomorphic polymers having recurring units represented by the following formula (II):

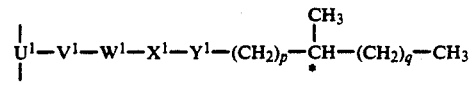

wherein $U^1$ denotes a polymer main chain unit; $V^1$ denotes $-(CH_2)_m-$ or $-((CH_2)_2-O)_m-$ each capable of having a substituent selected from alkyl group, halogen atom, amino group or carbonyl group substituting one or more of the hydrogen atoms wherein m is an integer of 0–30; $W^1$ denotes a single bond, $-O-$, $-OCO-$, $-COO-$, $CONR^1-$, $-CO-$ or $-NR^1-$ wherein $R^1$ denotes hydrogen atom or alkyl group; $X^1$ denotes a mesogen unit comprising at least two rings selected from aromatic carbon rings, aromatic heterocyclic rings and alicyclic rings each capable of having a substituent and connected with a single bond, $-O-$, $-OCO-$, $-COO-$, $-(CH_2)_n-$, $-N=N-$, $-(CH=CH)_m-$, $-CH=N-$, $-N=CH-$, $-(CC)_n-$, $-CONR^1$, $-(CO)_n-$ or $NR^1-$ wherein $R^1$ is the same as defined above and n is an integer of 1–10; $Y^1$ denotes $-O-$, $-COO-$, $-CO-$ or $-NR^1-$ wherein $R^1$ is the same as defined above; * denotes the location of an asymmetric carbon atom; p is an integer of 0–10, and q is an integer of 0–10.

Further to say, in the above formula (II), V denotes a spacer unit, U denotes a polymer main chain unit including a portion connecting with the spacer unit V, X denotes a mesogen unit, W denotes a group bonding the spacer unit V and the mesogen unit, $-(CH_2)_p-CH(CH_3)-(CH_2)_q-CH_3$ denotes a unit including a chiral group, and $Y^1$ denotes a unit connecting the mesogen unit and the chiral unit, and more specifically denotes $-O-$, $-COO-$, $-CO-$ or $NR^1$.

A preferred polymer liquid crystal composition can be obtained by blending a mesomorphic polymer having recurring units represented by the above formula (I) with at least one species of the mesomorphic polymer having recurring units represented by the above formula (II). In this polymer liquid crystal composition, the mesomorphic polymer having recurring units represented by the formula (II) is excellent in mutual solubility with the mesomorphic polymer of the formula (I) and is effective in controlling the temperature range for providing a chiral smectic phase, the spontaneous polarization, etc.

Next, the low-molecular weight mesomorphic compound blended with the side chain-type mesomorphic polymer having recurring units represented by the formula (I) may preferably be one which per shows a chiral smectic phase. Such a low-molecular weight or non-polymeric mesomorphic compound as a component in the polymer liquid crystal composition is preferred so as to improve the mesomorphicity and provide a faster response speed. Specific examples of the low-molecular weight mesomorphic compound may include those represented by the following formulas (1)–(15), which are shown below together with phase transition characteristics. Herein, the respective symbols denote the following phases:

| | |
|---|---|
| Cryst.: | crystal, |
| SmC*: | chiral smectic C phase, |
| SmH*: | chiral smectic H phase, |
| SmA: | smectic A phase, |
| SmB: | smectic B phase, |
| Sm3: | un-identified smectic phase, |
| Ch.: | cholesteric phase, |
| N: | nematic phase, and |
| Iso.: | isotropic phase. |

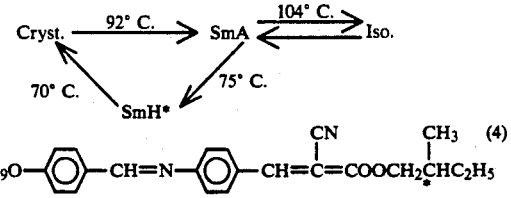

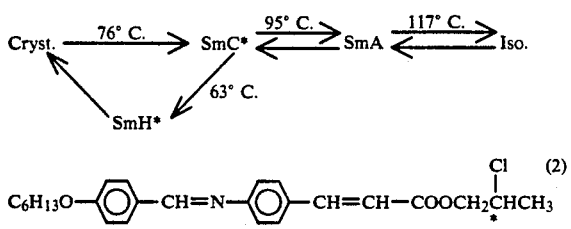

p-decyloxybenzylidene-p'-amino-2-methylbutylcinnamate (DOBAMABC)

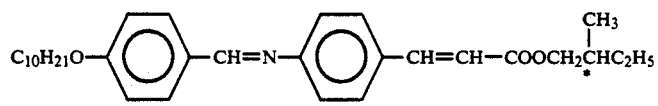

(2)

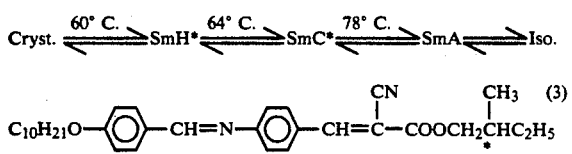

p-hexyloxybenzylidene-p'-amino-2-chloropropylcinnamate (HOBCPC)

Cryst. ⇌ 49° C. SmC* ⇌ 58° C. SmA ⇌ 94° C. Iso.

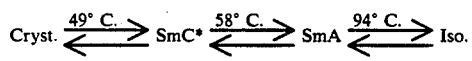

4,4'-azoxycinnamic acid-bis(2-methylbutyl)ester

Cryst. ⇌ 60° C. SmH* ⇌ 64° C. SmC* ⇌ 78° C. SmA ⇌ Iso.

(3) C₁₀H₂₁O—⌬—CH=N—⌬—CH=C—COOCH₂ĊHC₂H₅ with CN and CH₃ p-decyloxybenzylidene-p'-amino-2-methylbutyl-α-cyanocinnamate (DOBAMBCC)

(4) C₁₄H₂₉O—⌬—CH=N—⌬—CH=C—COOCH₂ĊHC₂H₅ with CN and CH₃ p-tetradecyloxybenzylidene-p'-amino-2-methylbutyl-α-cyanocinnamate (TDOBAMBCC)

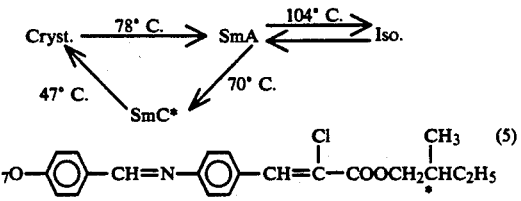

(5) C₈H₁₇O—⌬—CH=N—⌬—CH=C—COOCH₂ĊHC₂H₅ with Cl and CH₃ p-octyloxybenzylidene-p'-amino-2-methylbutyl-α-chlorocinnamate (OOBAMBCC)

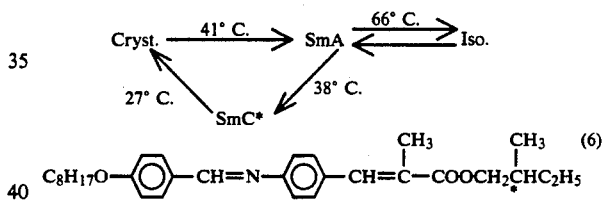

(6) C₈H₁₇O—⌬—CH=N—⌬—CH=C—COOCH₂ĊHC₂H₅ with CH₃ and CH₃ p-octyloxybenzylidene-p'-amino-2-methylbutyl-α-methylcinnamate

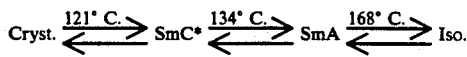

(8) CH₃ | C₂H₅ĊHCH₂O—⌬—CH=N—⌬—C₈H₁₇ with OH

4-O-(2-methylbutyl)resorcylidene-4'-octylaniline (MBRA 8)

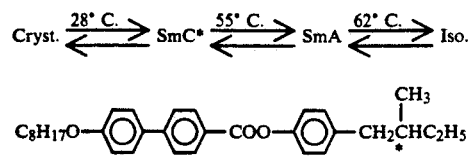
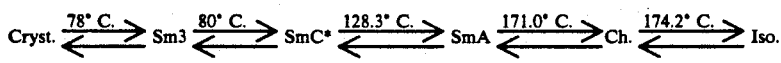

4-(2'-methylbutyl)phenyl-4'-octyloxybiphenyl-4-carboxylate (9)

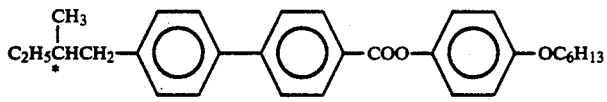

4-hexyloxyphenyl-4-(2''-methylbutyl)biphenyl-4'-carboxylate (10)

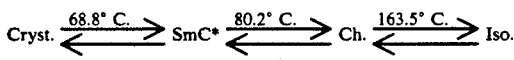
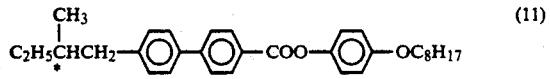

4-octyloxyphenyl-4-(2''-methylbutyl)biphenyl-4'-carboxylate (11)

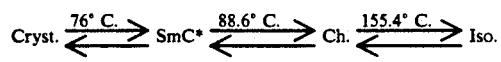
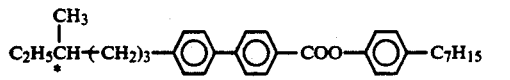

4-heptylphenyl-4-(4''-methylhexyl)biphenyl-4'-carboxylate (12)

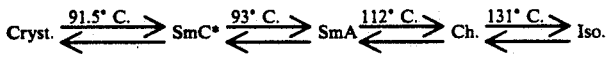
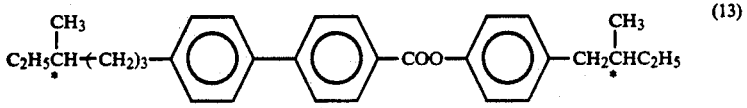

4-(2''-methylbutyl)phenyl-4-(4''-methylhexyl)biphenyl-4'-carboxylate (13)

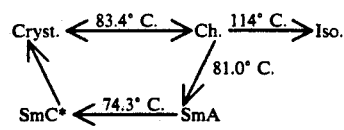
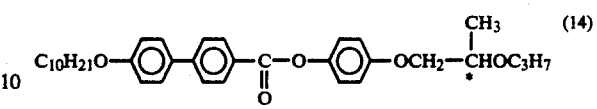

(14)

4-(2'-propyloxypropyl)oxyphenyl-4-decyloxy)-biphenyl-4'-carboxylate

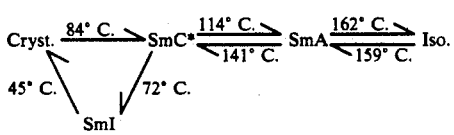
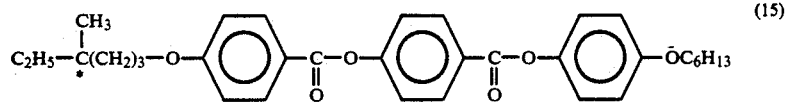

(15)

(4'-(4-hexyloxy)phenyloxycarbonyl)phenyl-p-(4''-methylhexyloxy)benzoate

The mesomorphic polymer of the formula (I) may preferably be contained in a proportion of 5 wt. % or more, further preferably 10 wt. % or more, most preferably 15-95 wt. %, in the polymer liquid crystal composition according to the present invention. Below 5 wt. %, there can result in insufficient formability, strength and film forming characteristic.

Further, the polymer liquid crystal composition according to the present invention may preferably contain 10-99 wt. %, further preferably 15-90 wt. % of low-molecular weight mesomorphic compound or the mesomorphic polymer of the above formula (II).

Further, the mesomorphic polymer or the polymer liquid crystal composition according to the present invention may be used together with an additive, such as a colorant, a photo-stabilizer, a plasticizer, and a photo-absorber added thereto.

The mesomorphic copolymer according to the third aspect of the present invention is also characterized by having recurring units represented by the above formula (I). Examples of the recurring units represented by the formula (I) are the same as in the mesomorphic polymer according to the first aspect of the present invention. The mesomorphic copolymer according to the present invention may be composed of two or ore types of recurring units represented by the formula (I) or may be composed of a type of recurring units represented by the formula (I) and another type of recurring units. Examples of such another type of recurring units may include those of the formula (II) and also the following:

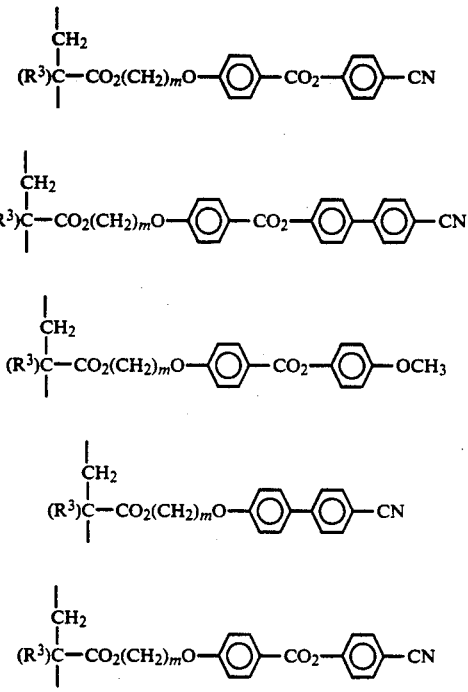

$R^3$: H, alkyl or halogen.

The optically active mesomorphic copolymer according to the present invention may be prepared by radical polymerization, anionic polymerization or cationic polymerization of a plurality of corresponding monomers, when it is a polyvinyl type or polyoxyalkylene type mesomorphic copolymer. The mesomorphic copolymer may be prepared by condensation polymerization of corresponding diol and dicarboxylic acid, at least one of which is used in plural species, when it is a polyester type mesomorphic copolymer. Further, the mesomorphic copolymer may be prepared by grafting a plurality of vinyl side chains onto a main chain of polymethylhydrogensiloxane. The mesomorphic copolymer may assume any form of block copolymer, alternating copolymer or random copolymer.

In the mesomorphic copolymer according to the present invention, the recurring units represented by the formula (I) may preferably be contained in a proportion of 5-95 mol. %, further preferably 10-90 mol. %. Below 5 mol. %, a noticeable advantageous effect on spontaneous polarization or responsiveness. Further, in order to show the effect of copolymerization, it is desirable that a single type of recurring units represented by the formula (I) does not exceed 95 mol. % in the mesomorphic copolymer.

The mesomorphic copolymer according to the present invention may preferably have a number-average molecular weight of $2 \times 10^3 - 1 \times 10^6$, further preferably $4 \times 10^3 - 5 \times 10^5$. Below $2 \times 10^3$, the mesomorphic copolymer has a poor film-forming characteristic to cause a difficulty in forming a coating film. Above $1 \times 10^6$, the mesomorphic copolymer is caused to have an increased viscosity and can have a poor responsiveness to an external field.

The thus-obtained mesomorphic copolymer is useful as a material for optoelectronics, etc. and may desirably be one forming chiral smectic phase in view of very quick response speed and bistability showing a memory characteristic. Accordingly, the recurring unit represented by the above-mentioned formula (I) may preferably include a component which essentially shows chiral smectic phase.

The mesomorphic copolymer according to the present invention is characterized by having recurring units represented by the formula (I), it has advantages such as easy control of mesomorphic temperature range, a high degree of mesomorphicity, a large spontaneous polarization and a low viscosity. It is possible that conventional mesomorphic polymers each comprising a single type of recurring units fail to provide a uniform polymer liquid crystal composition. Even in such a case, it is possible to provide a uniform mesomorphic copolymer by copolymerizing corresponding monomers and the mesomorphic copolymer can have a controlled mesomorphic temperature range according to the present invention. Further, it is also possible to have a mesomorphic copolymer having a sufficiently long helical pitch by copolymerizing plural species of monomers having different helical rotation directions.

According to a fourth aspect, the present invention provides a polymer liquid crystal composition comprising at least one species of the mesomorphic copolymer having recurring units represented by the formula (I) as a blend component. Another blend component may be a polymer, another mesomorphic polymer, a low-molecular weight compound or a low-molecular weight mesomorphic compound, preferably a mesomorphic polymer or low-molecular weight mesomorphic compound.

The mesomorphic polymer to be blended with the mesomorphic copolymer according to the present invention having recurring units represented by the formula (I) may preferably be one providing a resultant polymer liquid crystal composition showing a chiral smectic phase, further preferably be a mesomorphic polymer which per se shows a chiral smectic phase in view of control of spontaneous polarization and helical pitch in the chiral smectic phase and the temperature range for the chiral smectic phase.

For the same reason, the low-molecular weight mesomorphic compound blended with the mesomorphic copolymer according to the present invention may preferably be one showing chiral smectic phase.

Specific examples of the mesomorphic polymer and low-molecular weight mesomorphic compound for blending may include those mesomorphic polymers and low-molecular weight mesomorphic compounds (1)–(15) enumerated in connection with the polymer liquid crystal composition according to the second aspect.

The mesomorphic copolymer of the formula (I) may preferably be contained in a proportion of 5 wt. % or more, further preferably 10 wt. % or more, most preferably 15-80 wt. %, in the polymer liquid crystal composition according to the present invention. Below 5 wt. %, there can result in insufficient formability, strength and film forming characteristic.

Further, the mesomorphic copolymer or the polymer liquid crystal composition according to the present invention may be used together with an additive, such as a colorant, a photo-stabilizer, a plasticizer, and a photo-absorber added thereto.

According to a fifth aspect, the present invention provides a polymer liquid crystal device, which comprises a substrate, and a layer of the mesomorphic polymer or mesomorphic copolymer having recurring units of the formula (I) or the polymer liquid crystal composition containing the mesomorphic polymer or mesomorphic copolymer disposed in an aligned form on the substrate. The layer of the mesomorphic polymer, mesomorphic copolymer or the polymer liquid crystal composition may be formed as by coating or application on a substrate of an arbitrary material, such as glass, plastic or metal. The substrate may be provided with a transparent electrode or a patterned electrode of ITO film etc.

The liquid crystal layer may be subjected to an appropriate aligning treatment, examples of which may include the following. A: Homogeneous alignment (molecular axes of liquid crystal molecules are aligned in parallel with a substrate surface)

(1) Rubbing Method

A substrate is coated with an alignment control film by forming a film of e.g. an inorganic insulating substance, such as silicon monoxide, silicon dioxide, aluminum oxide, zirconia, magnesium fluoride, cerium oxide, cerium fluoride, silicon nitride, silicon carbide or boron nitride; or an organic insulating substance, such as polyvinyl alcohol, polyimide, polyamideimide, polyesterimide, polyparaxylylene, polyester, polycarbonate, polyvinylacetal, polyvinylchloride, polyamide, polystyrene, cellulosic resin, melamine resin, urea resin or acrylic resin, by application of a solution, vapor deposition or sputtering. The alignment control film formed as a film of an inorganic insulating substance or organic insulating substance as described above may then be rubbed in one direction with velvet, cloth or paper on the surface thereof.

(2) Oblique Vapor Deposition

An oxide such as SiO, a fluoride, or a metal such as Au or Al or its oxide, is vapor-deposited on a substrate in a direction forming an angle inclined with respect to the substrate.

(3) Oblique Etching

An organic or inorganic insulating film as described in (1) above formed on a substrate is etched by radiation with an ion beam or oxygen plasma incident in an oblique direction.

(4) Use of a Stretched Polymer Film

A film of obtained by stretching a film of a polymer such as polyester or polyvinyl alcohol also shows a good orientation characteristic.

(5) Grating

Grooves are formed on a substrate surface by photolithography, stamping or injection.

(6) Shearing

The mesomorphic polymer or its composition is aligned by applying a shearing force thereto at or above a temperature giving a liquid crystal state.

(7) The mesomorphic polymer or its composition is aligned by uniaxial or biaxial stretching. It is also possible to apply co-stretching with a substrate of a plastic, such as polyester or polyvinyl alcohol. B. Homogeneous alignment (molecular axes of liquid crystal molecules are aligned perpendicularly to a substrate surface)

(1) Formation of a Homeotropic Alignment Film

A substrate surface is coated with a layer of an organic silane, lecithin or PTFE (polytetrafluoroethylene) having a homeotropic orientation characteristic.

(2) Oblique Vapor Deposition

Oblique vapor deposition is performed on a substrate while the substrate is rotated and the vapor deposition angle is appropriately selected to provide a homeotropic orientation characteristic. Further, it is also possible to apply a homeotropic aligning agent as shown in (1) above after the oblique vapor deposition.

A switching device, for example, may be obtained by applying a counter substrate having an electrode onto the liquid crystal layer which has been subjected to an aligning treatment as described above. Alternatively, the mesomorphic polymer or polymer liquid crystal composition in a molten state can be injected into a cell structure having electrodes or both sides through an injection port to form a liquid crystal device.

The thus obtained polymer liquid crystal device may be used as a display device or a memory device. A polymer liquid crystal device incorporating a mesomorphic polymer, mesomorphic copolymer or polymer liquid crystal composition showing a ferroelectric chiral smectic phase affords high-speed switching and can be used as a large area display device or memory device with a good memory characteristic because of bistability. In order to realize such bistability, the liquid crystal layer may be set thin, e.g., 10 microns or less.

According to a sixth aspect, the present invention provides a monomeric mesomorphic compound represented by the following formula (III):

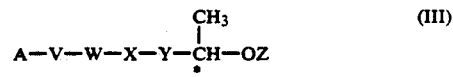

(III)

In the above formula (III), A denotes a unit providing a polymer main chain through polymerization or a unit capable of connecting with a polymer main chain through grafting and more specifically denotes

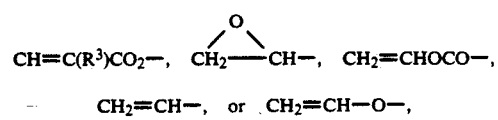

wherein $R^3$ denotes hydrogen, alkyl or halogen.

V denotes a unit called a spacer after polymerization, X denotes a mesogen unit, W denotes a group bonding the spacer unit V and the mesogen unit, $$-\overset{*}{C}H(CH_3)OZ$$

denotes a unit including a chiral group, and Y denotes a unit connecting the mesogen unit and the chiral unit.

Specific examples and preferred examples of the units V, W, X and Y are the same as in the formula (I) described above.

The monomeric mesomorphic compound of the above formula (III) may be prepared along various schemes, examples of which are shown below:

i)

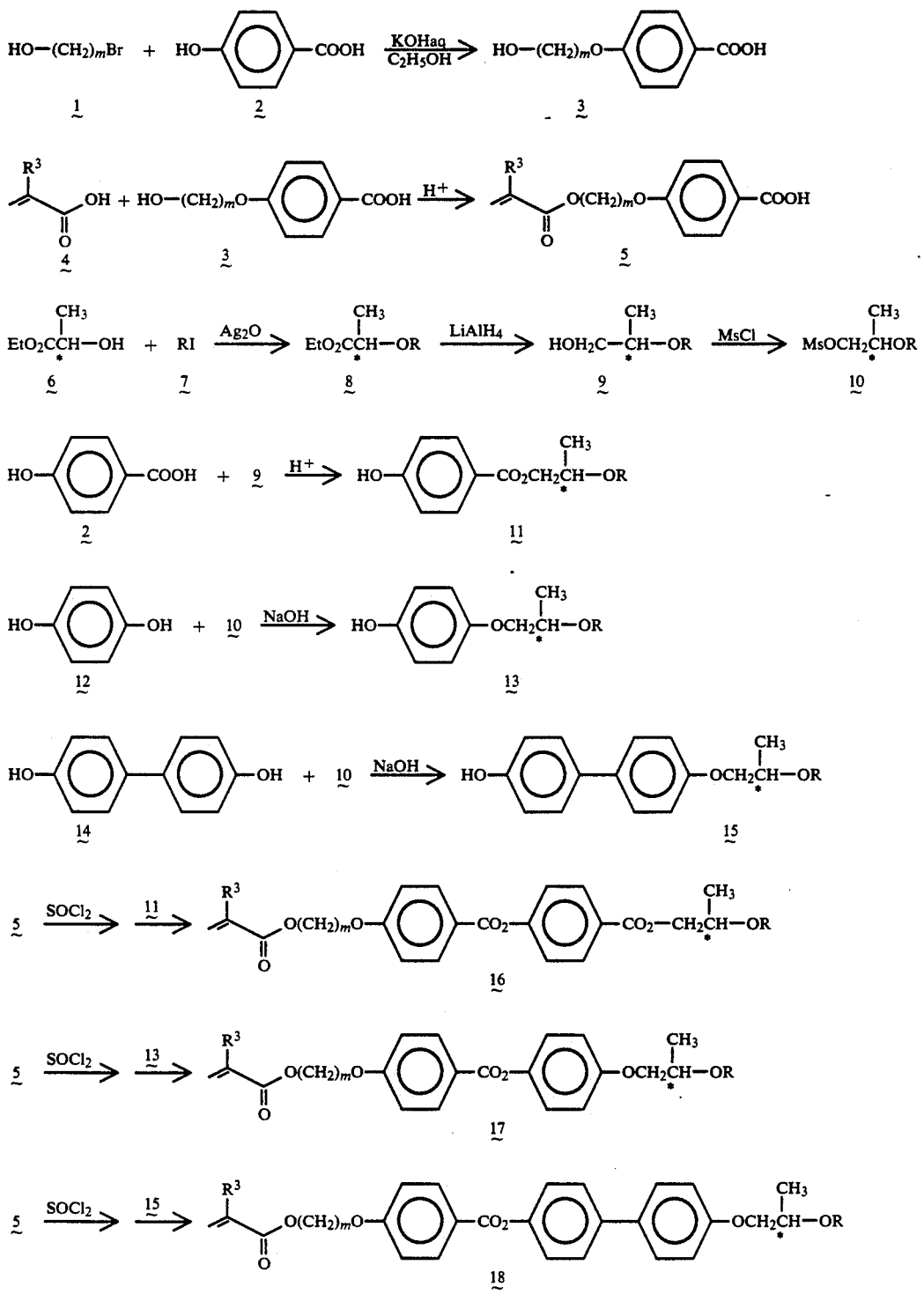

ii)

-continued
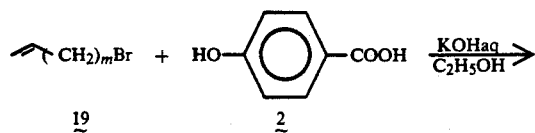
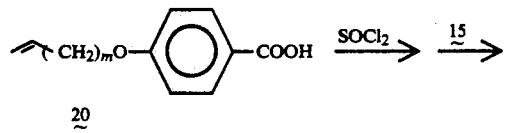
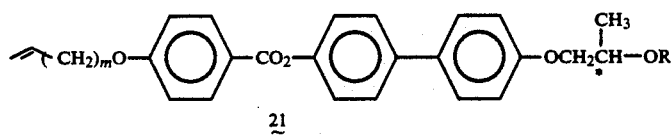
iii)
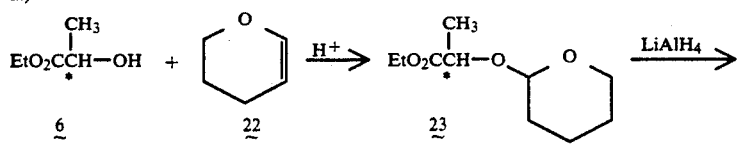
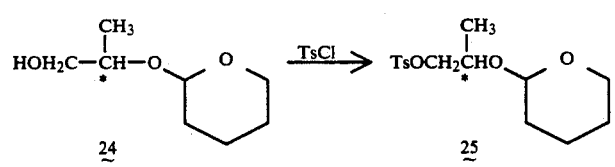
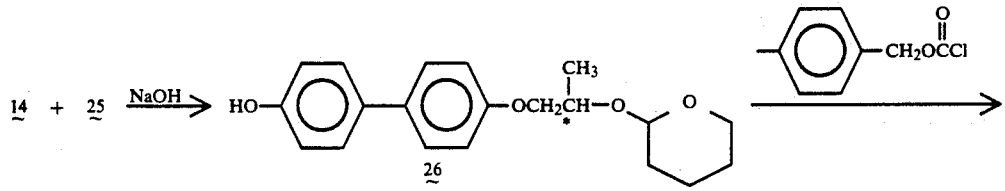
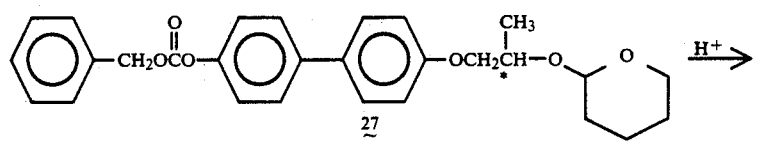
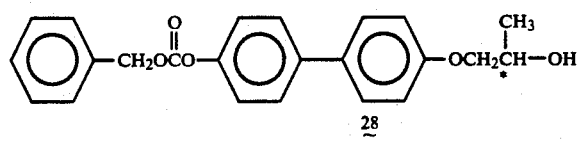
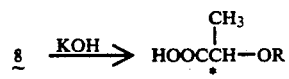
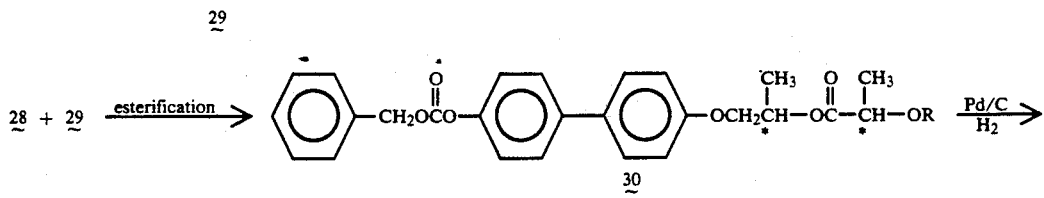

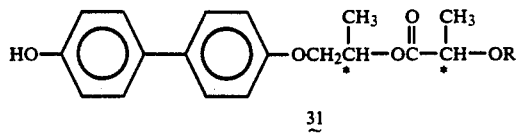
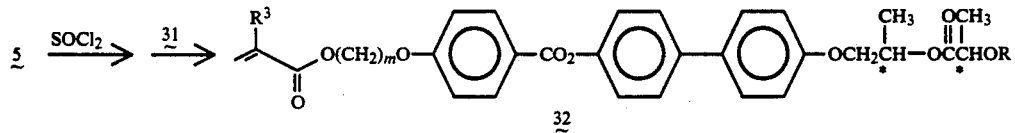
The following monomeric mesomorphic compounds, for example, may be synthesized in the above described manner.
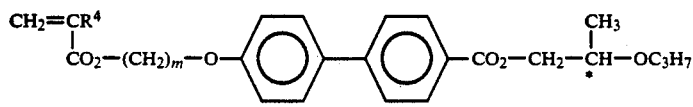
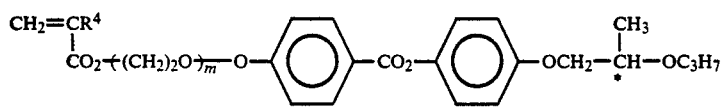
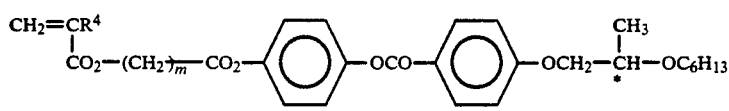
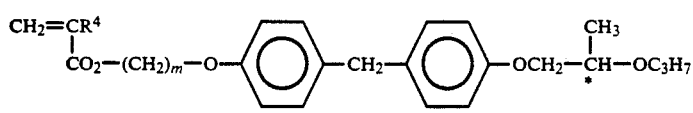
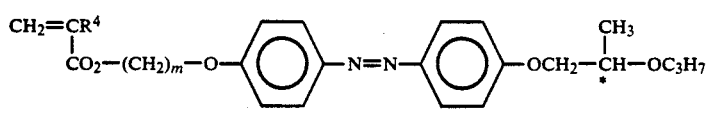
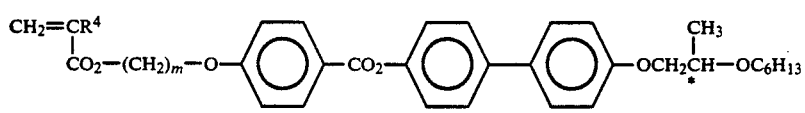
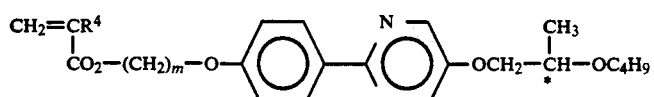
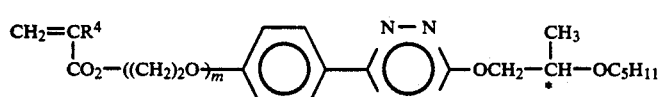
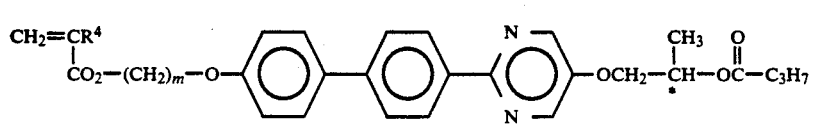
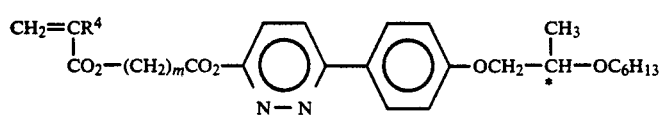

-continued
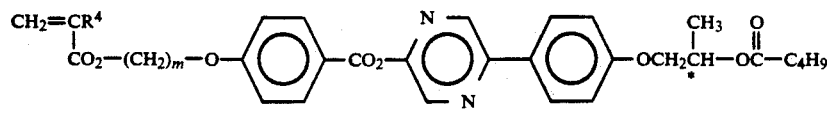
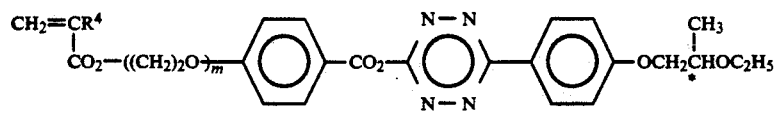
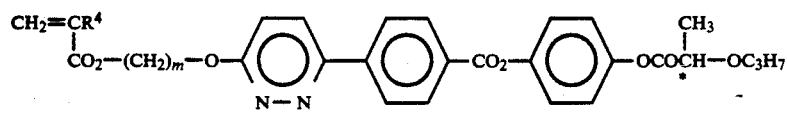
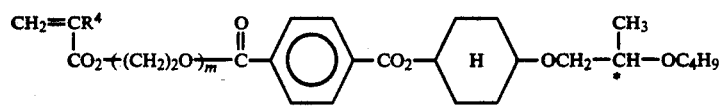
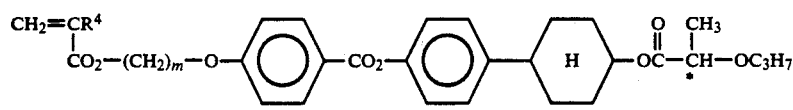
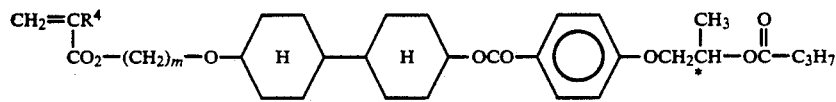
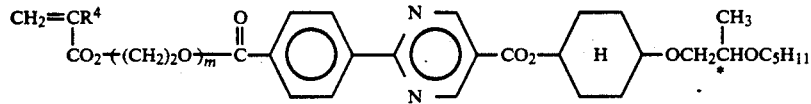
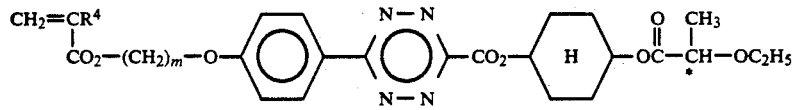
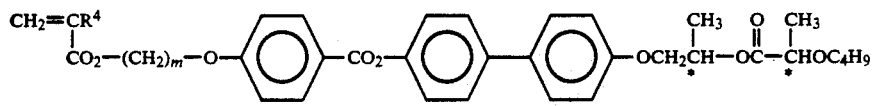
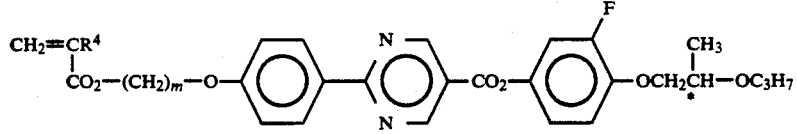
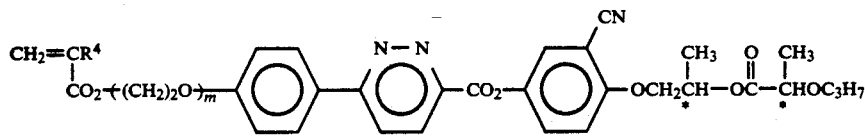
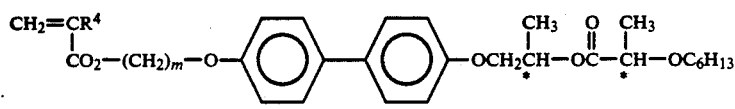
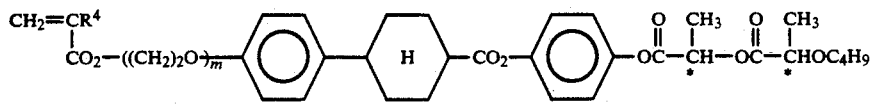

-continued
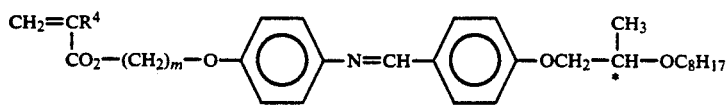
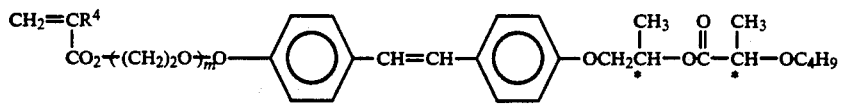
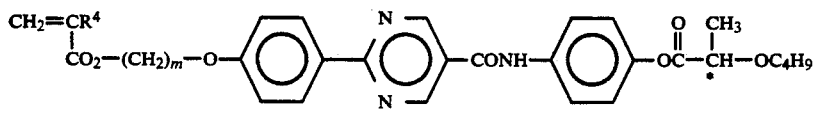
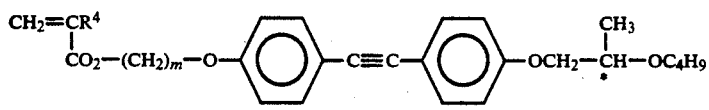
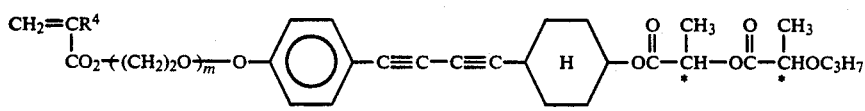
R[4]: H, alkyl or halogen
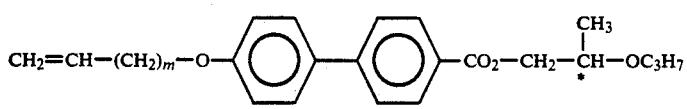
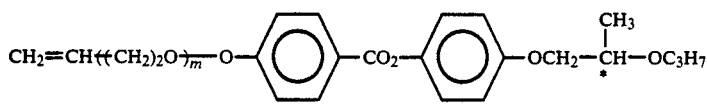
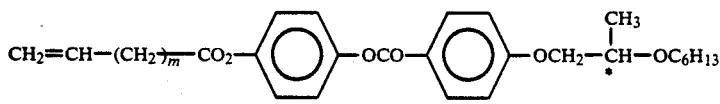
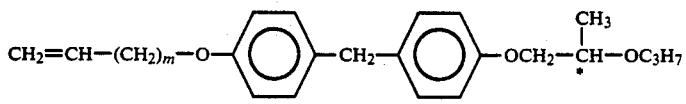
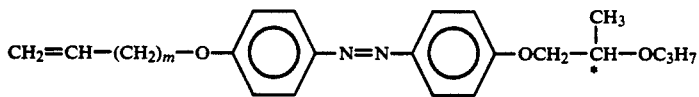
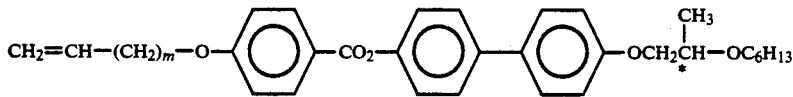
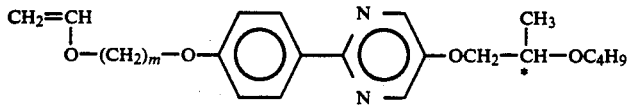
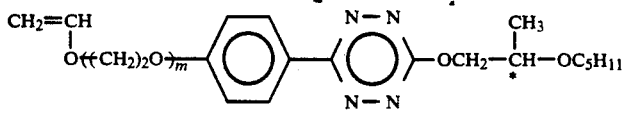

-continued
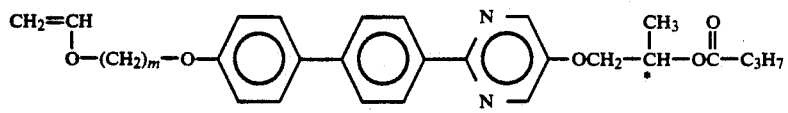
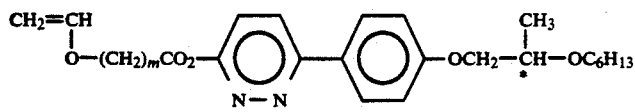
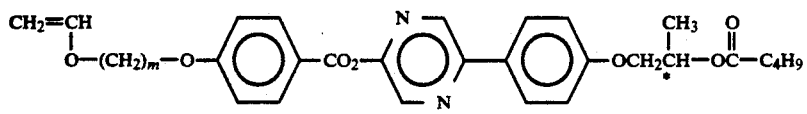
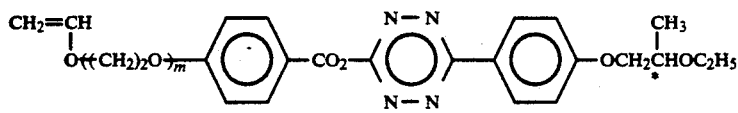
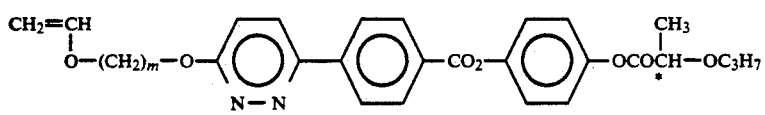
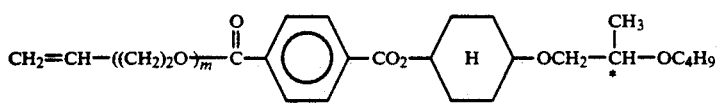
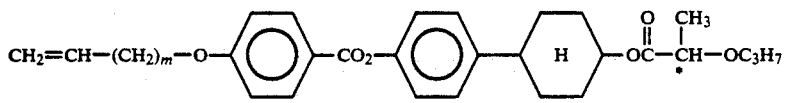
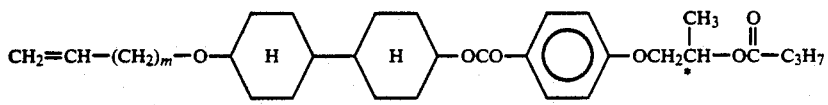
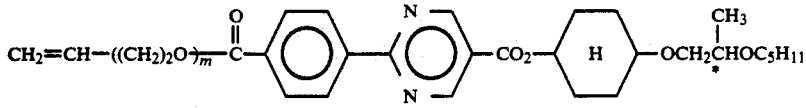
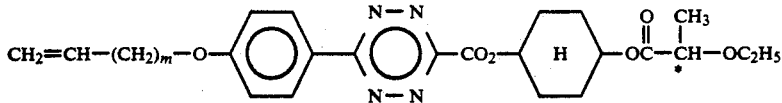
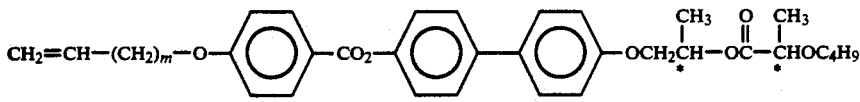
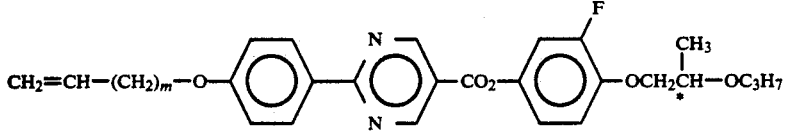
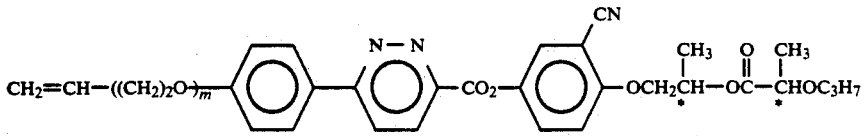

-continued

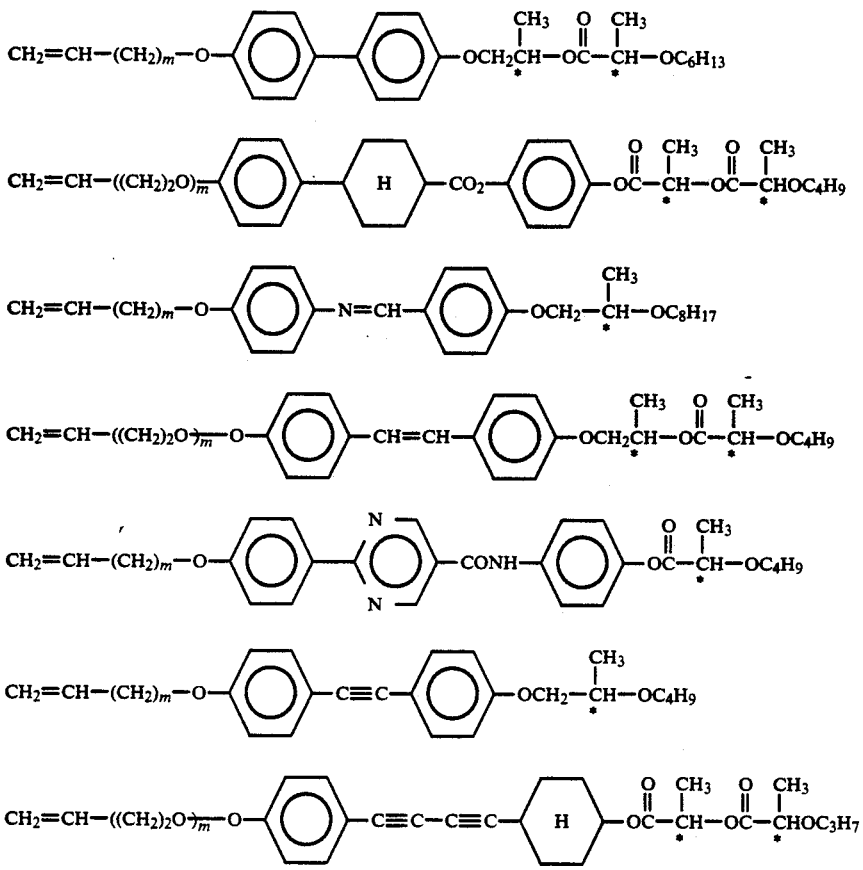

The monomeric mesomorphic compound represented by the above formula (III) is easy to control its phase transition temperature and has a large spontaneous polarization to provide a good responsiveness for the same reason as the mesomorphic polymer of the formula (I). Further, the mesomorphic compound has advantageous features such as a broad mesomorphic temperature range and a low viscosity, so that it is useful as a bistable low-molecular weight ferroelectric liquid crystal material. Further, the mesomorphic compound is also useful as a material to be blended with a mesomorphic polymer and shows a particularly good mutual solubility with the mesomorphic polymer obtained by polymerization thereof. Even if the mesomorphic compound alone does not show chiral smectic C phase, it can be effectively used as a component of a liquid crystal composition.

According to a seventh aspect, the present invention provides a liquid crystal composition containing a monomeric mesomorphic compound represented by the formula (III). The mesomorphic compound may be blended with a polymer, a mesomorphic polymer, a low-molecular weight compound, or a low-molecular weight mesomorphic compound. Particularly, a mesomorphic polymer or a low-molecular weight mesomorphic compound is preferred.

The mesomorphic polymer to be blended may for example be the mesomorphic polymer or mesomorphic copolymer having recurring units represented by the above formula (I) or (II). The low-molecular weight mesomorphic compound may for example be mesomorphic compounds represented by the above formulas (1)–(15). The mesomorphic compound of the formula (III) may desirably be contained in a proportion of ordinarily 5–90 wt. %, preferably 10–85 wt. %. Below 5 wt. %, it is possible that the good responsiveness attained by the compound is not remarkably exhibited. Above 90 wt. %, it is possible that the composition does not show a difference in physical property over the compound alone.

The mesomorphic compound or the liquid crystal composition according to the present invention may be used together with an additive, such as a colorant, a photo-stabilizer, a plasticizer, and a photo-absorber added thereto.

According to an eighth aspect, the present invention provides a liquid crystal device, which comprises a substrate, and a layer of the mesomorphic compound of the formula (III) or the liquid crystal composition containing the mesomorphic compound disposed in an aligned form on the substrate. The layer of the mesomorphic compound or the liquid crystal composition may be formed as by coating or application on a substrate of an arbitrary material, such as glass, plastic or metal. The substrate may be provided with a transparent electrode or a patterned electrode of ITO film, etc.

The liquid crystal layer may be subjected to an appropriate aligning treatment and to a device formation similarly as in the case of the above-described polymer liquid crystal device which some of the aligning treatments (e.g., stretching of a liquid crystal layer per se) may not be equally applicable.

As described above, the optically active mesomorphic polymer according to the present invention provides a ferroelectric polymer liquid crystal in chiral smectic phase as different from conventional polymer liquid crystals in nematic or smectic phase, and it becomes possible to provide a large area liquid crystal device having a high-speed switching mechanism.

In addition to the above-described characteristics of the mesomorphic polymer, the mesomorphic copolymer according to the present invention can assume a form wherein side chain units having different properties are uniformly distributed so that the mesomorphic temperature range, the helical pitch, etc., can be controlled.

Further, the polymer liquid crystal composition according to the present invention, particularly one comprising the above-mentioned optically active mesomorphic polymer or mesomorphic copolymer and a mutually soluble compound (especially, a low-molecular weight mesomorphic compound), is able to provide a liquid crystal device in a large area and also provide a response speed comparable to that attained by a low-molecular weight liquid crystal due to a decrease in viscosity, etc.

Further, the monomeric mesomorphic compound or liquid crystal composition containing the mesomorphic compound according to the present invention has advantageous characteristics, such as good responsiveness and a wide mesomorphic temperature range and is useful as a low-molecular weight bistable ferroelectric liquid crystal material, a material to be blended with a polymer liquid crystal, etc.

Hereinbelow, the present invention will be explained based on Examples, but it is to be understood that the present invention is not restricted to these Examples.

EXAMPLE 1

A polymer having the following recurring unit structure and a monomer thereof were synthesized through the steps described below.

ture was then acidified, extracted with ethyl acetate and purified by column chromatography to obtain 5.3 g of the product (Yield: 57 %).

STEP 3

Synthesis of 4-(6-acryloyloxyhexyloxy)benzoic acid (1c)

4.8 g of 4-(6-hydroxyhexyloxy)benzoic acid and 5.8 g of acrylic acid were heat-refluxed for 40 hours together with 1 ml of sulfuric acid in the presence of hydroquinone in benzene, followed by distilling-off of the solvent and recrystallization to obtain 3.2 g of the product. (Yield: 55 %)

STEP 4

Synthesis of 2-methyl-2-propyloxyethyl 4-[4-(6-acryloyloxyhexyloxy)benzoyloxy]benzoate (1d)

2.9 g of 4-(6-acryloxyhexyloxy)benzoic acid was heat-refluxed for 2 hours in 10 ml of thionyl chloride in the presence of 2,6-di-t-butylphenol, followed by distilling-off of the thionyl chloride. Anhydrous THF and triethylamine were added to the reaction mixture, and a solution of 1.6 g of 2-methyl-2-propyloxyethyl 4-hydroxybenzoate in THF was added dropwise thereto at 0° C., followed by 4 hours of stirring at 50° C. The reaction mixture was subjected to extraction with ethyl acetate and column chromatography to obtain 1.8 g of the product. (Yield: 59 %)

POLYMERIZATION STEP 0.50 g of 2-methyl-2-propyloxyethyl 4-(4'-(6-acryloyloxyhexyloxy)benzoyloxy]benzoate and 3 mol. % of AIBN in dry toluene were evacuated under freezing and then reacted for 24 hours at 60° C. The product was repeatedly re-precipitated in methanol to obtain 0.36 g of the objective polymer (1e). (Yield: 72 %)

Number-average molecular weight (Mn)=8100

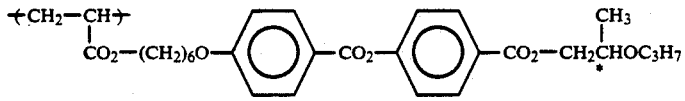

STEP 1

Synthesis of 2-methyl-2-propyloxyethyl 4-hydroxybenzoate (1a)

3.2 g of p-hydroxybenzoic acid and 13.8 g of optically active 2-methyl-2-propyloxyethanol were refluxed under heating together with 1 ml of sulfuric acid in benzene for 20 hours. The reaction liquid was condensed and purified by column chromatography to obtain 5.0 g (yield: 90 %) of the product.

STEP 2

Synthesis of 4-(6-hydroxyhexyloxy)benzoic acid (1b)

5.4 g of p-hydroxybenzoic acid was added to ethanol-dioxane mixture solvent, and an aqueous solution containing 6.6 g of potassium hydroxide was added thereto, followed by dropwise addition of 7.9 g of 6-bromohexanol and 12 hours of heat refluxing. The reaction mix- Weight-average molecular weight (Mw)=10600
Phase transition temperature (° C.)

Ch.: cholesteric phase
Iso.: isotropic phase

EXAMPLE 2

A polymer having the following recurring unit structure and a monomer thereof were synthesized through the steps described below.

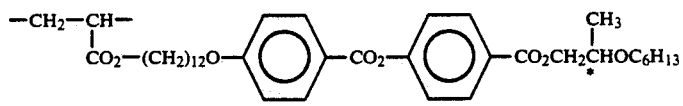

STEP 1

Synthesis of 2-methyl-2-hexyloxyethyl 4-hydroxybenzoate (2a)

6.2 g of the product was obtained from 3.2 g of 4-hydroxybenzoate and 18.7 g of optically active 2-methyl-2-hexyloxyethanol in the same manner as in Step 1 of Example 1 described above. (Yield: 91 %)

STEP 2

Synthesis of 4-(12-hydroxydodecanyloxy)benzoic acid (2b)

7.3 g of the product was obtained from 5.4 g of p-hydroxybenzoic acid and 12.5 g of 12-bromododecanol in the same manner as in Step 2 of Example 1. (Yield: 58 %)

STEP 3

Synthesis of 4-(12-acryloyloxydodecanyloxy)benzoic acid (2c)

2.9 g of the product was obtained from 6.4 g of 4-(12-hydroxydodecanyloxybenzoic acid and 5.8 g of acrylic acid in the same manner as in Step 3 of Example 1. (Yield: 38 %)

STEP 4

Synthesis of 2-methyl-2-hexyloxyethyl 4-[4'-(12-acryloyloxydodecanyloxy)benzoyloxy]benzoate (2d)

1.50 g of the product was obtained from 1.6 g of 4-(12-acryloxydodecanyloxy)benzoic acid and 1.0 g of 2-methyl-2-hexyloxyethyl 4-hydroxybenzoate in the same manner as in Step 4 of Example 1. (Yield: 48 %)

POLYMERIZATION STEP 0.32 g of the objective polymer (2e) was obtained from 0.50 g of 2-methyl-2-hexyloxyethyl 4-(4'-12-acryloyloxydodecanyloxy)benzoyloxy]benzoate in the same manner as in Polymerization step of Example 1. (Yield: 64 %)

Mn=8700, Mw=10600

Phase transition temperature (° C.)

Sc*: chiral smectic phase,
SA: smectic A phase

EXAMPLE 3

A polymer having the following recurring unit structure and a monomer thereof were synthesized through the steps described below.

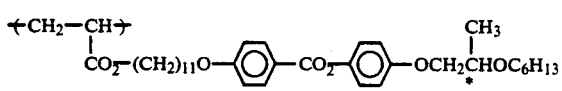

STEP 1

4-(11-acryloyloxyundecanyloxy)benzoic acid (3a) was synthesized in the same manner as in Steps 2 and 3 of Examples 1 and 2.

STEP 2

Synthesis of 4-(2-n-hexyloxypropyloxy)phenyl (3b)

3.65 g of sodium hydride was suspended in 170 ml of DMF, and a solution of 14.0 g of hydroquinone in 20 ml of DMF was added dropwise thereto at room temperature. Further, 15.1 g of methylated optically active 2-n-hexyloxy-1-propanol was added to the mixture at room temperature, followed by 8 hours of stirring at 100° C. After distilling-off of DMF and addition of dilute hydrochloric acid, the reaction mixture was subjected to successive extraction with methylene chloride and column chromatography to obtain 6.20 g of the product. (Yield: 38.8 %)

STEP 3

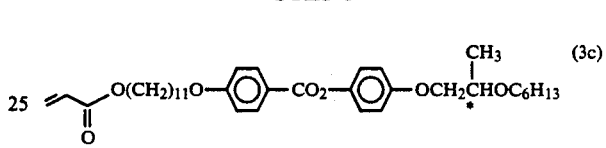

5.10 g of the above compound (4c) was prepared from 5.60 g of 4-(11-acryloyloxyundecanyloxy)benzoic acid and 3.00 g of 4-(2-n-hexyloxypropyloxy)phenol in the same manner as in Step 4 of Example 1. (Yield: 71.9%). The $^1$H-NMR chart of the compound (3c) in CDCl$_3$ with TMS (tetramethylsilane) as the reference is shown in FIG. 1.

POLYMERIZATION STEP 0.30 g of the objective polymer (3d) was prepared from 0.50 g of the compound (3c) in the same manner as in Polymerization step of Example 1. (Yield: 60%)

Mn=7800, Mw=13800

Phase transition temperature (° C.)

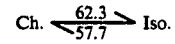

$[\alpha]_D^{25}$ = +9.2 degrees (CHCl$_3$)

Figure 2:
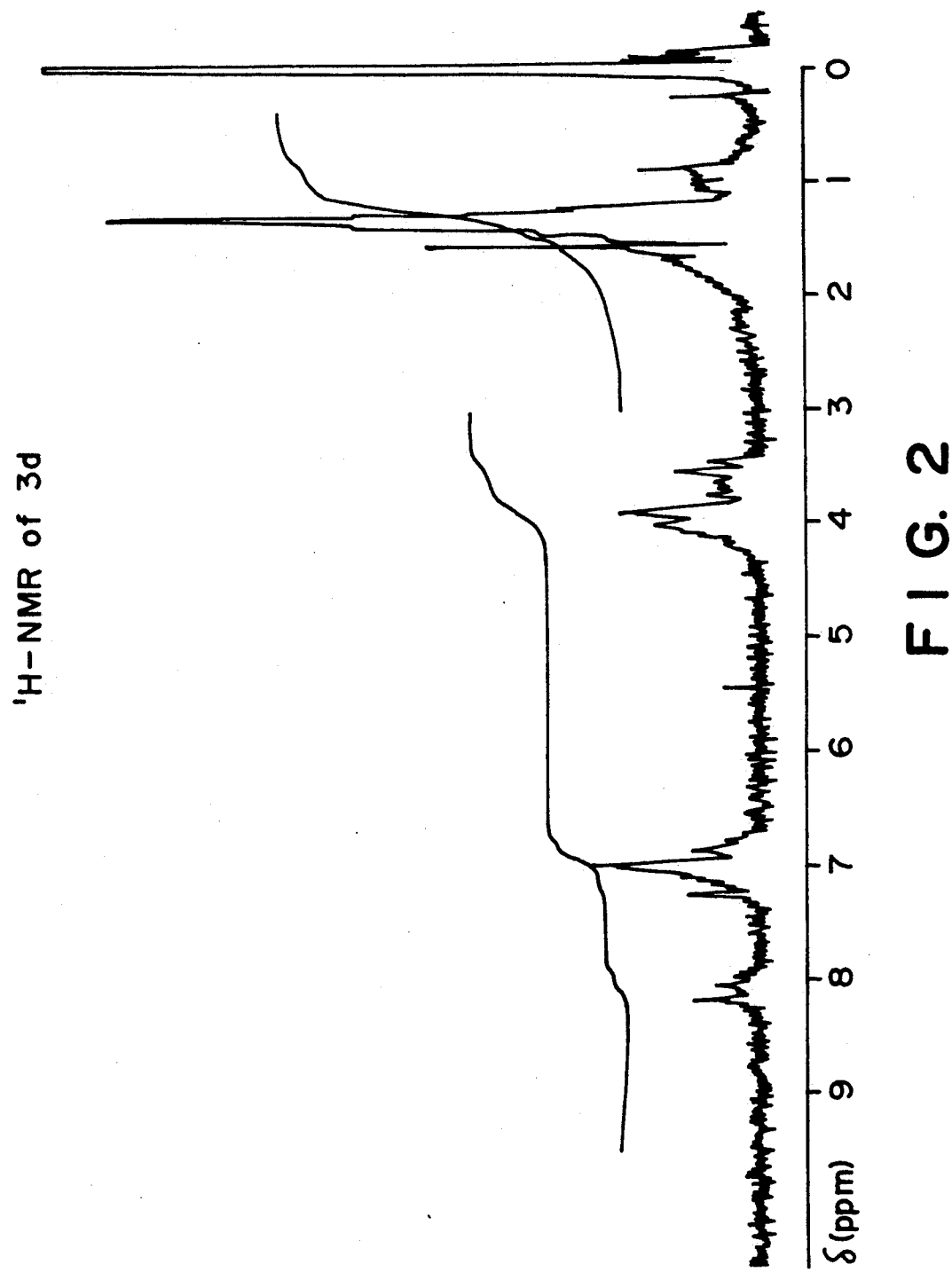

The $^1$H-NMR chart of the polymer (3d) is shown in FIG. 2.

EXAMPLE 4

A polymer having the following recurring unit structure and a monomer thereof were synthesized through the steps described below.

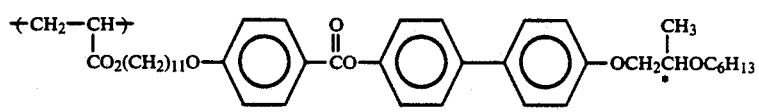

STEP 1

Synthesis of 4-[4-(2-n-hexyloxypropyloxy)-phenyl]phenol (4a)

8.50 g of the product was obtained from 19.4 g of p,p'-biphenol and 14.3 g of methylated optically active 2-n-hexyloxy-1-propanol in the same manner as in Step 2 of Example 3. (Yield: 48.1 %).

STEP 2

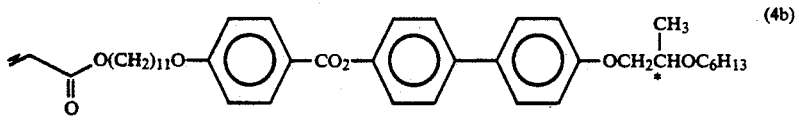

3.20 g of the above compound (4b) was prepared from 6.62 g of 4-(11-acryloyloxyundecanyloxy)benzoic acid and 4.00 g of 4-[4-(2-n-hexyloxypropyloxy)-phenyl]-phenol in the same manner as in Step 4 of Example 1. (Yield: 39.0 %)

POLYMERIZATION STEP 0.33 g of the objective polymer (4c) was obtained from 0.500 g of the above compound (4b) in the same manner as in Polymerization step of Example 1. (Yield: 66 %)

Mn=9000, Mw=10600

Phase transition temperature (° C.):

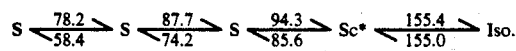

Each "S" above and hereinbelow represents a smectic phase (unidentified).

$[\alpha]_D^{25} = -9.8$ degrees* (CHCl$_3$)

$[\alpha]_D^{25} = +10.4$ degrees** (CHCl$_3$)

* and ** represent the values for optical isomers having mutually different configurations.

Figure 3:
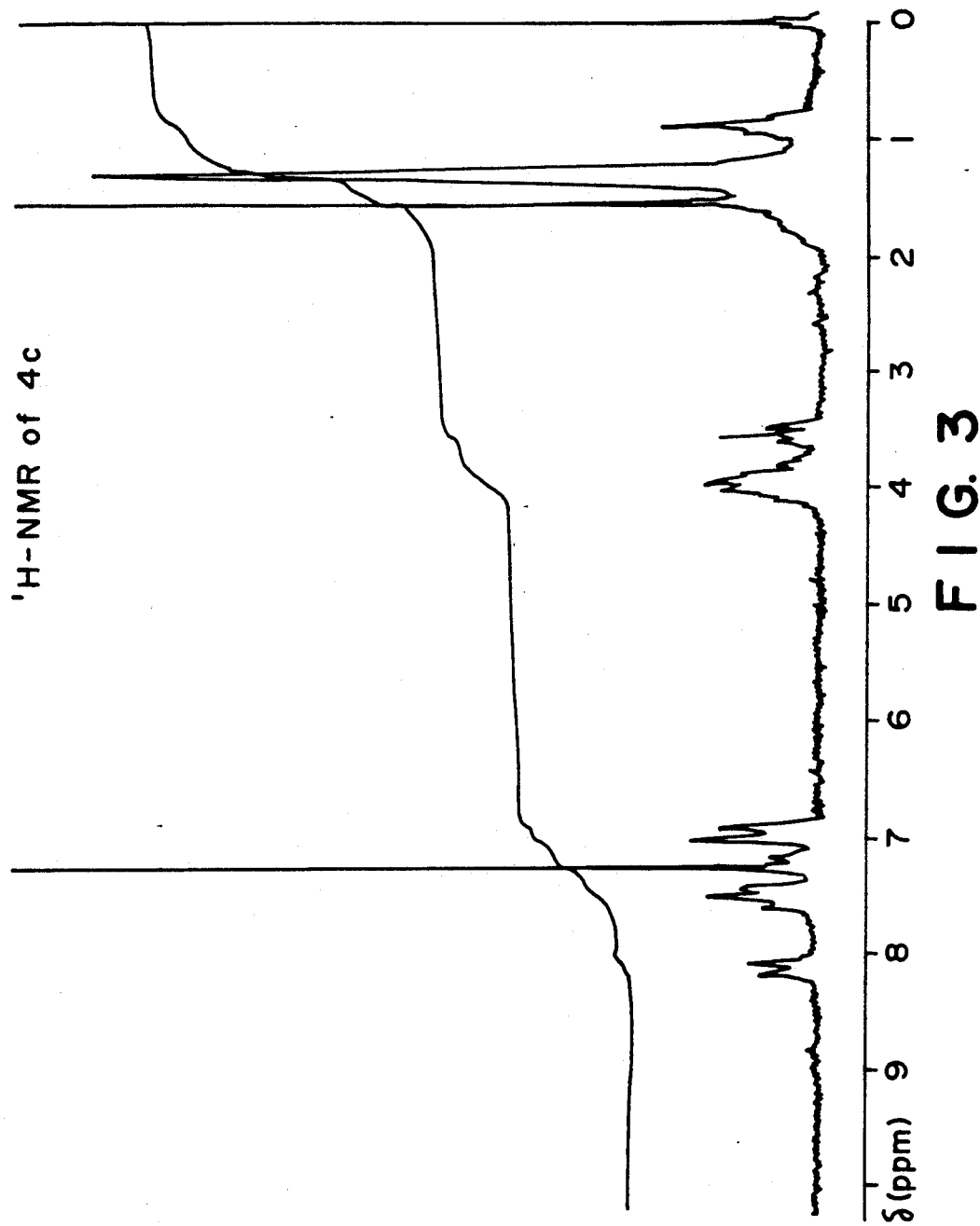

The $^1$H-NMR chart of the polymer (4c) is shown in FIG. 3.

EXAMPLE 5

A polymer having the following recurring unit structure and a monomer thereof were synthesized through the steps described below.

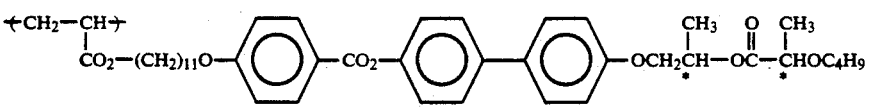

STEP 1

Synthesis of methyl 2-tetrahydropyranyloxypropionate (5a)

30.0 g of optically active methyl lactate and 100 g of dihydropyrane were stirred together with a slight amount of hydrochloric acid for 60 hours.

Then, the reaction mixture was neutralized with sodium bicarbonate aqueous solution and extracted with ether, followed by distilling-off of the solvent and distillation under reduced pressure (63° C./0.2 mmHg) to obtain the compound (5a) quantitatively.

STEP 2

Synthesis of 2-tetrahydropyranyloxy propanol (5b)

25.0 g of lithium aluminum hydride was suspended in anhydrous ether, and 36.7 g of the compound (5a) was added thereto, followed by stirring for 1 hour at 0° C. and 2 hours at room temperature and neutralization by addition of aqueous HCl solution at 0° C. The reaction mixture was subjected to extraction with ether and reduced pressure-distillation (60° C./0.3 mmHg) to obtain 28.0 g of the product. (Yield: 90.2 %)

STEP 3

Synthesis of the tosylate (5c) of the compound (5b)

11.8 g of the compound (5b) was dissolved in 50 ml of dry methylene chloride, and a solution of 16.9 g of p-toluenesulfonyl chloride in 50 ml of pyridine was added dropwise thereto at 0° C. After 7 hours of stirring and addition of hydrochloric acid, the reaction mixture was subjected to extraction with methylene chloride and distilling-off of the solvent to obtain the product quantitatively.

STEP 4

Synthesis of methyl 2-n-butyloxypropionate (5d)

20.0 g of optically active methyl lactate and 47.8 g of n-butyl iodide were dissolved in ethyl acetate, and 20 g of Ag$_2$O and 2.0 g of Molecular Sieve 3A were added thereto, followed by 7 hours of stirring at 60° C. After filtration of the insoluble matter, the solvent was distilled off and the remainder was distilled under reduced pressure (66° C./4 mmHg) to obtain 18.4 g of the product. (Yield: 42.8 %)

STEP 5

Synthesis of 2-n-butyloxypropionic acid (5e)

16.5 g of the compound (5d) was stirred together with 18.0 g of potassium hydroxide in methanol for 40 hours at room temperature.

After distilling off the methanol, the reaction mixture was neutralized by addition of hydrochloric acid and extracted with ether. After distilling off the solvent, the remainder was distilled under reduced pressure to obtain 10.6 g of the product. (Yield: 80.0 %)

STEP 6

Synthesis of 4-[4-(2-n-tetrahydropyranyloxypropyloxy)phenyl]-phenol (5f)

5.78 g of sodium hydride was suspended in 50 ml of DMF, and a solution of 17.8 g of p,p'-biphenol in DMF was added dropwise thereto at room temperature. Further, a solution of the compound (5c) in DMF was added dropwise thereto, and the mixture was stirred for 16 hours at 100° C. After distilling off DMF, the reaction mixture was neutralized with hydrochloric acid and extracted with methylene chloride. After distilling off the solvent, the remainder was subjected to silica gel chromatography to obtain 6.6 g of the product. (Yield: 36.7 %)

STEP 7

Synthesis of the carbobenzoxy derivative (5g) of the compound (5f)

3.0 g of the compound (5f) was dissolved in toluene-pyridine mixture solvent, followed by cooling to 0° C. Then, 1.95 g of carbobenzoxy chloride was added drop- 3.19 g of the compound (5i) was stirred together with 0.30 g of 10% palladium-carbon in ethyl acetate for 4 hours in a hydrogen atmosphere. After the palladium-carbon was filtered out, the solvent was distilled off and silica gel chromatography was performed to obtain 2.20 g of the product. (Yield: 93.6%)

STEP 11

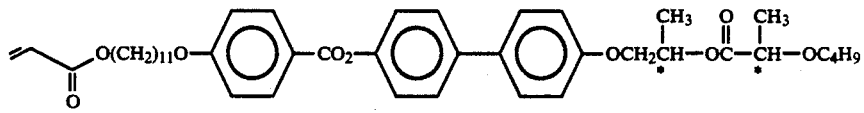

wise thereto. After being restored to room temperature, the mixture was stirred for 17 hours and then stirred for 2 hours at 40° C. The reaction mixture was then treated by addition of hydrochloric acid, extraction with ethyl acetate and distilling-off of the solvent to obtain the product quantitatively.

STEP 8

Synthesis of the de-pyranylate (5h) of the compound (5g)

4.23 g of the compound (5g) was stirred together with a slight amount of hydrochloric acid in ethanol, followed by neutralization with aqueous sodium bicarbonate solution, extraction with ethyl acetate and distilling-off of the solvent to recover the compound (5h), which was then used in the subsequent reaction (Step 9) as it was.

STEP 9

Synthesis of

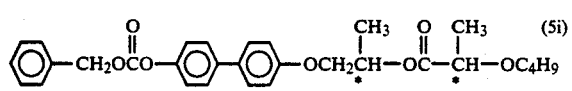

The compound (5h) prepared in Step 8 and 2.0 g of the compound (5e) prepared in Step 5 were stirred together with 4.1 g of N,N'-dicyclohexylcarbodiimide and 0.25 g of 4-pyrrolidinopyridine in THF-ethyl acetate mixture solvent for 39 hours at room temperature. The precipitate was removed by filtration, the solvent was distilled off from the filtrate, and the remainder was purified by column chromatography to recover 3.19 g of the product (Overall yield from Step 8: 69%)

STEP 10

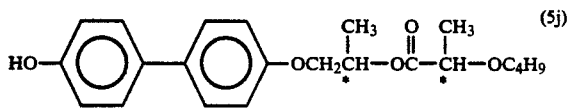

2.50 g of the above monomer (5k) was synthesized from 2.53 g of 4-(11-acryloyloxyundecanyloxy)benzoic acid and 2.00 g of the compound (5j) in the same manner as in Step 4 of Example 1. (Yield: 64.9%)

Figure 4:
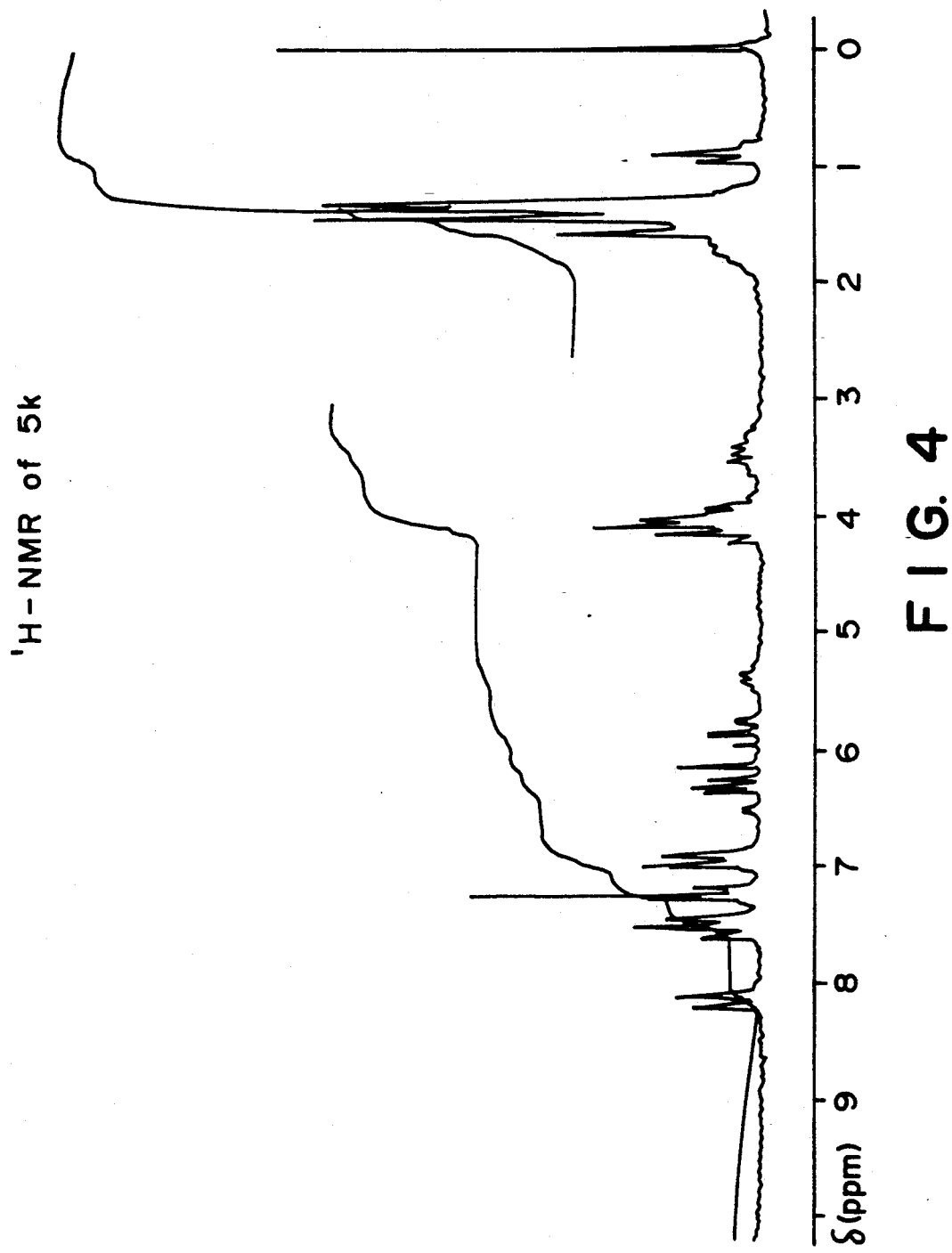

The $^1$H-NMR chart of the compound 5k is shown in FIG. 4.

POLYMERIZATION STEP 0.24 g of the objective polymer (5l) was obtained from 0.500 g of the monomer (5k) in the same manner as in Polymerization step of Example 1. (Yield: 48%)

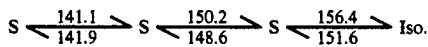

$[\alpha]_D^{25} = -26.6$ degrees (CHCl$_3$)

Figure 5:
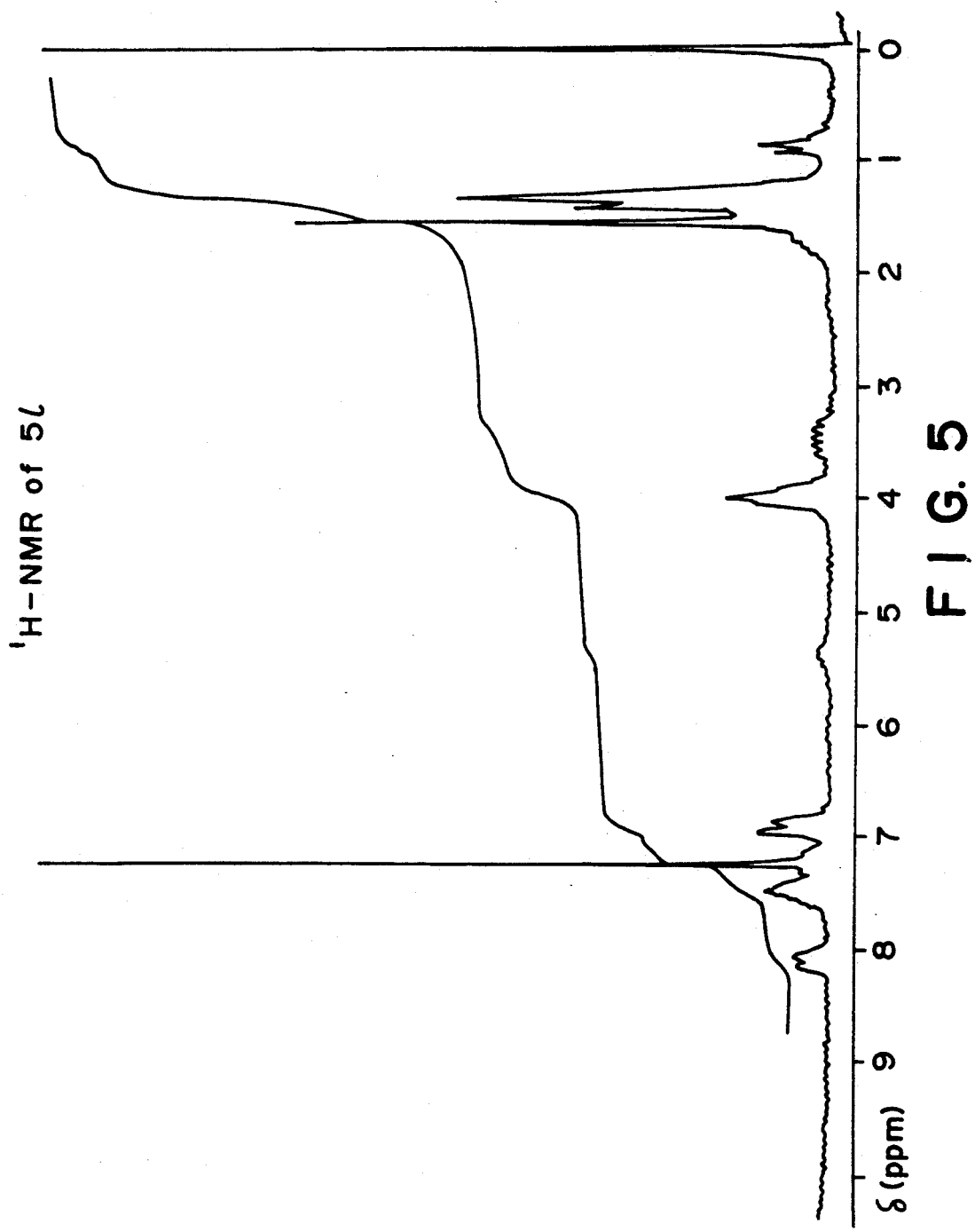

The $^1$H-NMR chart of the polymer (5l) is shown in FIG. 5.

EXAMPLE 6

A polymer (6a) having the following recurring unit structure and a monomer thereof were prepared in the same manner as in Examples 2 and 4 using the intermediates for synthesis used in these Examples.

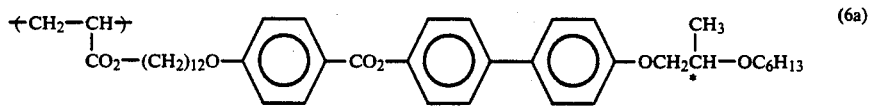

Mn=8400, Mw=11300
Phase transition temperature (° C.):

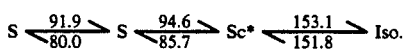

$[\alpha]_D^{25} = -9.0$ degrees (CHCl$_3$)

Figure 6:
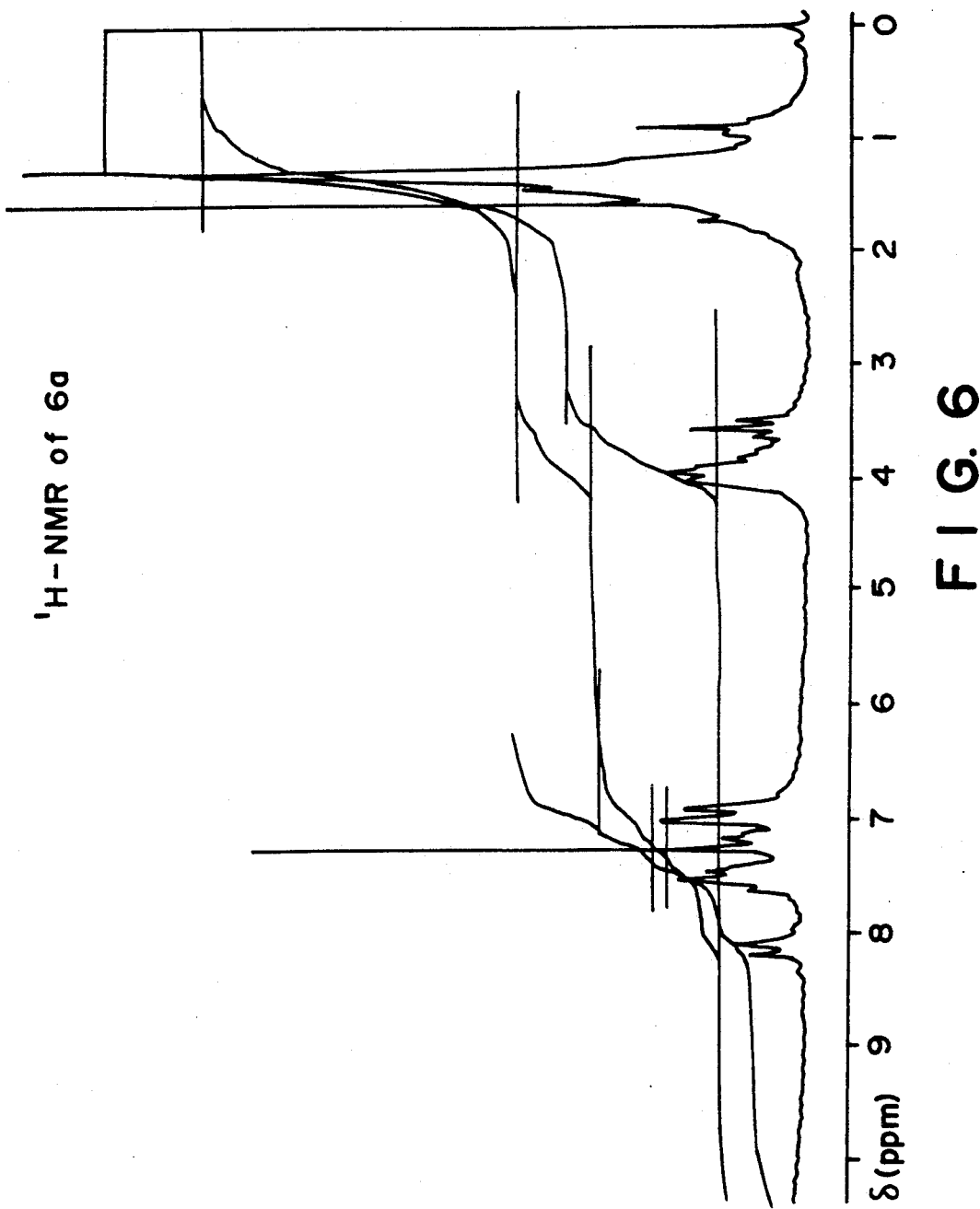

The $^1$H-NMR chart of the polymer (6a) is shown in FIG. 6.

EXAMPLE 7

A polymer (7a) having the following recurring unit structure and a monomer thereof were prepared in the same manner as in Examples 2 and 4.

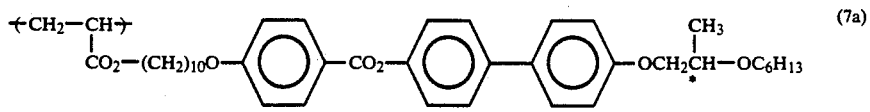

Mn=9700, Mw=13,000
Phase transition temperature (° C.):

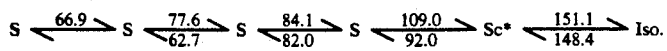

Figure 7:
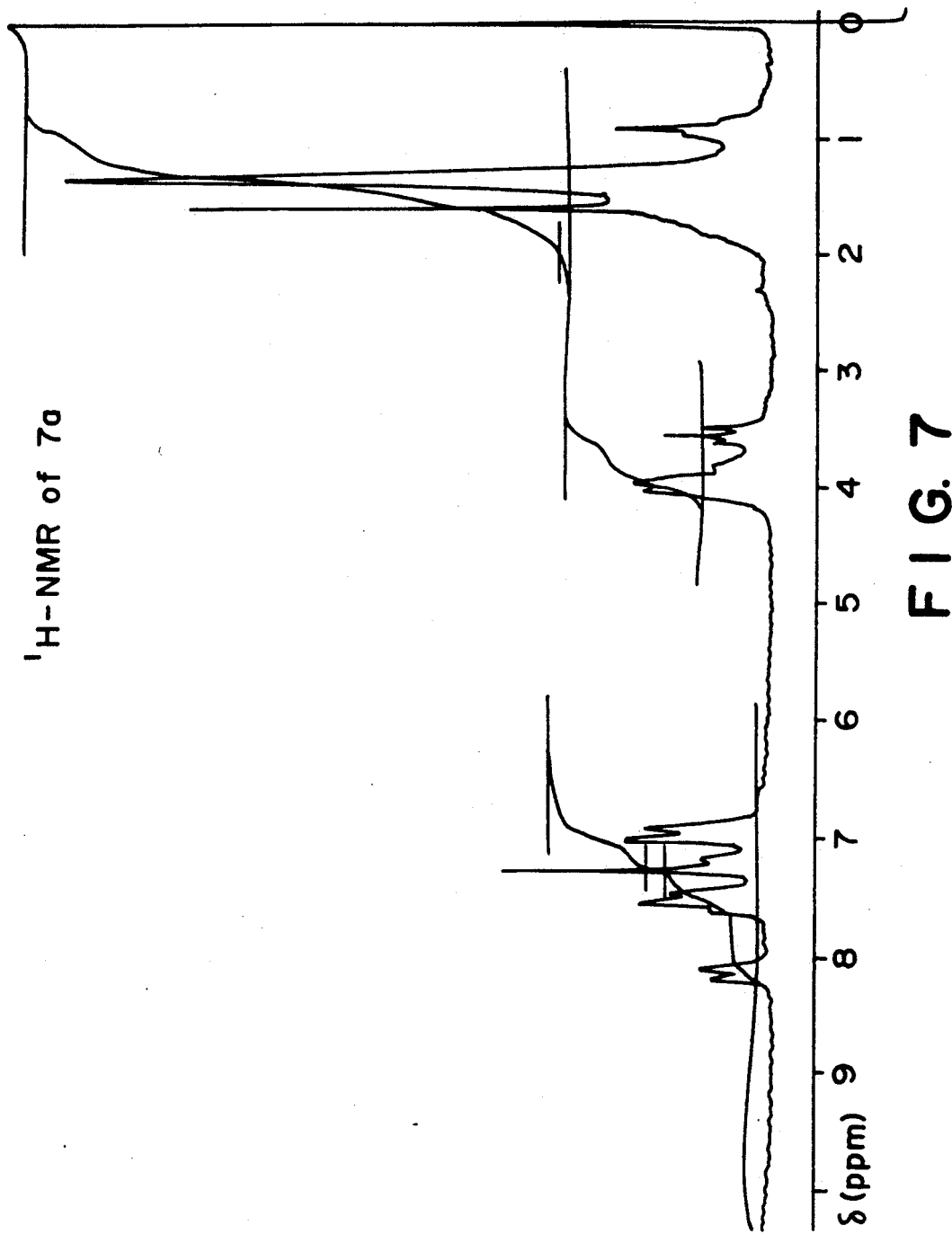
Figure 8:
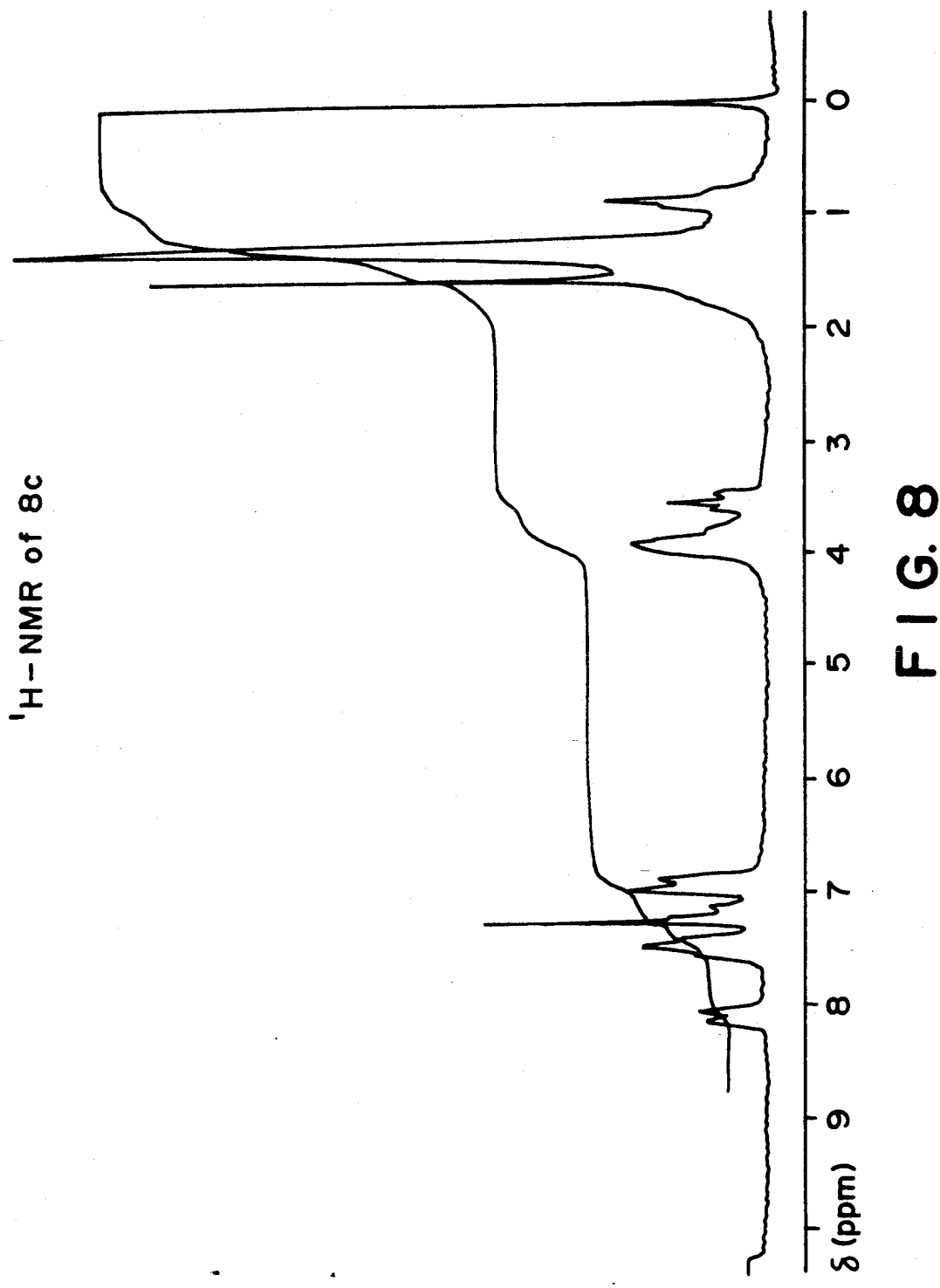

$[\alpha]_D^{25} = -9.8$ degrees (CHCl$_3$)
The $^1$H-NMR chart is shown in FIG. 7.

EXAMPLE 8

A polymer (8c) having the following recurring unit structure and a monomer thereof were prepared through the steps described below.

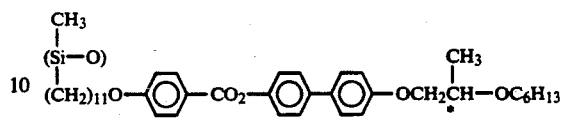

(9d)

STEP 1

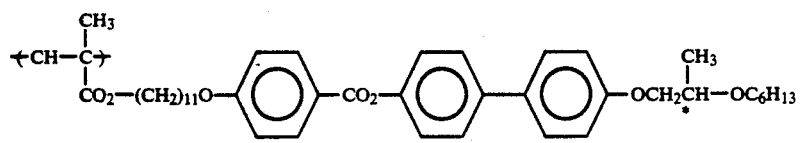

(8c)

STEP 1

4-(11-methacryloyloxyundecanyloxy)benzoic acid (8a) was prepared from 4-(11-hydroxyundecanyloxy)-benzoic acid and methacrylic acid in the same manner as in Step 3 of Example 1. (Yield: 47%)

STEP 2

A monomer (8b) of the following structure was prepared from the 4-(11-methacryloyloxyundecanyloxy)-benzoic acid (8a) and 4-[4-(2-n-hexyloxypropyloxy)-phenyl]phenol (4a) in the same manner as in Step 4 of Example 1. (Yield: 48%)

4-(11-undecenyloxy)benzoic acid (9b) was prepared from 11-bromo-1-undecene (9a) and p-hydroxybenzoic acid in the same manner as in Step 2 of Example 1. (Yield: 56%)

STEP 2

The following monomeric compound (9c) was prepared from 4-(11-undecenyloxy)benzoic acid (9b) and 4-(2-n-hexyloxypropyloxy)phenyl]phenol (4a) in the same manner as in Step 4 in Example 1.

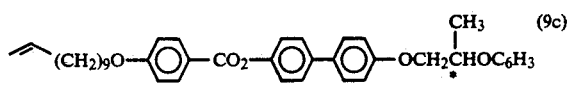

(9c)

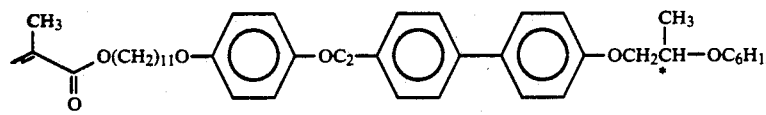

(8b)

POLYMERIZATION STEP 100 mg of polymethylhydrogensiloxane and 1.00 g of the monomeric compound (9c) were reacted in the presence of H$_2$PtCl$_6$·6H$_2$O as a catalyst in toluene at 70° C. in the atmosphere of nitrogen for 24 hours. The reaction product was subjected to repetitive recrystallization from ethanol to obtain 0.56 g (Yield: 56%) of the objective polymer (9d).
Mn=16,400, Mw=26,400

POLYMERIZATION STEP

The polymer (8c) was obtained from the monomer (8b) in the same manner as in Polymerization step of Example 1.
Mn=23,900, Mw=53,600
$[\alpha]_D^{25} = -11.2$ degrees* (CHCl$_3$)
$[\alpha]_D^{25} = +11.4$ degrees** (CHCl$_3$)

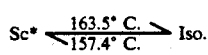

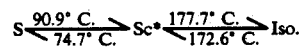

Figure 9:
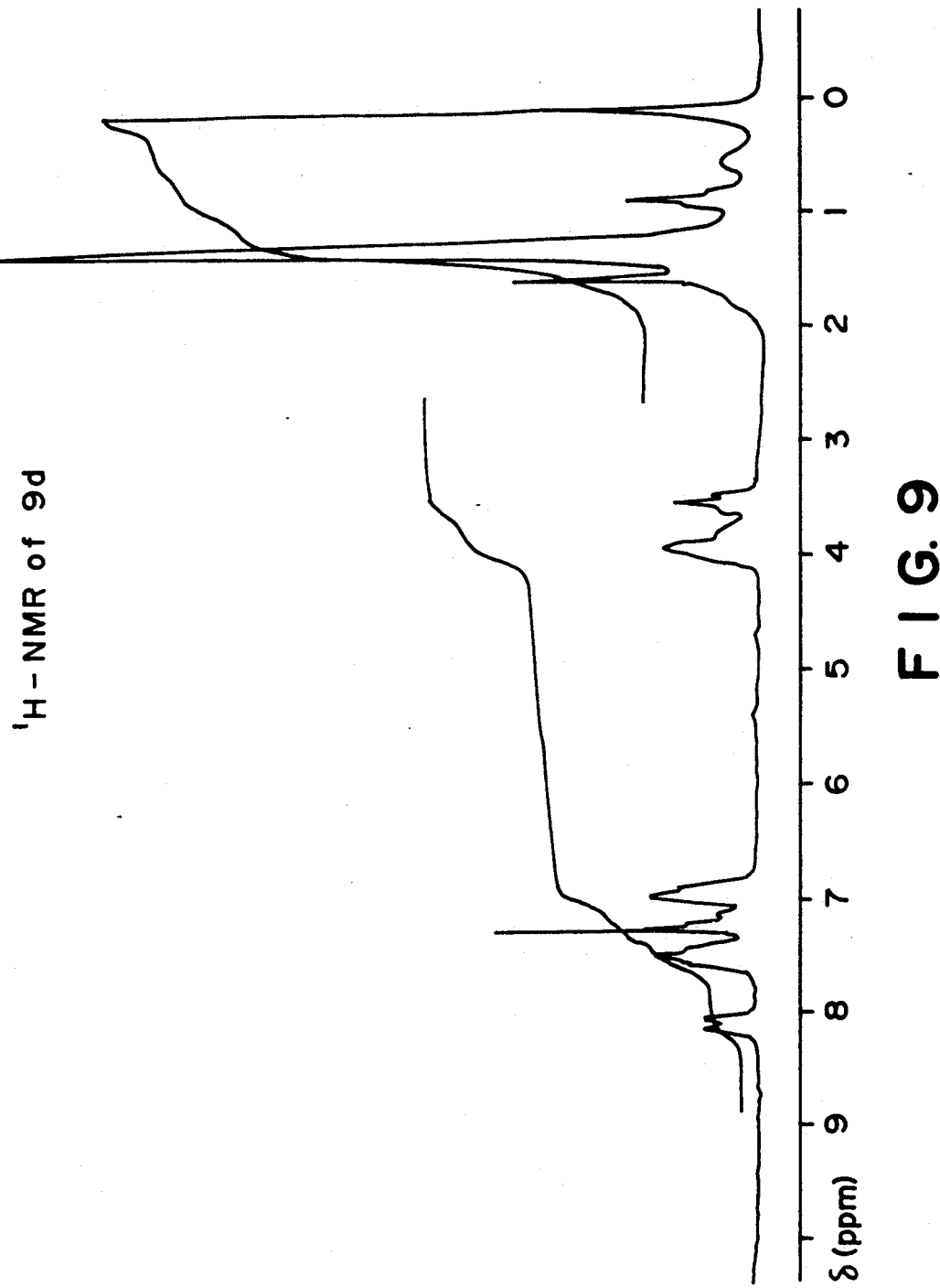

$[\alpha]_D^{25} = -11.8$ degrees* (CHCl$_3$)
$[\alpha]_D^{25} = +12.0$ degrees** (CHCl$_3$)
The 1H-NMR chart is shown in FIG. 9.

EXAMPLE 9

A polymer (9d) having the following recurring unit structure was prepared through the steps shown below.

EXAMPLE 10

A polymer (10b) having the following recurring unit structure was prepared through the steps described below.

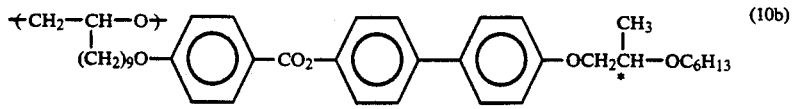 (10b)

STEP 1

1.00 g of the monomeric compound (9c) was stirred with 0.37 g of methachloroperbenzoic acid in methylene chloride at room temperature for 24 hours. The product was washed with potassium carbonate aqueous solution and water, followed by drying with magnesium sulfate. After distilling off the solvent, the product was purified by silica gel chromatography and recrystallization to obtain 0.73 of a corresponding monomer (10a). (Yield: 73%)

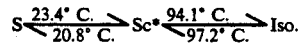

$[\alpha]_D^{25} = +9.1$ degrees ($CHCl_3$)

EXAMPLE 14

0.54 g of an objective copolymer (14b) was obtained from 0.80 g of monomer (4b) and a monomer (14a) of the following structure in a similar manner as in Polymerization step of Example 1. (Yield: 54%)

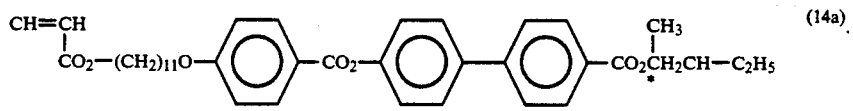 (14a)

POLYMERIZATION STEP

The monomer (10a) was reacted in the presence of $SnCl_4$ as the catalyst in methylene chloride for 24 hours in a nitrogen atmosphere. After repetitive recrystallization, the objective polymer (10b) was obtained.

The polymer (14b) showed the following properties: Mn = 9800, Mw = 13200

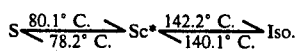

$[\alpha]_D^{25} = -12.8$ degrees ($CHCl_3$)

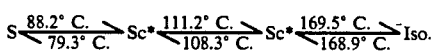

$[\alpha]_D^{25} = +9.3$ degrees ($CHCl_3$)

EXAMPLE 11

0.72 g of an objective copolymer (11a) was prepared from 0.31 g of monomer (2d) and 0.99 g of monomer (4b) in a similar manner as in Polymerization step of Example 1. (Yield: 55%)
Mn = 11,300, Mw = 16,300

EXAMPLE 15

0.48 g of an objective copolymer (15b) was obtained from 0.80 g of monomer (4b) and a monomer (15a) of the following structure in a similar manner as in Polymerization step of Example 1. (Yield: 48%)

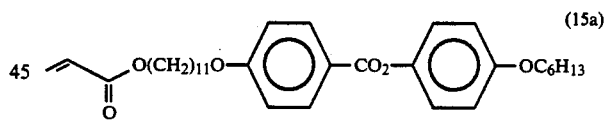 (15a)

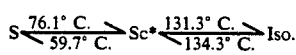

$[\alpha]_D^{25} = +9.8$ degrees ($CHCl_3$)

The polymer (15b) showed the following properties: Mn = 10,100, Mw = 14,200

EXAMPLE 12

0.68 g of an objective copolymer (12a) was prepared from 0.63 g of monomer (2d) and 0.67 g of monomer (4b) in a similar manner as in Polymerization step of Example 1. (Yield: 52%)
Mn = 9,400, Mw = 12,700

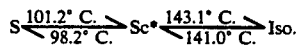

$[\alpha]_D^{25} = +7.9$ degrees ($CHCl_3$)

EXAMPLE 16

0.42 g of an objective copolymer (16b) was obtained from 0.85 g of monomer (9b) and a monomer (16a) of the following structure in a similar manner as in Polymerization step of Example 9. (Yield: 43%)

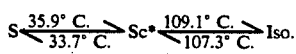

$[\alpha]_D^{25} = +8.9$ degrees ($CHCl_3$)

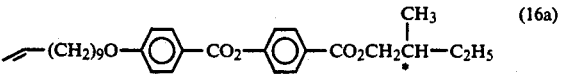 (16a)

EXAMPLE 13

0.73 g of an objective copolymer (13a) was prepared from 0.96 g of monomer (2d) and 0.34 g of monomer (4b) in a similar manner as in Polymerization step of Example 1. (Yield: 56%)
Mn = 11,000, Mw = 16,700

The polymer (16b) showed the following properties: Mn = 14800, Mw = 23800

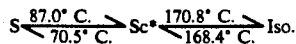

$[\alpha]_D^{25} = +10.8$ degrees (CHCl$_3$)

EXAMPLE 17

Among the monomers obtained in the above Examples, the monomers (4b), (5k), (6b) and (7b) were respectively injected into a cell which comprised a pair of glass substrates each provided with an ITO electrode coated with a polyimide alignment film and had a cell gap of 3 microns. The resultant cells in Sc* (or SmC*) phase were supplied with an electric field of 1 V/micron, whereby inversion of molecules was observed in response to the electric field. The response times measured at that time are shown in the following Table 1 together with the phase transition temperatures of the monomers (4b) and (5k).

Low-Molecular Weight Mixture Liquid Crystal α

CS-1014 (trade name, available from Chisso K.K.) showing the following phase transition series (° C.):

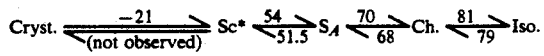

Mesomorphic Polymer β

One having the following recurring unit structure and a number-average molecular weight of 7800:

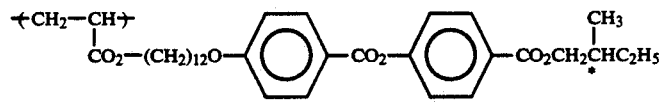

Low-Molecular Weight Mesomorphic Compound γ

One having the following structure and phase transition temperature (° C.):

TABLE 1

| | Phase transition temperature (°C.) | Response time (ms) |
|---|---|---|
| (4b) | Cryst. $\xrightleftharpoons[52.3]{69.0}$ Sc* $\xrightleftharpoons[89.9]{89.8}$ S$_A$ $\xrightleftharpoons[100.0]{100.8}$ Ch. $\xrightleftharpoons[102.2]{102.7}$ Iso.; S $\xrightarrow{60.1}$ | 0.37 |
| (5k) | Cryst. $\xrightarrow{71.9}$ S$_A$ $\xrightleftharpoons[87.9]{89.6}$ Ch. $\xrightleftharpoons[89.6]{91.1}$ Iso.; SmC* $\xrightarrow{48.2, 59.8}$ | 0.20 |
| (6b) | Cryst. $\xrightleftharpoons[51.6]{70.2}$ S $\xrightleftharpoons[59.4]{73.5}$ Sc* $\xrightleftharpoons[89.6]{91.2}$ S$_A$ $\xrightleftharpoons[99.2]{101.0}$ Ch. $\xrightleftharpoons[100.2]{101.5}$ Iso. | 0.34 |
| (7b) | Cryst. $\xrightleftharpoons[68.1]{78.5}$ Sc* $\xrightleftharpoons[84.7]{85.4}$ S$_A$ $\xrightleftharpoons[99.7]{100.3}$ Ch. $\xrightleftharpoons[101.1]{101.7}$ Iso. | 0.36 |

EXAMPLE 18

Polymer liquid crystal compositions were prepared by using the polymers (2e), (4c), (5l), (6a), (7a), (8c), (9d), (10b), (11a), (12a), (13a), (14b), (15b) and (16b) among the polymers prepared in the above Examples 1–16 and mixing then with the following low-molecular weight mixture liquid crystal α, mesomorphic polymer β, low-molecular weight mesomorphic compound γ and low-molecular weight mesomorphic compound δ.

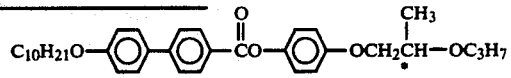

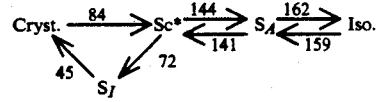

S$_I$: smectic I phase

Low-Molecular Weight Mesomorphic Compound δ

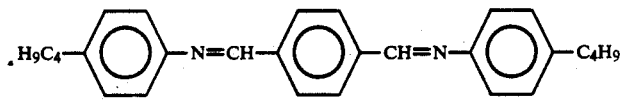

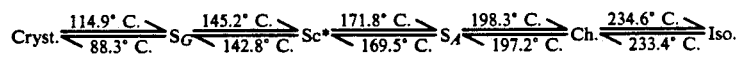

S_G: smectic G phase

The resultant compositions are shown in the following Tables 2-17.

TABLE 2

Composition of polymer 2(e) and low-molecular weight mixture liquid crystal α

| No. | Weight ratio (2e/α) | Phase transition temp. (°C) |
|---|---|---|
| A | 9.5/0.5 | Sc* $\underset{\leftarrow 13.7}{\overset{14.8 \rightarrow}{\rightleftarrows}}$ S$_A$ $\underset{\leftarrow 72.9}{\overset{74.1 \rightarrow}{\rightleftarrows}}$ Iso. |
| B | 9.0/1.0 | Sc* $\underset{\leftarrow 11.4}{\overset{12.9 \rightarrow}{\rightleftarrows}}$ S$_A$ $\underset{\leftarrow 75.8}{\overset{77.0 \rightarrow}{\rightleftarrows}}$ Iso. |
| C | 7.5/2.5 | Sc* $\underset{\leftarrow 6.6}{\overset{8.0 \rightarrow}{\rightleftarrows}}$ S$_A$ $\underset{\leftarrow 78.1}{\overset{79.2 \rightarrow}{\rightleftarrows}}$ Iso. |
| D | 5.0/5.0 | Sc* $\underset{\leftarrow 5.4}{\overset{6.5 \rightarrow}{\rightleftarrows}}$ S$_A$ $\underset{\leftarrow 80.2}{\overset{81.2 \rightarrow}{\rightleftarrows}}$ Iso. |

TABLE 3

Composition of polymer (2e) and mesomorphic polymer β

| No. | Weight ratio (2e/β) | Phase transition temp. (°C) |
|---|---|---|
| E | 4/1 | Sc* $\underset{\leftarrow 15.8}{\overset{17.9 \rightarrow}{\rightleftarrows}}$ S$_A$ $\underset{\leftarrow 73.8}{\overset{74.5 \rightarrow}{\rightleftarrows}}$ Iso. |
| F | 0/1 | Glass $\underset{\leftarrow 5.0}{\overset{5.0 \rightarrow}{\rightleftarrows}}$ Sc* $\underset{\leftarrow 32.8}{\overset{33.4 \rightarrow}{\rightleftarrows}}$ S$_A$ $\underset{\leftarrow 91.5}{\overset{93.0 \rightarrow}{\rightleftarrows}}$ Iso. |

TABLE 4

Composition of polymer (4c) and mesomorphic compound γ

| No. | Weight ratio (4c)/γ | Phase transition temp. (°C) |
|---|---|---|
| G | 3.3/6.7 | S $\underset{\leftarrow 31.7}{\overset{69.4 \rightarrow}{\rightleftarrows}}$ S $\underset{\leftarrow 83.9}{\overset{84.1 \rightarrow}{\rightleftarrows}}$ Sc* $\underset{\leftarrow 129.8}{\overset{127.6 \rightarrow}{\rightleftarrows}}$ S$_A$ $\underset{\leftarrow 164.8}{\overset{165.4 \rightarrow}{\rightleftarrows}}$ Iso. |
| H | 5.1/4.9 | S $\underset{\leftarrow 75.4}{\overset{78.5 \rightarrow}{\rightleftarrows}}$ S $\underset{\leftarrow 85.5}{\overset{87.2 \rightarrow}{\rightleftarrows}}$ Sc* $\underset{\leftarrow 139.7}{\overset{139.2 \rightarrow}{\rightleftarrows}}$ S$_A$ $\underset{\leftarrow 164.9}{\overset{164.8 \rightarrow}{\rightleftarrows}}$ Iso. |
| I | 7.6/2.4 | S $\underset{\leftarrow 66.4}{\overset{69.5 \rightarrow}{\rightleftarrows}}$ S $\underset{\leftarrow 82.7}{\overset{86.7 \rightarrow}{\rightleftarrows}}$ Sc* $\underset{\leftarrow 160.3}{\overset{161.0 \rightarrow}{\rightleftarrows}}$ Iso. |

TABLE 5

Composition of polymers (4c) and (4b)

| No. | Weight ratio (4c)/(4b) | Phase transition temp. (°C) |
|---|---|---|
| J | 8.0/2.0 | S $\underset{\leftarrow 59.2}{\overset{59.8 \rightarrow}{\rightleftarrows}}$ S $\underset{\leftarrow 72.9}{\overset{73.8 \rightarrow}{\rightleftarrows}}$ S $\underset{\leftarrow 83.2}{\overset{85.2 \rightarrow}{\rightleftarrows}}$ Sc* $\underset{\leftarrow 149.2}{\overset{150.1 \rightarrow}{\rightleftarrows}}$ Iso. |

TABLE 6

Composition of polymer (5l) and compound γ

| No. | Weight ratio (5l)/γ | Phase transition temp. (°C) |
|---|---|---|
| K | 2.1/7.9 | S $\underset{\leftarrow 78.7}{\overset{80.4 \rightarrow}{\rightleftarrows}}$ Sc* $\underset{\leftarrow 126.3}{\overset{127.3 \rightarrow}{\rightleftarrows}}$ S$_A$ $\underset{\leftarrow 164.3}{\overset{165.3 \rightarrow}{\rightleftarrows}}$ Iso. |
| L | 5.0/5.0 | S $\underset{\leftarrow 59.6}{\overset{60.9 \rightarrow}{\rightleftarrows}}$ S $\underset{\leftarrow 73.9}{\overset{68.5 \rightarrow}{\rightleftarrows}}$ Sc* $\underset{\leftarrow 123.7}{\overset{125.4 \rightarrow}{\rightleftarrows}}$ S$_A$ $\underset{\leftarrow 162.1}{\overset{162.8 \rightarrow}{\rightleftarrows}}$ Iso. |
| M | 7.2/2.8 | S $\underset{\leftarrow 58.3}{\overset{59.8 \rightarrow}{\rightleftarrows}}$ Sc* $\underset{\leftarrow 132.8}{\overset{133.9 \rightarrow}{\rightleftarrows}}$ S$_A$ $\underset{\leftarrow 159.1}{\overset{160.0 \rightarrow}{\rightleftarrows}}$ Iso. |

TABLE 7

Composition of polymers (5l) and (5k)

| No. | Weight ratio (5l)/(5k) | Phase transition temp. (°C) |
|---|---|---|
| N | 2.0/8.0 | S $\underset{\leftarrow 43.0}{\overset{44.8 \rightarrow}{\rightleftarrows}}$ Sc* $\underset{\leftarrow 62.3}{\overset{63.0 \rightarrow}{\rightleftarrows}}$ S$_A$ $\underset{\leftarrow 92.5}{\overset{93.0 \rightarrow}{\rightleftarrows}}$ Iso. |

TABLE 8

Composition of polymer (4c) and compound δ

| No. | Weight ratio (4c)/δ | Phase transition temp. (°C) |
|---|---|---|
| O | 7.5/2.5 | S $\underset{\leftarrow 72.0}{\overset{73.6 \rightarrow}{\rightleftarrows}}$ S $\underset{\leftarrow 90.4}{\overset{93.5 \rightarrow}{\rightleftarrows}}$ Sc* $\underset{\leftarrow 173.1}{\overset{168.7 \rightarrow}{\rightleftarrows}}$ Iso. |

TABLE 8-continued

Composition of polymer (4c) and compound δ

| No. | Weight ratio (4c)/δ | Phase transition temp. (°C.) |
|---|---|---|
| P | 3.0/7.0 | S $\underset{136.4}{\overset{140.0}{\rightleftarrows}}$ Sc* $\underset{152.0}{\overset{153.0}{\rightleftarrows}}$ S$_A$ $\underset{188.4}{\overset{190.2}{\rightleftarrows}}$ Ch. $\underset{209.6}{\overset{211.4}{\rightleftarrows}}$ Iso. |

TABLE 9

Composition of polymer (6a) and compound γ

| No. | Weight ratio (6a)/γ | Phase transition temp. (°C.) |
|---|---|---|
| q | 7.0/3.0 | S $\underset{}{\overset{70.9}{\rightleftarrows}}$ S $\underset{86.4}{\overset{88.1}{\rightleftarrows}}$ Sc* $\underset{159.0}{\overset{159.4}{\rightleftarrows}}$ Iso. |
| r | 5.1/4.9 | S $\underset{79.5}{\overset{82.8}{\rightleftarrows}}$ S $\underset{85.9}{\overset{87.4}{\rightleftarrows}}$ Sc* $\underset{162.9}{\overset{163.1}{\rightleftarrows}}$ Iso. |
| s | 2.3/7.7 | S $\underset{}{\overset{82.9}{\rightleftarrows}}$ S $\underset{83.3}{\overset{84.6}{\rightleftarrows}}$ Sc* $\underset{163.0}{\overset{163.3}{\rightleftarrows}}$ Iso. |

TABLE 10

Composition of polymer (7a) and compound γ

| No. | Weight ratio (7a)/γ | Phase transition temp. (°C.) |
|---|---|---|
| t | 7.1/2.9 | S $\underset{78.5}{\overset{82.3}{\rightleftarrows}}$ S $\underset{86.0}{\overset{90.3}{\rightleftarrows}}$ Sc* $\underset{160.2}{\overset{160.5}{\rightleftarrows}}$ Iso. |
| u | 5.0/5.0 | S $\underset{71.3}{\overset{73.2}{\rightleftarrows}}$ S $\underset{86.0}{\overset{88.4}{\rightleftarrows}}$ Sc* $\underset{163.6}{\overset{163.8}{\rightleftarrows}}$ Iso. |
| v | 2.1/7.9 | S $\underset{81.3}{\overset{82.4}{\rightleftarrows}}$ S $\underset{83.6}{\overset{83.4}{\rightleftarrows}}$ Sc* $\underset{135.7}{\overset{136.4}{\rightleftarrows}}$ S$_A$ $\underset{164.2}{\overset{164.5}{\rightleftarrows}}$ Iso. |

TABLE 11

Composition of polymer (8c) and compound γ

| No. | Weight ratio (8c)/γ | Phase transition temp. (°C.) |
|---|---|---|
| w | 7.6/2.4 | S $\underset{83.0}{\overset{84.6}{\rightleftarrows}}$ Sc* $\underset{164.3}{\overset{165.2}{\rightleftarrows}}$ Ch. $\underset{167.0}{\overset{169.1}{\rightleftarrows}}$ Iso. |
| x | 5.3/4.7 | S $\underset{78.5}{\overset{75.4}{\rightleftarrows}}$ Sc* $\underset{162.8}{\overset{166.8}{\rightleftarrows}}$ Ch. $\underset{165.9}{\overset{167.5}{\rightleftarrows}}$ Iso. |
| y | 2.3/7.7 | S $\underset{79.2}{\overset{80.6}{\rightleftarrows}}$ Sc* $\underset{157.5}{\overset{159.6}{\rightleftarrows}}$ Ch. $\underset{161.1}{\overset{164.1}{\rightleftarrows}}$ Iso. |

TABLE 12

Composition of polymer (9d) and compound γ

| No. | Weight ratio (9d)/γ | Phase transition temp. (°C.) |
|---|---|---|
| z | 7.4/2.6 | S $\underset{56.0}{\overset{64.7}{\rightleftarrows}}$ S $\underset{74.6}{\overset{77.7}{\rightleftarrows}}$ Sc* $\underset{171.8}{\overset{172.8}{\rightleftarrows}}$ Iso. |
| a' | 4.9/5.1 | S $\underset{76.9}{\overset{77.6}{\rightleftarrows}}$ Sc* $\underset{171.3}{\overset{172.6}{\rightleftarrows}}$ Iso. |
| b' | 2.6/7.4 | S $\underset{80.1}{\overset{80.9}{\rightleftarrows}}$ Sc* $\underset{164.2}{\overset{166.5}{\rightleftarrows}}$ S$_A$ $\underset{169.0}{\overset{169.0}{\rightleftarrows}}$ Iso. |

TABLE 13

Composition of polymer (10b) and compound γ

| No. | Weight ratio (10b)/γ | Phase transition temp. (°C.) |
|---|---|---|
| c' | 1.5/8.5 | S $\underset{78.0}{\overset{80.1}{\rightleftarrows}}$ Sc* $\underset{139.8}{\overset{141.0}{\rightleftarrows}}$ S$_A$ $\underset{159.5}{\overset{161.1}{\rightleftarrows}}$ Iso. |

TABLE 14

Composition of polymer (11a) and compound γ

| No. | Weight ratio (11a)/γ | Phase transition temp. (°C.) |
|---|---|---|
| d' | 2/8 | S $\underset{70.1}{\overset{72.4}{\rightleftarrows}}$ Sc* $\underset{144.7}{\overset{145.1}{\rightleftarrows}}$ S$_A$ $\underset{154.1}{\overset{155.0}{\rightleftarrows}}$ Iso. |

TABLE 15

Composition polymer (12a) and compound γ

| No. | Weight ratio (12a)/γ | Phase transition temp. (°C.) |
|---|---|---|
| e' | 1.5/8.5 | S $\underset{73.0}{\overset{74.0}{\rightleftarrows}}$ Sc $\underset{138.5}{\overset{139.0}{\rightleftarrows}}$ S$_A$ $\underset{147.9}{\overset{149.0}{\rightleftarrows}}$ Iso. |

TABLE 16

Composition of polymer (13a) and compound γ

| No. | Weight ratio (13a)/γ | Phase transition temp. (°C.) |
|---|---|---|
| f' | 1.5/8.5 | S $\underset{60.2}{\overset{60.0}{\rightleftarrows}}$ Sc $\underset{120.1}{\overset{121.4}{\rightleftarrows}}$ S$_A$ $\underset{128.5}{\overset{129.0}{\rightleftarrows}}$ Iso. |

TABLE 17

Composition of polymer (11a) and (4c)

| No. | Weight ratio (11a)/(4c) | Phase transition temp. (°C.) |
|---|---|---|
| g' | 4.9/5.1 | S $\underset{72.0}{\overset{79.1}{\rightleftarrows}}$ S $\underset{88.5}{\overset{92.4}{\rightleftarrows}}$ Sc* $\underset{153.0}{\overset{152.8}{\rightleftarrows}}$ Iso. |

TABLE 18

Compositions of polymers (14b), (15b) and (16b), respectively, with compound γ

| No. | Weight ratio | Phase transition temp. (°C.) |
|---|---|---|
| h' | (14b):γ = 8:2 | S $\xrightleftharpoons[107.1]{108.2}$ Sc* $\xrightleftharpoons[165.2]{165.8}$ Iso. |
| i' | (15b):γ = 8:2 | S $\xrightleftharpoons[107.8]{110.8}$ Sc* $\xrightleftharpoons[146.9]{148.1}$ Iso. |
| j' | (16b):γ = 8:2 | S $\xrightleftharpoons[88.2]{90.4}$ Sc* $\xrightleftharpoons[167.2]{168.4}$ Iso. |

EXAMPLE 19

The polymers and compositions used or prepared in Example 18 above were respectively applied on a glass substrate coated with an ITO electrode and a polyimide alignment film by pressing, spin coating or casting to form a film, which was then annealed and covered with a counter substrate also provided with an electrode to form a liquid crystal layer of 3 microns. The resultant liquid crystal cells in Sc* phase were supplied with an electric field of 10 V/micron, whereby inversion of molecules was observed in response to the electric field. The response times measured at that time are summarized in the following Table 19.

TABLE 19

| No. | Response time (ms) |
|---|---|
| (2e) | 9.8 |
| A | 9.5 |
| B | 8.6 |
| C | 6.2 |
| D | 3.6 |
| E | 10.6 |
| (4c) | 0.80 |
| G | 0.81 |
| H | 1.20 |
| I | 0.68 |
| J | 0.92 |
| K | 1.8 |
| L | 1.2 |
| M | 0.82 |
| N | 0.95 |
| O | 0.34 |
| P | 0.38 |
| q | 0.38 |
| r | 0.31 |
| s | 0.29 |
| t | 0.45 |
| u | 0.51 |
| v | 0.68 |
| w | 0.49 |
| x | 1.3 |
| y | 1.0 |
| z | 0.39 |
| a' | 0.53 |
| b' | 0.92 |
| c' | 0.28 |
| d' | 0.15 |
| e' | 0.18 |
| f' | 0.35 |
| g' | 0.21 |
| h' | 0.42 |
| i' | 0.38 |
| j' | 0.68 |
| (6a) | 1.4 |
| (7a) | 1.3 |
| (8c) | 1.5 |
| (9d) | 2.3 |
| (10b) | 3.3 |
| (11a) | 3.4 |
| (12a) | 2.9 |
| (13a) | 5.4 |

TABLE 19-continued

| No. | Response time (ms) |
|---|---|
| (14b) | 5.1 |
| (15b) | 4.2 |
| (16b) | 4.8 |

Herein, the number-average molecular weight (Mn) and weight-average molecular weight (Mw) refer to values corresponding to those of polystyrenes based on measurement by GPC (gel permeation chromatography).

As described above, the present invention provides novel mesomorphic polymer and mesomorphic copolymer which can be formed into a large area, provide a good responsiveness in chiral smectic C phase and have an excellent mutual solubility with a low-molecular weight mesomorphic compound or mesomorphic polymer to provide a uniform polymer liquid crystal composition showing a good responsiveness in chiral smectic C phase. The present invention further provides a polymer liquid crystal device using such a mesomorphic polymer, mesomorphic copolymer or a polymer liquid crystal composition.

Further, the present invention provides a novel monomeric mesomorphic compound which is useful as a low-molecular weight ferroelectric liquid crystal material showing bistability or a blend material having an excellent compatibility with a polymer liquid crystal. A liquid crystal device with a good responsiveness can be prepared by using such a mesomorphic compound or a liquid crystal composition containing the same.

What is claimed is:

1. A mesomorphic polymer comprising recurring units of:

$$\overset{*}{\text{U}-\text{V}-\text{W}-\text{X}-\text{Y}-\overset{|}{\underset{|}{\text{C}}}\text{HOZ},}\quad \overset{CH_3}{}$$

wherein U denotes a polymer main chain unit; V denotes —(CH$_2$)$_m$— or —((CH$_2$)$_2$—O)$_m$— each capable of having an alkyl group, halogen atom, amino group or carbonyl group substituting one or more of the hydrogen atoms wherein m is an integer of 0–30; W denotes a single bond, —O—, —OCO—, —COO—, —CONR$^1$—, —CO— or —NR$^1$— wherein R$^1$ denotes hydrogen atom or alkyl group; X denotes a mesogen unit comprising two ring structures which may be the same or different and are capable of having a substituent of F or CN, said ring structures being two of

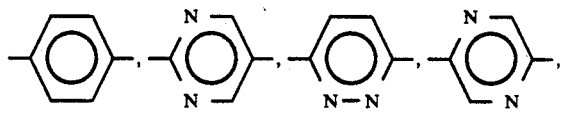

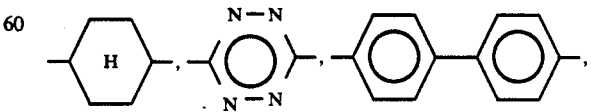

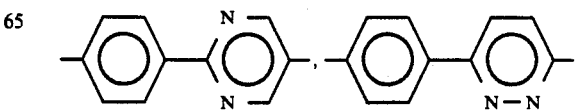

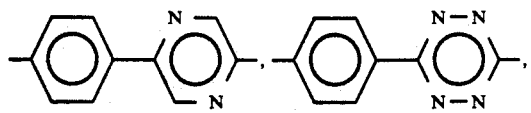

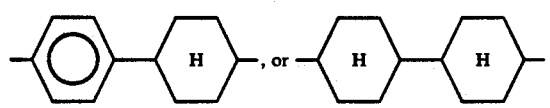

connected to each other with a single bond, —O—, —OCO—, —COO—, —(CH$_2$)$_n$—, —N=N—, —(CH=CH)$_n$—, —CH=N—, —N=CH—, —(C≡C)$_n$—, —CONR$^1$, —(CO)$_n$— or —NR$^1$— wherein n is an integer of 1-10; Y denotes —COOCH$_2$—, —OCH$_2$— or —OCO—; Z denotes —R$^2$ or —COR$^2$ wherein R$^2$ denotes hydrogen atom or alkyl group capable of having a substituent; and * denotes an asymmetric carbon atom.

2. A mesomorphic polymer according to claim 1, wherein U denotes

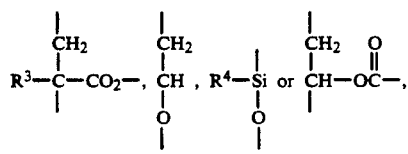

wherein R$^3$ denotes hydrogen atom, alkyl group or halogen atom, R$^4$ denotes alkyl group; V denotes —(CH$_2$)$_{\overline{m}}$ or —(CH$_2$)$_2$—O)$_{\overline{m}}$; X denotes a mesogen unit wherein the two ring structures are connected with a single bond, —O—, —OCO—, —COO—, —N=N—, —CH=CH—, —CH=N—, —N=CH—, —(C≡C)—, —CONR$^1$, —CO— or —NR$^1$—.

3. A mesomorphic polymer according to claim 1, wherein U denotes

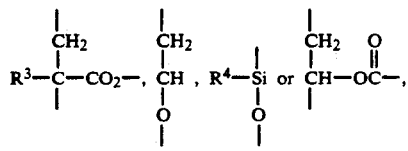

wherein R$^3$ denotes hydrogen atom, alkyl group or halogen atom, and R$^4$ denotes alkyl group; V denotes optionally substituted —(CH$_2$)$_{\overline{m}}$ wherein m is an integer of 2-15; W denotes a single bond, —O—, —OCO— or —COO—; X denotes a mesogen unit wherein the two ring structures are connected with a single bond, —O—, —OCO—, or —COO—; and Z denotes alkyl group or —COCH(CH$_3$)—OR$^5$ wherein R$^5$ denotes hydrogen atom or alkyl group capable of having a substituent.

4. A polymer liquid crystal composition comprising at least one mesomorphic polymer according to one of claims 1-3, and a compound selected from another polymer, mesomorphic polymer, low-molecular weight compound or low-molecular weight mesomorphic compound.

5. A composition according to claim 4, which comprises at least one mesomorphic polymer and a low-molecular weight mesomorphic compound.

6. A composition according to claim 4, which comprises at least one mesomorphic polymer and another mesomorphic polymer.

7. A composition according to claim 6, wherein said another mesomorphic polymer comprises recurring units of:

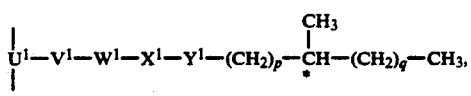

wherein U$^1$ denotes a polymer main chain unit; V$^1$ denotes —(CH$_2$)$_m$— or —((CH$_2$)$_2$—O)$_m$— each capable of having an alkyl group, halogen atom, amino group or carbonyl group substituting one or more of the hydrogen atoms wherein m is an integer of 0-30; W$^1$ denotes a single bond, —O—, —OCO—, —COO—, —CONR$^1$—, —CO— or —NR$^1$— wherein R$^1$ denotes hydrogen atom or alkyl group; X$^1$ denotes a mesogen unit comprising two ring structures which may be the same or different and are capable of having a substituent of F or CN, said ring structures being two of

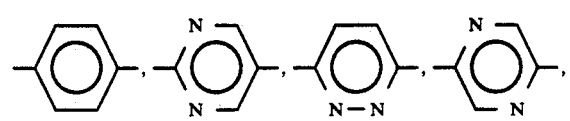

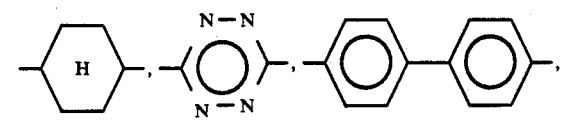

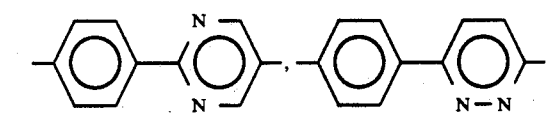

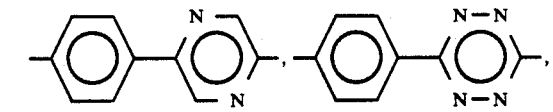

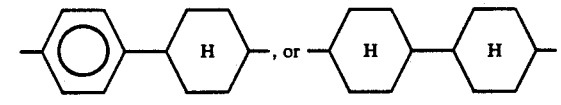

connected to each other with a single bond, —O—, —OCO—, —COO—, —(CH$_2$)$_n$—, —N=N—, —(CH=CH)$_n$—, —CH=N—, —N=CH—, —N=CH—, —(C≡C)$_n$—, —CONR$^1$, —(CO)$_n$— or —NR$^1$— wherein n is an integer of 1-10; Y$^1$ denotes —O—, —COO—, —CO— or —NR$^1$— wherein R$^1$ is the same as defined above; * denotes an asymmetric carbon atom; p is an integer of 0-10, and q is an integer of 0-10.

8. A mesomorphic copolymer comprising recurring units of:

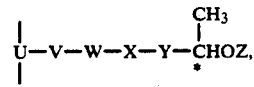

wherein U denotes a copolymer main chain unit; V denotes —(CH$_2$)$_m$— or —((CH$_2$)$_2$—O)$_m$— each capable of having an alkyl group, halogen atom, amino group or carbonyl group substituting one or more of the hydrogen atoms wherein m is an integer of 0-30; W denotes a single bond, —O—, —OCO—, —COO—, —CONR$^1$—, —CO— or —NR$^1$— wherein R$^1$ denotes hydrogen atom or alkyl group; X denotes a mesogen unit comprising two ring structures which may be the same or different and are capable of having a substituent of F or CN, said ring structures being two of

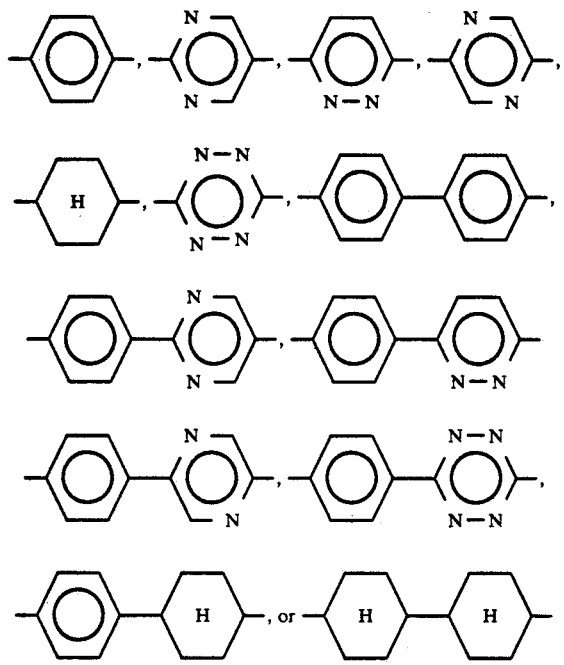

connected to each other with a single bond, —O—, —OCO—, —COO—, —(CH$_2$)$_n$—, —N=N—, —(CH=CH)$_n$—, —CH=N—, —N=CH—, —(C≡C-)$_n$—, —CONR$^1$—, —(CO)$_n$— or —NR$^1$— wherein n is an integer of 1-10; Y denotes —COOCH$_2$—, —OCH$_2$— or —OCO—; Z denotes —R$^2$ or —COR$^2$ wherein R$^2$ denotes hydrogen atom or alkyl group capable of having a substituent; and * denotes an asymmetric carbon atom.

9. A mesomorphic copolymer according to claim 8, wherein U denotes

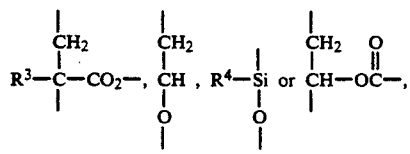

wherein R$^3$ denotes hydrogen atom, alkyl group or halogen atom, R$^4$ denotes alkyl group; V denotes —(CH$_2$)$_m$ or —(CH$_2$)$_2$—O$)_m$; X denotes a mesogen unit wherein the two ring structures are connected with a single bond, —O—, —OCO—, —COO—, —N=N—, —CH=CH—, —CH=N—, —N=CH—, —(C≡C)—, —CONR$^1$—, —CO— or —NR$^1$—.

10. A mesomorphic copolymer according to claim 8, wherein U denotes

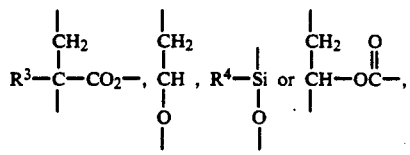

wherein R$^3$ denotes hydrogen atom, alkyl group or halogen atom, and R$^4$ denotes alkyl group; V denotes —(CH$_2$)$_m$ wherein m is an integer of 2-15; W denotes a single bond, —O—, —OCO— or —COO—; X denotes a mesogen unit wherein the two ring structures are connected with a single bond, —O—, —OCO—, or —COO—; Y denotes —COOCH$_2$—, —OCH$_2$— or —OCO—; Z denotes alkyl group or —COCH(CH$_3$)—OR$^5$ wherein R$^5$ denotes hydrogen atom or alkyl group capable of having a substituent.

11. A polymer liquid crystal composition comprising at least one mesomorphic polymer according to one of claims 8-10, and a compound selected from another polymer, mesomorphic polymer, low-molecular weight compound or low-molecular weight mesomorphic compound.

12. A composition according to claim 11, which comprises at least one mesomorphic polymer and a low-molecular weight mesomorphic compound.

13. A composition according to claim 11, which comprises at least one mesomorphic copolymer and another mesomorphic polymer.

14. A polymer liquid crystal device, comprising: a substrate and a mesomorphic polymer according to one of claims 1, 2 and 3 disposed in an aligned form on the substrate.

15. A polymer liquid crystal device, comprising: a substrate and a polymer liquid crystal composition according to claim 4 disposed in an aligned form on the substrate.

16. A polymer liquid crystal device, comprising: a substrate and a polymer liquid crystal composition according to claim 5 disposed in an aligned form on the substrate.

17. A polymer liquid crystal device, comprising: a substrate and a polymer liquid crystal composition according to claim 6 disposed in an aligned form on the substrate.

18. A polymer liquid crystal device, comprising: a substrate and a polymer liquid crystal composition according to claim 7 disposed in an aligned form on the substrate.

19. A polymer liquid crystal device, comprising: a substrate and a mesomorphic copolymer according to one of claims 8, 9 and 10 disposed in an aligned form on the substrate.

20. A polymer liquid crystal device, comprising: a substrate and a polymer liquid crystal composition according to claim 11 disposed in an aligned form on the substrate.

21. A polymer liquid crystal device, comprising: a substrate and a polymer liquid crystal composition according to claim 12 disposed in an aligned form on the substrate.

22. A polymer liquid crystal device, comprising: a substrate and a polymer liquid crystal composition according to claim 13 disposed in an aligned form on the substrate.

23. A mesomorphic polymer comprising recurring units of:

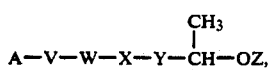

wherein A denotes $CH_2=C(R^3)CO_2-$,

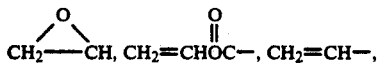

or $CH_2=CH-O-$ wherein $R^3$ denotes hydrogen, alkyl or halogen; V denotes $-(CH_2)_m-$ or $-((CH_2)_2-O)_m-$ each capable of having an alkyl group, halogen atom, amino group or carbonyl group substituting one or more of the hydrogen atoms wherein m is an integer of 0-30; W denotes a single bond, $-O-$, $-OCO-$, $-COO-$, $-CONR^1-$, $-CO-$ or $-NR^1-$ wherein $R^1$ denotes hydrogen atom or alkyl group; X denotes a mesogen unit comprising two ring structures which may be the same or different and are capable of having a substituent of F or CN, said ring structures being two of

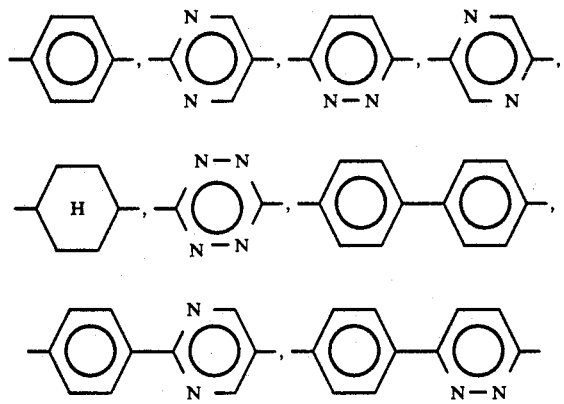

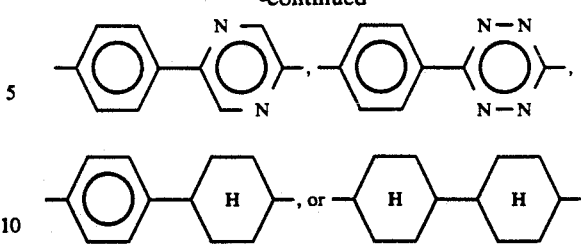

connected to each other with a single bond, $-O-$, $-OCO-$, $-COO-$, $-(CH_2)_n-$, $-N=N-$, $-(CH=CH)_n-$, $-CH=N-$, $-N=CH-$, $-(C\equiv C)_n-$, $-CONR^1-$, $-(CO)_n-$ or $NR^1-$ wherein n is an integer of 1-10; Y denotes $-COOCH_2-$, $-OCH_2-$ or $-OCO-$; Z denotes $-R^2$ or $-COR^2$ wherein $R^2$ denotes hydrogen atom or alkyl group capable of having a substituent; and * denotes an asymmetric carbon atom.

24. A mesomorphic compound according to claim 23, wherein V denotes $-(CH_2)_m$ or $-(CH_2)_2-O)_{\overline{m}}$ wherein X denotes a mesogen unit wherein the two ring structures are connected with a single bond, $-O-$, $-OCO-$, $-COO-$, $-N=N-$, $-CH=CH-$, $-CH=N-$, $-N=CH-$, $-(C\equiv C)-$, $-CONR^1-$ $-CO-$ or $-NR^1-$.

25. A mesomorphic compound according to claim 23, wherein V denotes $-(CH_2)_{\overline{m}}$ wherein m is an integer of 2-15; W denotes a single bond, $-O-$, $-OCO-$ or $-COO-$; X denotes a mesogen unit wherein the two ring structures are connected with a single bond; and Z denotes alkyl group or $-COCH(CH_3)-OR^5$ wherein $R^5$ denotes hydrogen atom or alkyl group capable of having a substituent.

26. A liquid crystal composition, comprising: at least one mesomorphic compound according to one of claims 23, 24 and 25, and another low-molecular weight compound, low-molecular weight mesomorphic compound, polymer or mesomorphic polymer.

27. A liquid crystal device, comprising: a substrate and a mesomorphic compound according to one of claims 23, 24 and 25 disposed in an aligned form on the substrate.

28. A liquid crystal device, comprising: a substrate and a liquid crystal composition according to claim 26 disposed in an aligned form on the substrate.

* * * * *

UNITED STATES PATENT AND TRADEMARK OFFICE
CERTIFICATE OF CORRECTION

PATENT NO. : 5,252,251
DATED : October 12, 1993
INVENTOR(S) : KOICHI SATO, ET AL.

Page 1 of 8

It is certified that error appears in the above-identified patent and that said Letters Patent is hereby corrected as shown below:

ON TITLE PAGE

In [57] Abstract, Line 3: "$\begin{array}{c}|\\U\\|\end{array}$" should read $--\begin{array}{c}\uparrow\\U\\\downarrow\end{array}--$.

In [57] Abstract, Line 18:
"$-(C\equiv C)_n 13$," should read $-- -(C\equiv C)_n-,--$.

COLUMN 2

Line 51, "an" should be deleted.

COLUMN 3

Line 8, "$\begin{array}{c}|\\U\\|\end{array}$" should read $--\begin{array}{c}\uparrow\\U\\\downarrow\end{array}--$.

Line 14, "$-(CH_2)_2-O\rightarrow_m$" should read $-- -((CH_2)_2-O)_m--$.

Line 42, "$\begin{array}{c}|\\U\\|\end{array}$" should read $--\begin{array}{c}\uparrow\\U\\\downarrow\end{array}--$.

Line 47, "$-(CH_2)_2-O\rightarrow_m$" should read $-- -((CH_2)_2-O)_m--$ and "capable substit-" should read --capable of having a substit- --.

COLUMN 4

Line 27, "$-(CH_2)_2-O\rightarrow_m$" should read $-- -((CH_2)_2-O)_m--$.

UNITED STATES PATENT AND TRADEMARK OFFICE
CERTIFICATE OF CORRECTION

PATENT NO. : 5,252,251
DATED : October 12, 1993
INVENTOR(S) : KOICHI SATO, ET AL.

Page 2 of 8

It is certified that error appears in the above-identified patent and that said Letters Patent is hereby corrected as shown below:

COLUMN 5

Line 8, "|U|" should read -- ↑U↓ --.

Lines 40-45, $$R^3-\overset{CH_2}{\underset{\underset{O}{|}}{C}}-CO_2-,\overset{CH_2}{\underset{CH_4}{C}}\quad R^4-\overset{|}{\underset{|}{Si}}-O\text{ and }\overset{CH_2}{\underset{|}{C}}H-O\overset{O}{\overset{\|}{C}}-,$$

should read $$R^3-\overset{\uparrow CH_2 \downarrow}{\underset{\underset{\downarrow}{\overset{O}{\uparrow}}}{C}}-CO_2,\overset{\uparrow CH_2 \downarrow}{\underset{CH_4}{C}}\quad R^4-\overset{\uparrow}{\underset{\downarrow}{Si}}-O\text{ and }\overset{\uparrow CH_2 \downarrow}{\underset{}{C}}H-O\overset{O}{\overset{\|}{C}}-, --.$$

Line 49, "$-(CH_2)_2-O\rightarrow_{\overline{m}}$" should read -- $-(CH_2)_2-O\rightarrow_{\overline{m}}$ --.
Line 56, "$-(CH_2-$" should read -- $-(CH_2--$.

COLUMN 11

Line 50, "$CO_2-(CH_2)$" should read --$CO_2-(CH_2)$--.

COLUMN 33

Line 53, "$C_2h_5$" should read --$C_2H_5$--.

UNITED STATES PATENT AND TRADEMARK OFFICE
CERTIFICATE OF CORRECTION

PATENT NO. : 5,252,251
DATED : October 12, 1993
INVENTOR(S) : KOICHI SATO, ET AL.

Page 3 of 8

It is certified that error appears in the above-identified patent and that said Letters Patent is hereby corrected as shown below:

COLUMN 34

Line 3, "
$$\begin{array}{c} | \\ U^1 \\ | \end{array}$$
" should read
$$-- \begin{array}{c} \uparrow \\ U^1 \\ \downarrow \end{array} --.$$

Line 20, "–(C" should read -- –(C≡ --.
Line 68, "per" should read --per se--.

COLUMN 35

Line 29, "(DOBAMABC)" should read --(DOBAMBC)--.

COLUMN 38

Line 47, "in" should be deleted.

COLUMN 39

Line 8, "ore" should read --more--.

Line 19, "
$$\begin{array}{c} | \\ CH_2 \\ | \\ C \\ | \end{array}$$
" should read
$$-- \begin{array}{c} \uparrow \\ CH_2 \\ | \\ C \\ \downarrow \end{array} --.$$

Line 25, "
$$\begin{array}{c} | \\ CH_2 \\ | \\ C \\ | \end{array}$$
" should read
$$-- \begin{array}{c} \uparrow \\ CH_2 \\ | \\ C \\ \downarrow \end{array} --.$$

UNITED STATES PATENT AND TRADEMARK OFFICE
CERTIFICATE OF CORRECTION

PATENT NO. : 5,252,251

DATED : October 12, 1993

INVENTOR(S) : KOICHI SATO, ET AL.

Page 4 of 8

It is certified that error appears in the above-identified patent and that said Letters Patent is hereby corrected as shown below:

COLUMN 39

Line 30, "$\begin{array}{c}|\\CH_2\\|\\C\\|\end{array}$" should read --$\begin{array}{c}\uparrow\\CH_2\\|\\C\\\downarrow\end{array}$--.

Line 35, "$\begin{array}{c}|\\CH_2\\|\\C\\|\end{array}$" should read --$\begin{array}{c}\uparrow\\CH_2\\|\\C\\\downarrow\end{array}$--.

Line 41, "$\begin{array}{c}|\\CH_2\\|\\C\\|\end{array}$" should read --$\begin{array}{c}\uparrow\\CH_2\\|\\C\\\downarrow\end{array}$--.

COLUMN 41

Line 66, "of" (first occurrence) should be deleted.

COLUMN 42

Line 36, "or" should read --on--.

COLUMN 44

Line 8, "i)" should be deleted.

UNITED STATES PATENT AND TRADEMARK OFFICE
CERTIFICATE OF CORRECTION

PATENT NO. : 5,252,251
DATED : October 12, 1993
INVENTOR(S) : KOICHI SATO, ET AL.

It is certified that error appears in the above-identified patent and that said Letters Patent is hereby corrected as shown below:

COLUMN 64

Line 25, "(Yield: 48%)" should read --(Yield: 48%) ¶
Mn = 11,600, Mw = 21,400
Phase transition temperature (°C.):--.

COLUMN 66

Line 31, "4-(2" should read --4-[4-(2--.
Line 63, "1H-NMR" should read --$^1$H-NMR--.

COLUMN 67

Line 31, "obtained." should read --obtained. ¶
Mn = 2,300, Mw = 4,000--.

COLUMN 68

Line 32, "Sc*" (first occurrence) should read --S--.

COLUMN 76

Line 38, " | should read   -- ↑
            U "              U
            |                ↓ --.

UNITED STATES PATENT AND TRADEMARK OFFICE
CERTIFICATE OF CORRECTION

PATENT NO. : 5,252,251
DATED : October 12, 1993
INVENTOR(S) : KOICHI SATO, ET AL.

Page 6 of 8

It is certified that error appears in the above-identified patent and that said Letters Patent is hereby corrected as shown below:

COLUMN 77

Lines 25-30, " 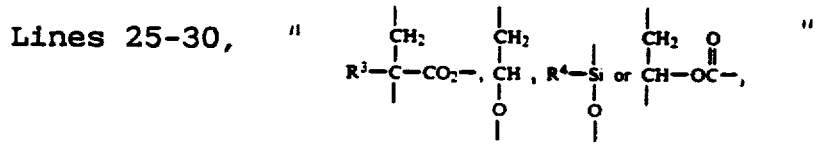 "

should read -- 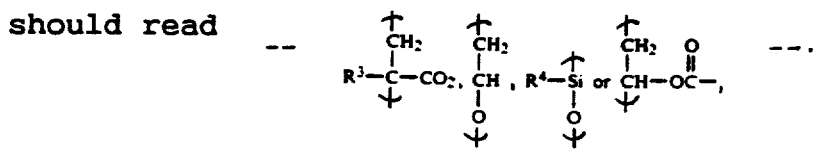 --.

Line 34, "$-(CH_2)_2-O\,\overline{)_m}$" should read -- $-\!\!\left(CH_2\right)_2-O\,\overline{)_m}$ --.

Lines 43-48, " 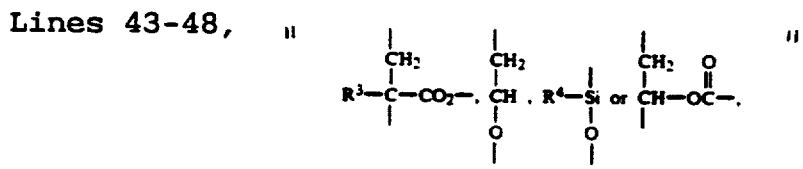 "

should read -- 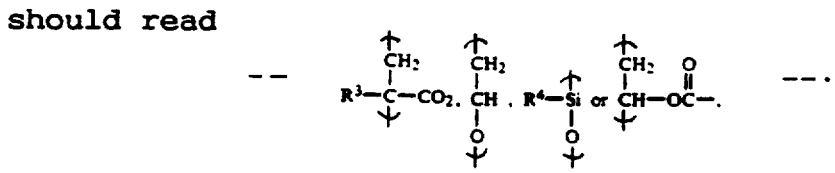 --.

COLUMN 78

Line 8, 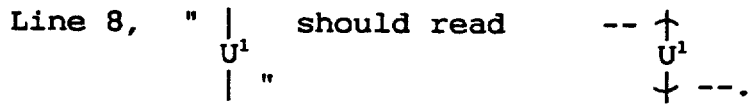

UNITED STATES PATENT AND TRADEMARK OFFICE
CERTIFICATE OF CORRECTION

PATENT NO. : 5,252,251
DATED : October 12, 1993
INVENTOR(S) : KOICHI SATO, ET AL.

It is certified that error appears in the above-identified patent and that said Letters Patent is hereby corrected as shown below:

COLUMN 78

Line 62, "$\begin{array}{c}|\\U\\|\end{array}$" should read $-\begin{array}{c}\uparrow\\U\\\downarrow\end{array}-$.

COLUMN 79

Lines 52-57,
"$$R^3-\underset{|}{\overset{CH_2}{\underset{|}{C}}}-CO_2-,\ \underset{|}{\overset{CH_2}{\underset{O}{CH}}},\ R^4-\underset{|}{\overset{|}{Si}}\ \text{or}\ \underset{|}{\overset{CH_2}{CH}}-\overset{O}{\overset{\|}{O}C}-.$$"

should read $$-- R^3-\underset{\downarrow}{\overset{\uparrow CH_2}{\underset{|}{C}}}-CO_2,\ \underset{\downarrow}{\overset{\uparrow CH_2}{\underset{O}{CH}}},\ R^4-\underset{\downarrow}{\overset{\uparrow}{Si}}\ \text{or}\ \underset{\downarrow}{\overset{\uparrow CH_2}{CH}}-\overset{O}{\overset{\|}{O}C}-.--$$

Line 61, "$-(CH_2)_2-O\rightarrow_m$" should read $--(CH_2)_2-O\rightarrow_m--$.

COLUMN 80

Lines 3-8, "$$R^3-\underset{|}{\overset{CH_2}{\underset{|}{C}}}-CO_2-,\ \underset{|}{\overset{CH_2}{\underset{O}{CH}}},\ R^4-\underset{|}{\overset{|}{Si}}\ \text{or}\ \underset{|}{\overset{CH_2}{CH}}-\overset{O}{\overset{\|}{O}C}-.$$"

should read $$-- R^3-\underset{\downarrow}{\overset{\uparrow CH_2}{\underset{|}{C}}}-CO_2,\ \underset{\downarrow}{\overset{\uparrow CH_2}{\underset{O}{CH}}},\ R^4-\underset{\downarrow}{\overset{\uparrow}{Si}}\ \text{or}\ \underset{\downarrow}{\overset{\uparrow CH_2}{CH}}-\overset{O}{\overset{\|}{O}C}-.--$$

UNITED STATES PATENT AND TRADEMARK OFFICE
CERTIFICATE OF CORRECTION

PATENT NO. : 5,252,251
DATED : October 12, 1993
INVENTOR(S) : KOICHI SATO, ET AL.

It is certified that error appears in the above-identified patent and that said Letters Patent is hereby corrected as shown below:

COLUMN 82

Line 21, "$-(CH_2)_2-O\!\!\rightarrow_m$" should read -- $-\!\!(\!(CH_2)_2-O\!\!\rightarrow_m$ --.

Signed and Sealed this

Eleventh Day of October, 1994

Attest:

BRUCE LEHMAN

Attesting Officer        Commissioner of Patents and Trademarks